(12) United States Patent
Resch et al.

(10) Patent No.: US 10,324,623 B2
(45) Date of Patent: Jun. 18, 2019

(54) MAPPING STORAGE OF DATA IN A DISPERSED STORAGE NETWORK

(71) Applicant: International Business Machines Corporation, Armonk, NY (US)

(72) Inventors: Jason K. Resch, Chicago, IL (US); Greg Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 15/405,004

(22) Filed: Jan. 12, 2017

(65) Prior Publication Data

US 2017/0123669 A1    May 4, 2017

Related U.S. Application Data

(63) Continuation of application No. 14/088,897, filed on Nov. 25, 2013, now Pat. No. 9,558,067.
(Continued)

(51) Int. Cl.
*G06F 11/00* (2006.01)
*G06F 3/06* (2006.01)
*G06F 11/10* (2006.01)

(52) U.S. Cl.
CPC ............ *G06F 3/0604* (2013.01); *G06F 3/064* (2013.01); *G06F 3/067* (2013.01); *G06F 3/0629* (2013.01); *G06F 3/0644* (2013.01); *G06F 11/1076* (2013.01); *G06F 11/1092* (2013.01); *G06F 3/0619* (2013.01); *G06F 3/0643* (2013.01); *G06F 2211/1028* (2013.01)

(58) Field of Classification Search
CPC ............................ G06F 11/1092; G06F 3/067
See application file for complete search history.

(56) References Cited

U.S. PATENT DOCUMENTS 4,092,732 A    5/1978    Ouchi
5,454,101 A    9/1995    Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Philip Guyton
(74) *Attorney, Agent, or Firm* — Garlick & Markison; Timothy W. Markison; Timothy D. Taylor

(57) ABSTRACT

A method includes encoding a data segment of a data object into a set of encoded data slices. The set of encoded data slices includes "n" number of encoded data slices. The method further includes generating a set of slice names for the set of encoded data slices. The method further includes selecting "m" encoded data slices of the set of encoded data slices to output for storage in DSN memory. The method further includes selecting "m" storage units of "p" storage units of the DSN memory for storing the "m" encoded data slices. The method further includes mapping "m" slice names of the "m" encoded data slices to DSN addresses of the "m" storage units to create mapped slice names. The method further includes outputting, in accordance with the mapped slice names, the "m" encoded data slices to the "m" storage units for storage therein.

10 Claims, 56 Drawing Sheets

Related U.S. Application Data

(60) Provisional application No. 61/748,916, filed on Jan. 4, 2013.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,386,757 B2 | 6/2008 | Lindenstruth et al. |
| 7,636,724 B2 | 12/2009 | de la Torre et al. |
| 8,806,296 B1 | 8/2014 | Lazier |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0269008 A1* | 10/2010 | Leggette ............ G06F 11/1076 714/752 |
| 2013/0132800 A1 | 5/2013 | Healey, Jr. et al. |
| 2015/0254150 A1* | 9/2015 | Gordon ............... G06F 11/1662 714/6.3 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

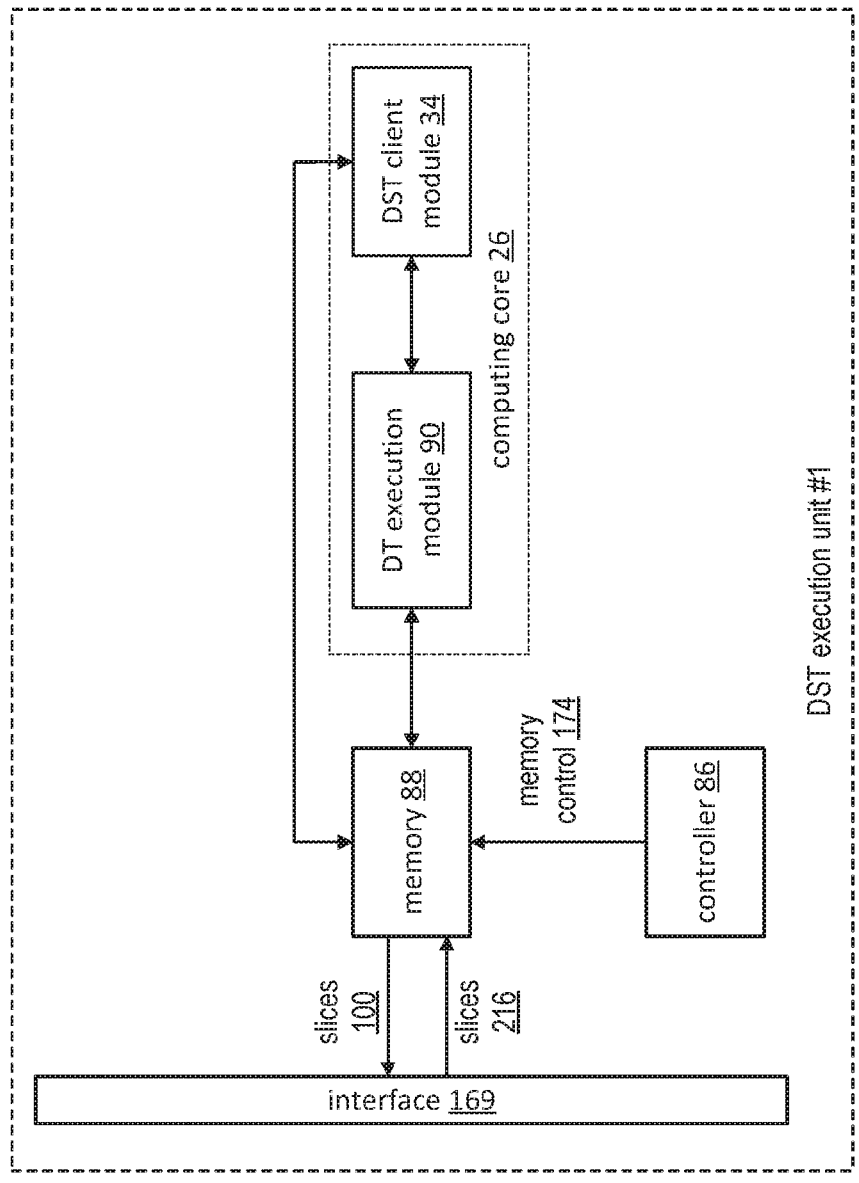
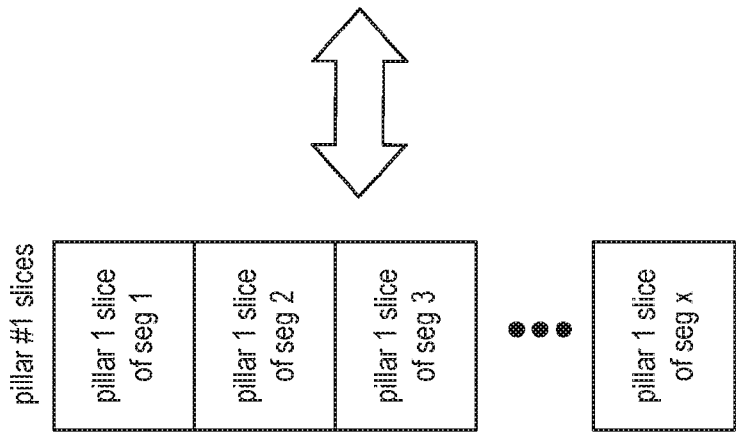
FIG. 24

FIG. 32

DST allocation info 242 data partition info 320; data ID; No. of partitions; Addr. info for each partition; format conversion indication task execution info 322

| task 326 | task ordering 328 | data partition 330 | set of DT EX mods 332 | Name 334 | interm_result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 2_4, 2_4_2, & 5_2 | R3-2 | DST unit 5 | DST unit 5 | DST units 5,6, 1-3 |

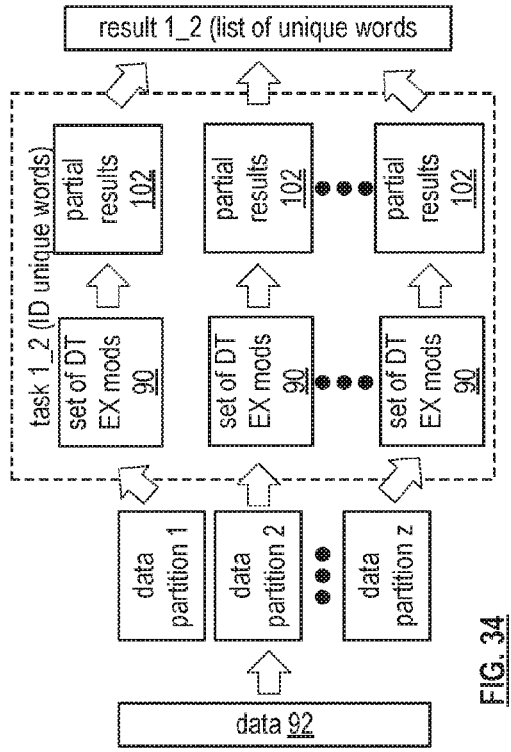
FIG. 34
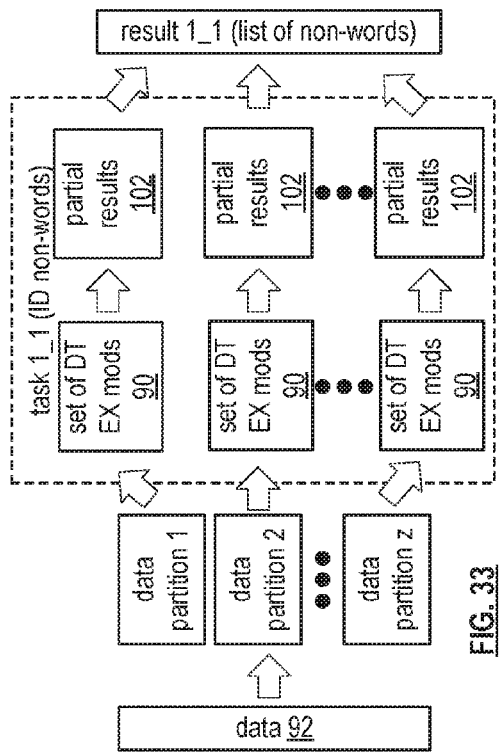
FIG. 33
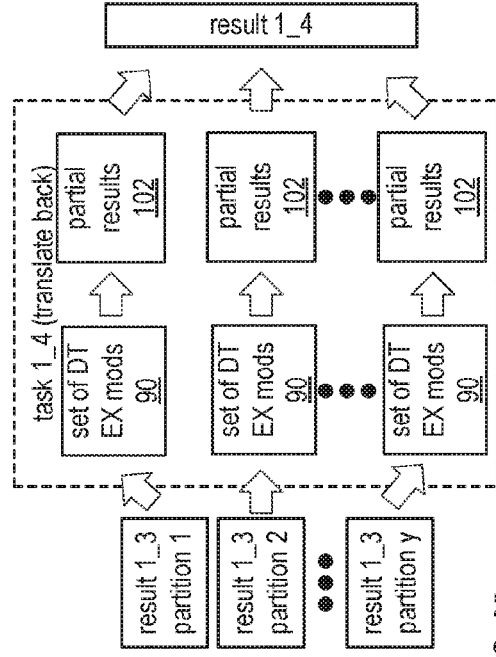
FIG. 35
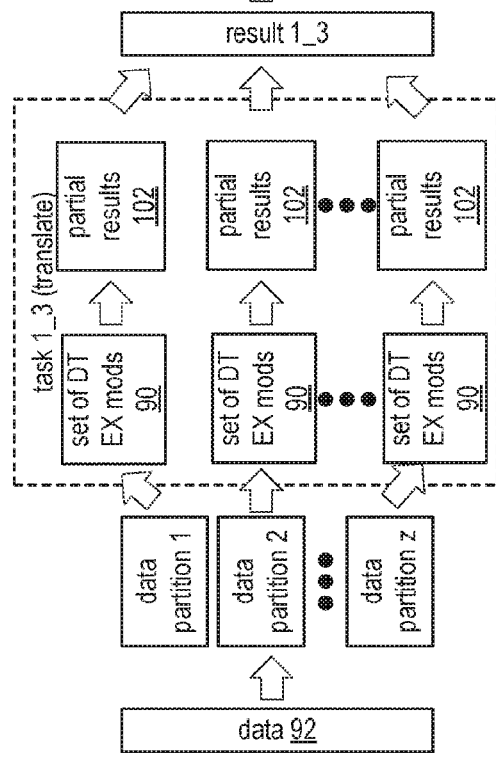

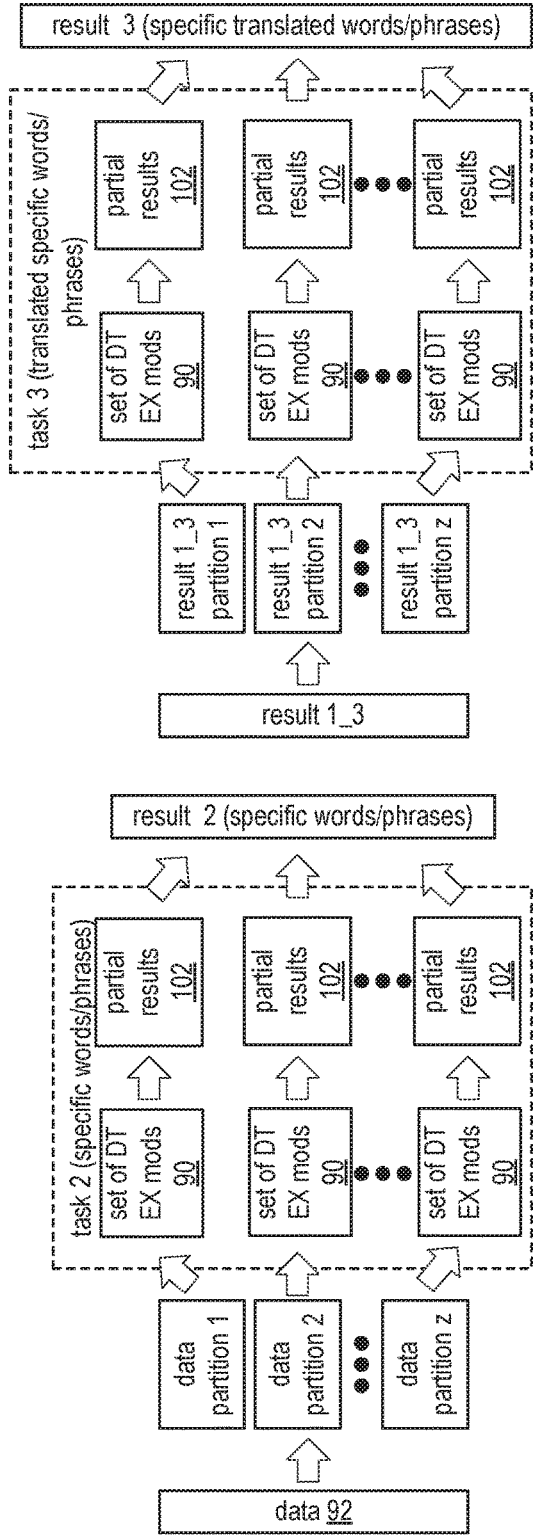
FIG. 38
FIG. 37
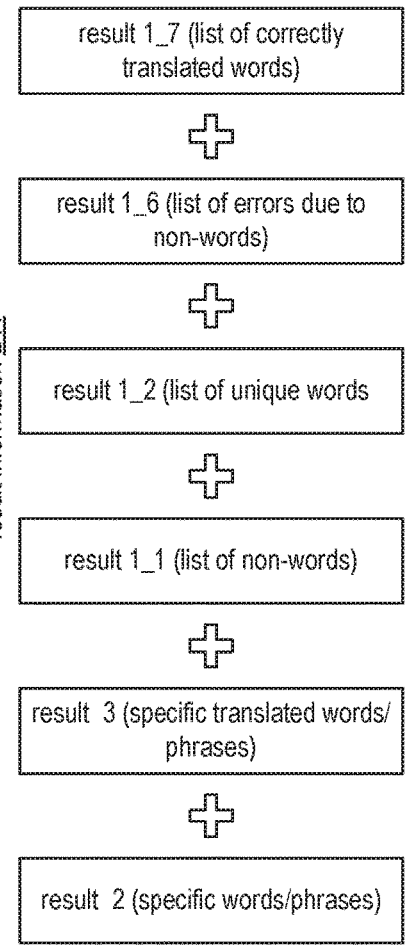
FIG. 39

FIG. 47B slice selection table 492

| DSN address range 494 | target set 496 | target slice 1 | target slice 2 | target slice 3 |
|---|---|---|---|---|
| 1, 6, 11, 16,.... | 1 | slice 1 | slice 2 | slice 3 |
| 2, 7, 12, 17,.... | 2 | slice 2 | slice 3 | slice 4 |
| 3, 8, 13, 18,.... | 3 | slice 3 | slice 4 | slice 5 |
| 4, 9, 14, 19,.... | 4 | slice 4 | slice 5 | slice 1 |
| 5, 10, 15, 20,.... | 5 | slice 5 | slice 1 | slice 2 |

FIG. 47C slice selection table 492

| DSN address range 494 | target set 496 | target slice 1 | target slice 2 | target slice 3 |
|---|---|---|---|---|
| 1, 6, 11, 16,.... | 1 | slice 1 | slice 2 | slice 3 |
| 2, 7, 12, 17,.... | 2 | slice 1 | slice 2 | slice 3 |
| 3, 8, 13, 18,.... | 3 | slice 1 | slice 2 | slice 3 |
| 4, 9, 14, 19,.... | 4 | slice 1 | slice 2 | slice 3 |
| 5, 10, 15, 20,.... | 5 | slice 1 | slice 2 | slice 3 |

FIG. 47D storage unit selection table 498

| DSN address range 494 | target set 496 | target slice 1 | target slice 2 | target slice 3 |
|---|---|---|---|---|
| 1, 6, 11, 16,.... | 1 | unit 1 | unit 2 | unit 3 |
| 2, 7, 12, 17,.... | 2 | unit 2 | unit 3 | unit 4 |
| 3, 8, 13, 18,.... | 3 | unit 3 | unit 4 | unit 5 |
| 4, 9, 14, 19,.... | 4 | unit 4 | unit 5 | unit 1 |
| 5, 10, 15, 20,.... | 5 | unit 5 | unit 1 | unit 2 |

FIG. 47E storage unit selection table 498

| DSN address range 494 | target set 496 | target slice 1 | target slice 2 | target slice 3 |
|---|---|---|---|---|
| 1, 6, 11, 16,.... | 1 | unit 1 | unit 2 | unit 4 |
| 2, 7, 12, 17,.... | 2 | unit 2 | unit 3 | unit 5 |
| 3, 8, 13, 18,.... | 3 | unit 3 | unit 4 | unit 1 |
| 4, 9, 14, 19,.... | 4 | unit 4 | unit 5 | unit 2 |
| 5, 10, 15, 20,.... | 5 | unit 5 | unit 1 | unit 3 |

| DSN address range 494 | target set 496 | target slice 1 | target slice 2 | target slice 3 |
|---|---|---|---|---|
| 1, 21, 41,.... | 1 | unit 1 | unit 2 | unit 3 |
| 2, 22, 42,.... | 2 | unit 2 | unit 3 | unit 4 |
| 3, 23, 43,.... | 3 | unit 3 | unit 4 | unit 5 |
| 4, 24, 44,.... | 4 | unit 4 | unit 5 | unit 1 |
| 5, 25, 45,.... | 5 | unit 5 | unit 1 | unit 2 |
| 6, 26, 46,.... | 6 | unit 1 | unit 2 | unit 4 |
| 7, 27, 47,.... | 7 | unit 2 | unit 3 | unit 5 |
| 8, 28, 48,.... | 8 | unit 3 | unit 4 | unit 1 |
| 9, 29, 49,.... | 9 | unit 4 | unit 5 | unit 2 |
| 10, 30, 50,.... | 10 | unit 5 | unit 1 | unit 3 |
| 11, 31, 51,.... | 11 | unit 6 | unit 1 | unit 2 |
| 12, 32, 52,.... | 12 | unit 6 | unit 1 | unit 3 |
| 13, 33, 53,.... | 13 | unit 6 | unit 1 | unit 4 |
| 14, 34, 54,.... | 14 | unit 6 | unit 2 | unit 5 |
| 15, 35, 55,.... | 15 | unit 6 | unit 2 | unit 3 |
| 16, 36, 56,.... | 16 | unit 6 | unit 2 | unit 4 |
| 17, 37, 57,.... | 17 | unit 6 | unit 2 | unit 5 |
| 18, 38, 58,.... | 18 | unit 6 | unit 3 | unit 4 |
| 19, 39, 59,.... | 19 | unit 6 | unit 3 | unit 5 |
| 20, 40, 60,.... | 20 | unit 6 | unit 4 | unit 5 | storage unit selection table 498

FIG. 47F

MAPPING STORAGE OF DATA IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 14/088,897, entitled "MAPPING STORAGE OF DATA IN A DISPERSED STORAGE NETWORK", filed Nov. 25, 2013, which claims priority pursuant to 35 U.S.C. § 119(e) to U.S. Provisional Application No. 61/748,916, entitled "UTILIZING A HIERARCHICAL REGION HEADER OBJECT STRUCTURE FOR DATA STORAGE", filed Jan. 4, 2013, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 47A:
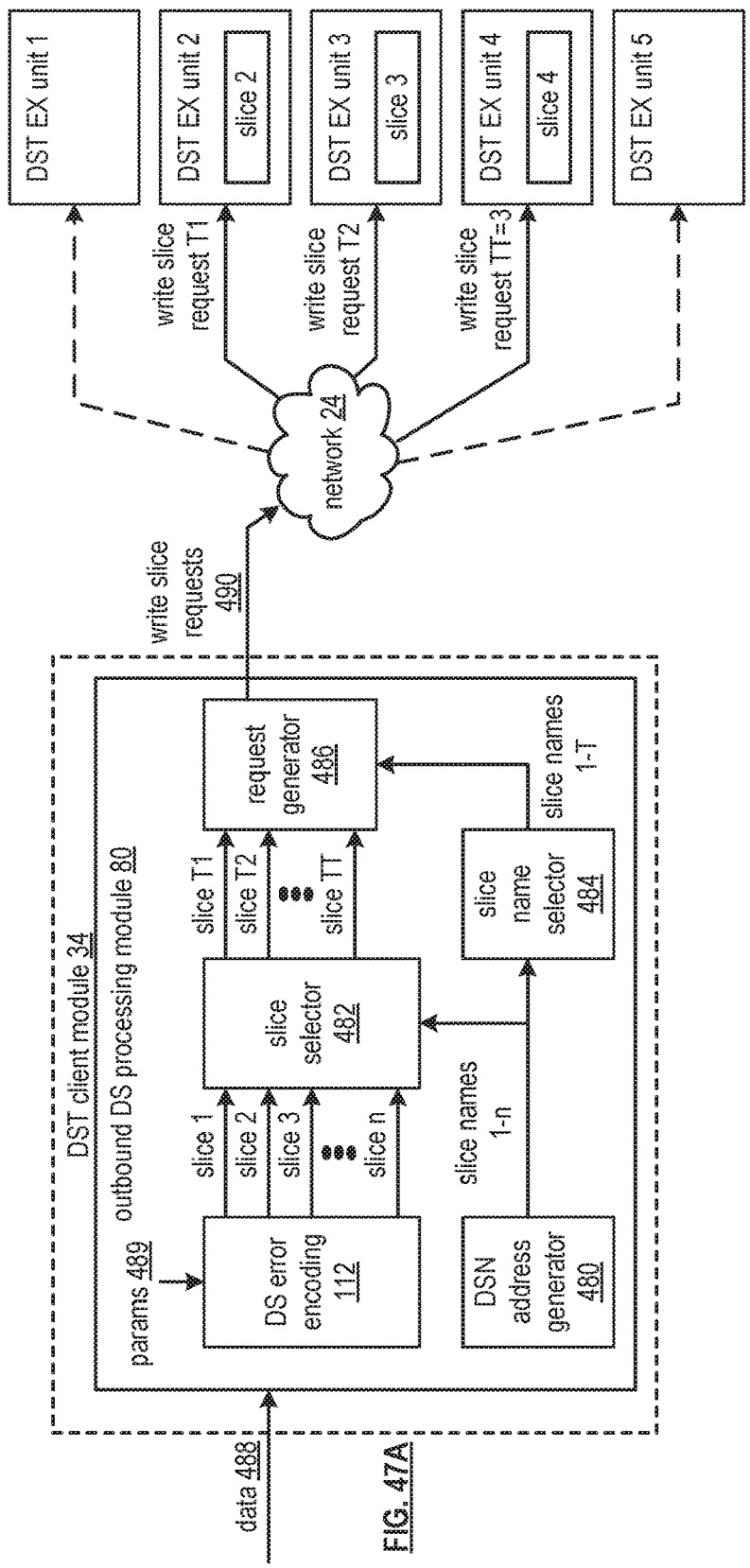
Figure 47G:
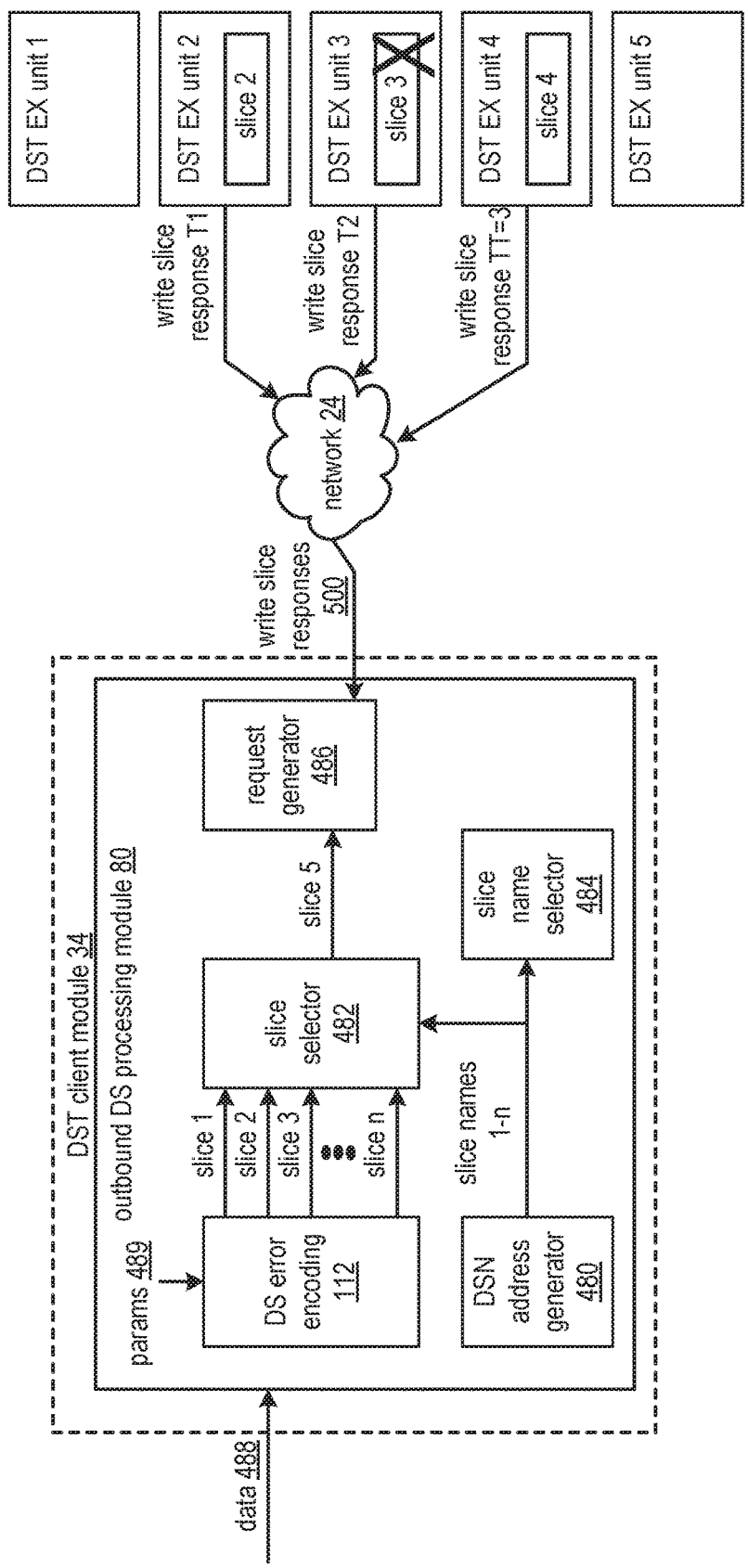
Figure 47H:
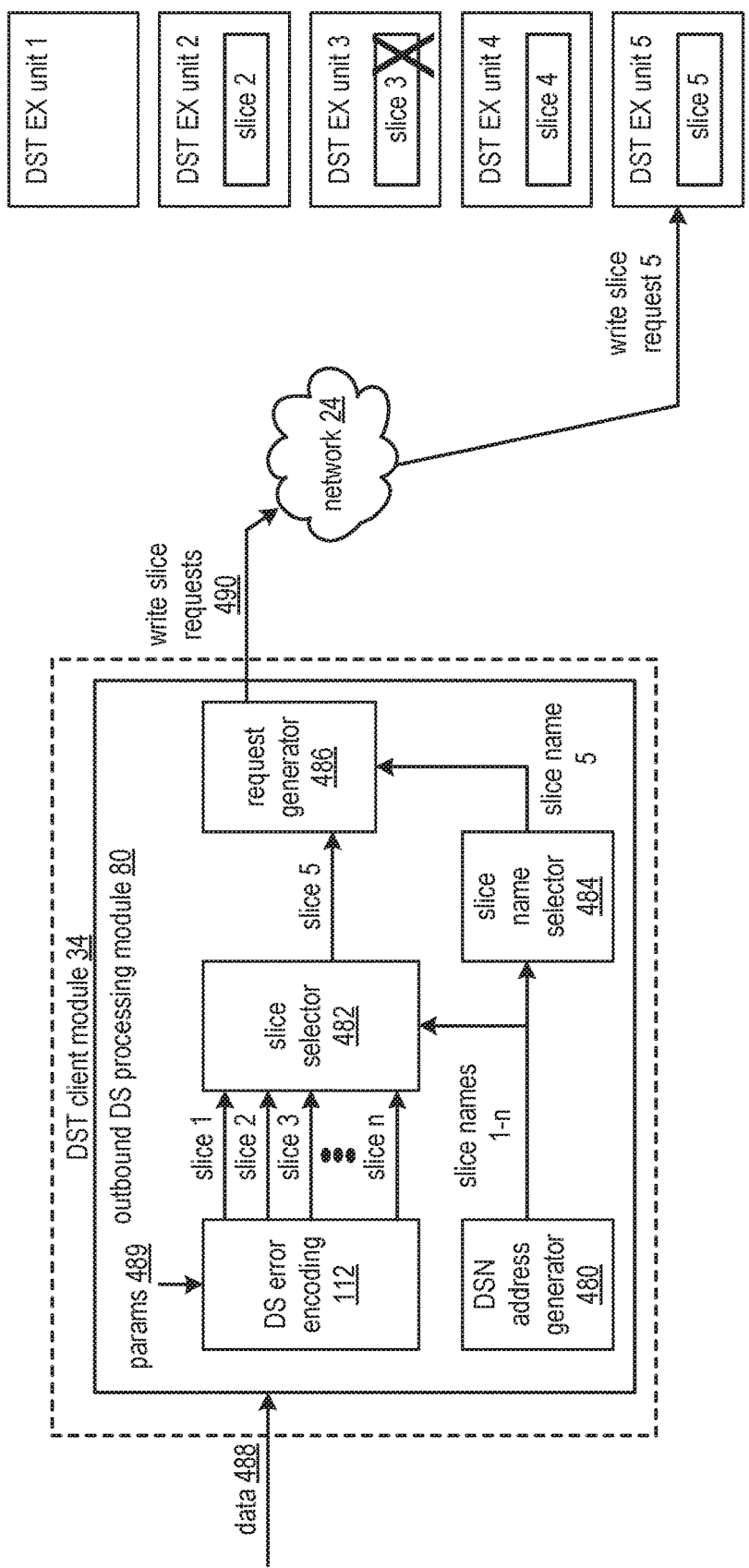
Figure 47I:
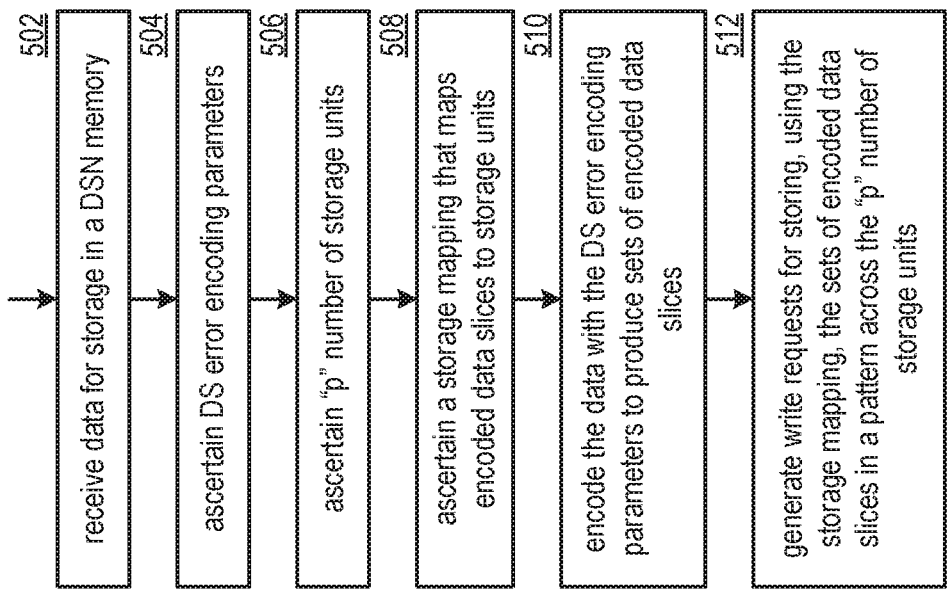
Figure 48:
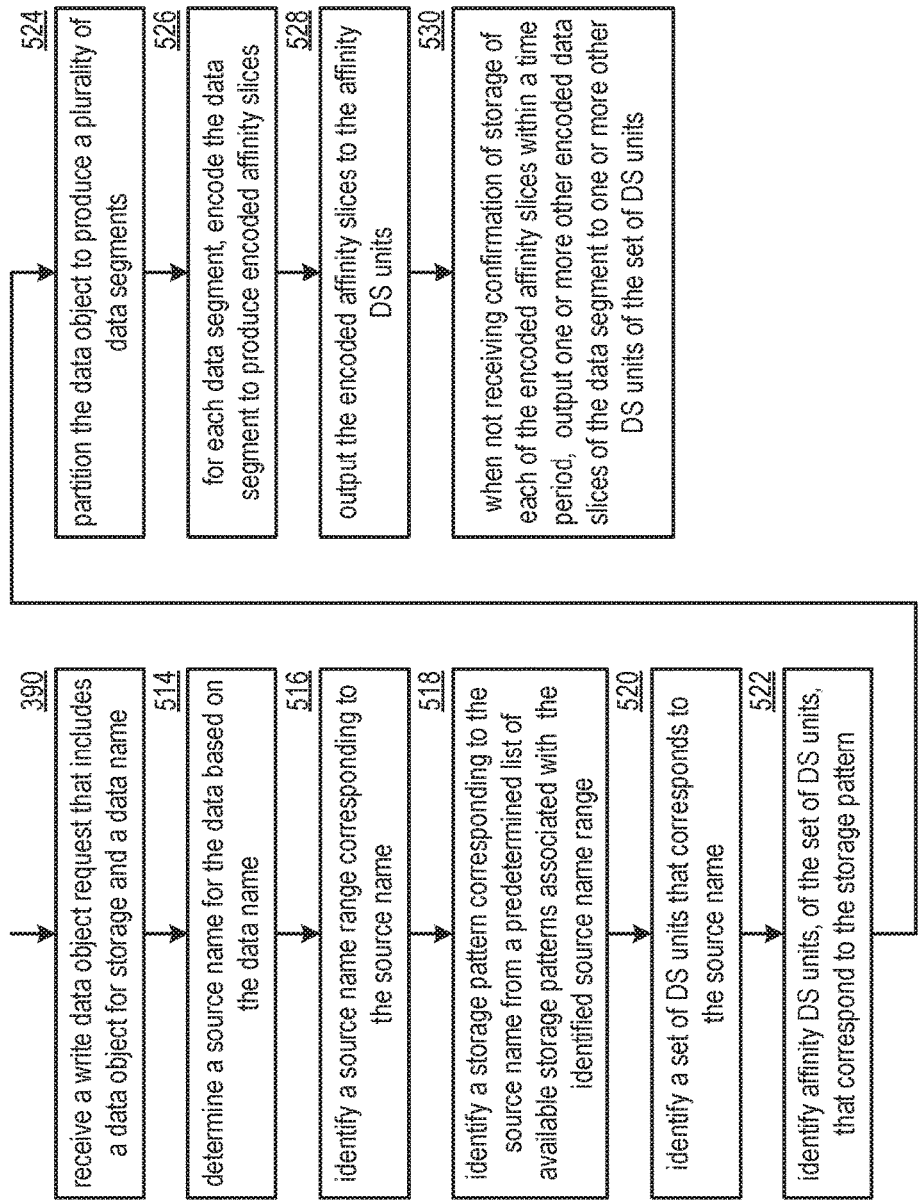
Figure 49:
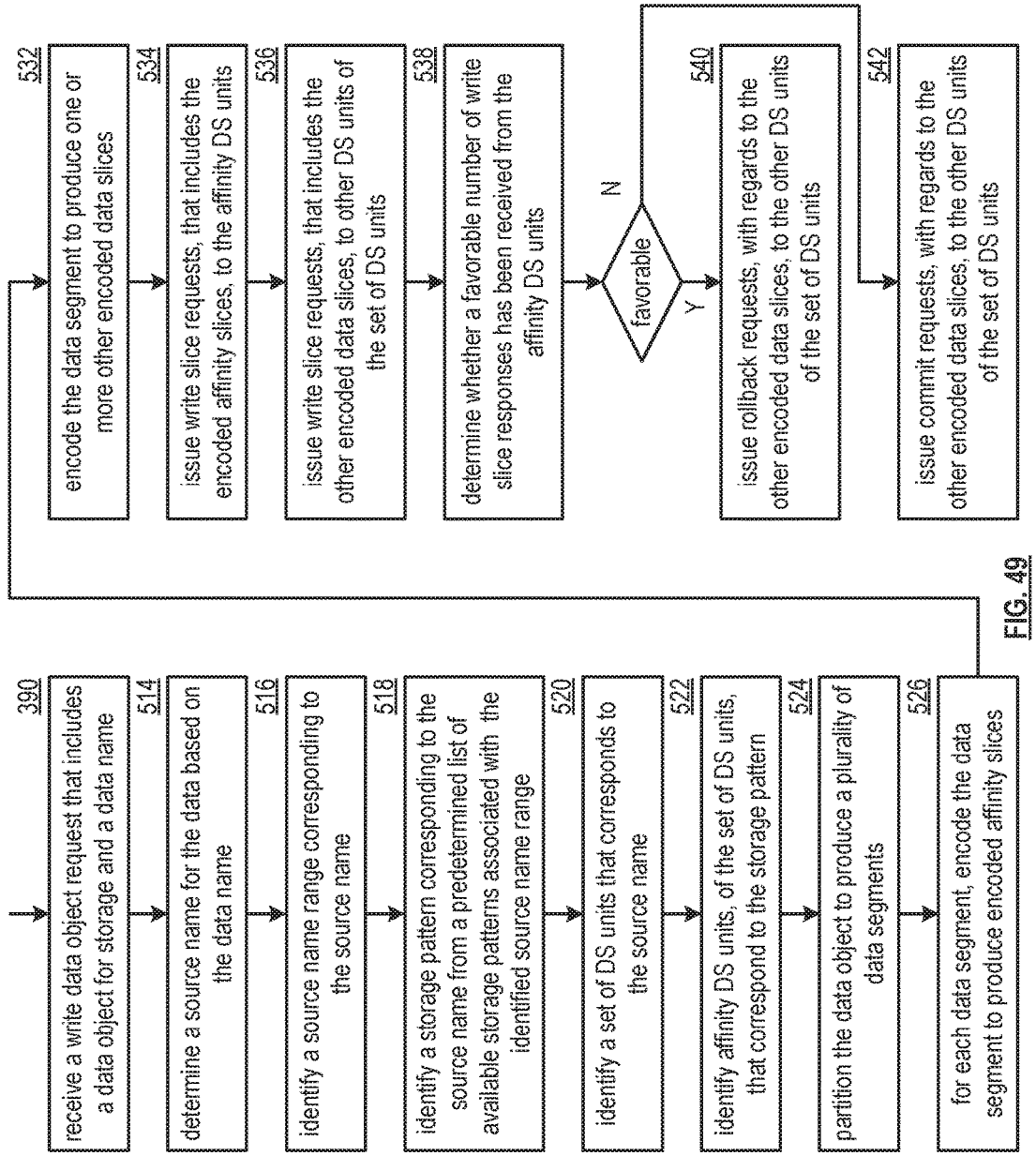
Figure 50:
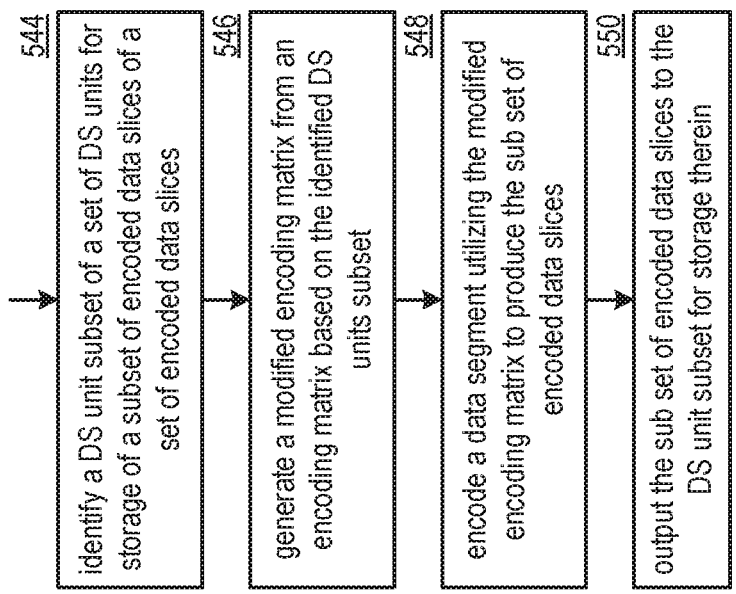
Figures 51A, 51B:
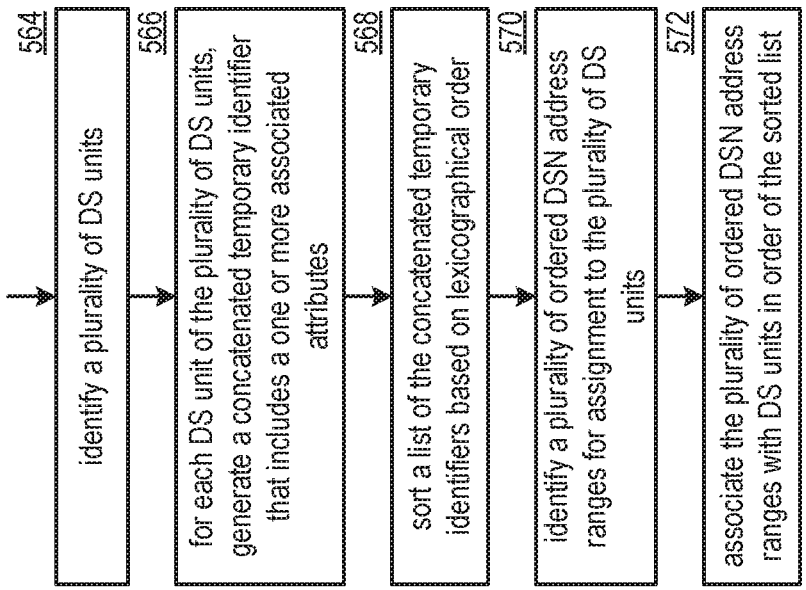

FIGS. 47A, 47G, and 47H are schematic block diagrams of an embodiment of a dispersed storage network (DSN) in accordance with the present invention;

FIGS. 47B-C are diagrams illustrating examples of a slice selection table in accordance with the present invention;

FIGS. 47D-F are diagrams illustrating examples of a storage unit selection table in accordance with the present invention;

FIG. 47I is a flowchart illustrating an example of storing data in accordance with the present invention;

FIG. 48 is a flowchart illustrating another example of storing data in accordance with the present invention;

FIG. 49 is a flowchart illustrating another example of storing data in accordance with the present invention;

FIG. 50 is a flowchart illustrating another example of storing data in accordance with the present invention;

FIG. 51A is a diagram illustrating an example of a virtual dispersed storage network (DSN) address to physical location table in accordance with the present invention; and FIG. 51B is a flowchart illustrating an example of assigning dispersed storage network (DSN) address ranges in accordance with the present invention.

DETAILED DESCRIPTION OF THE INVENTION

Figure 1:
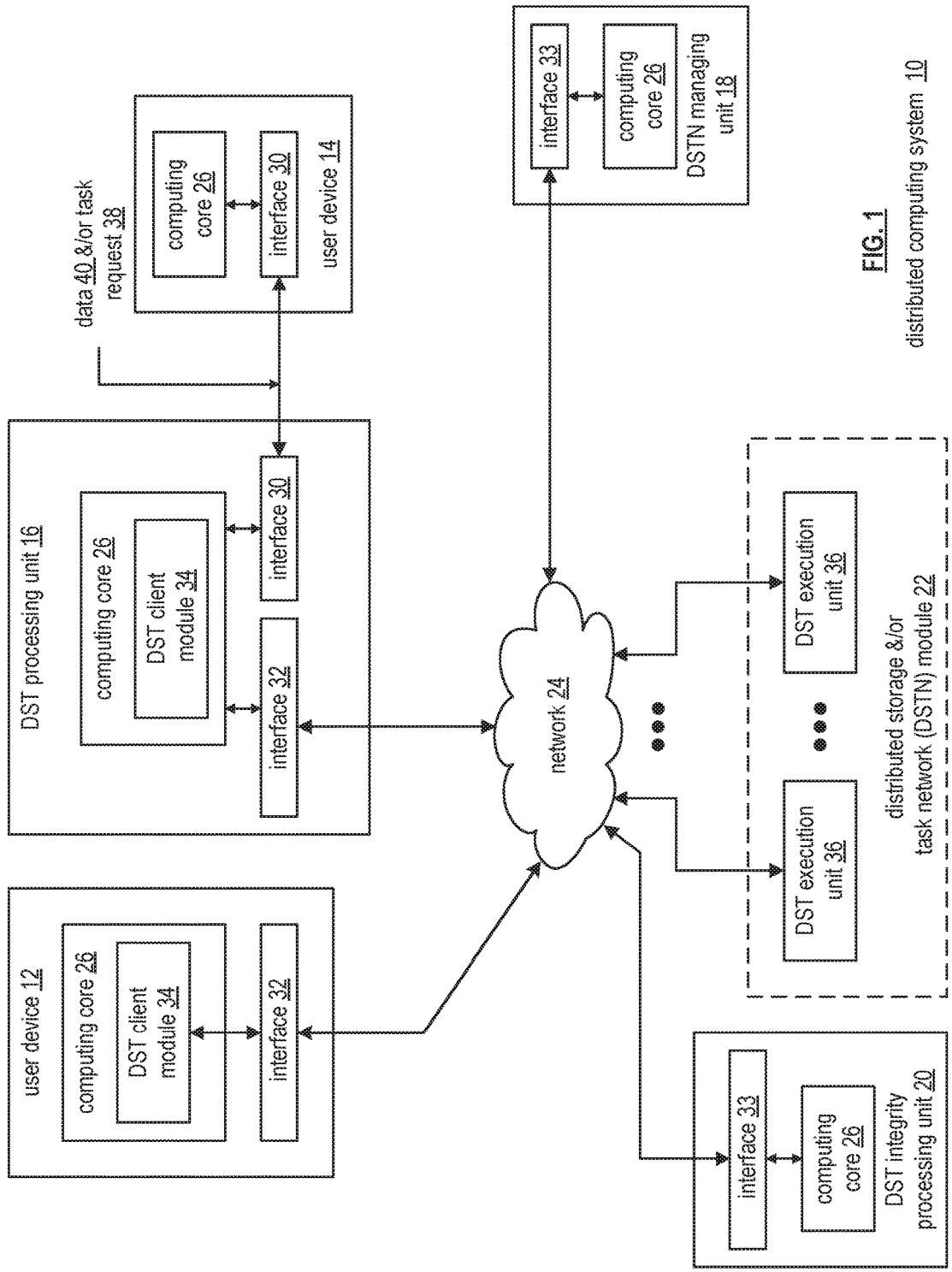
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
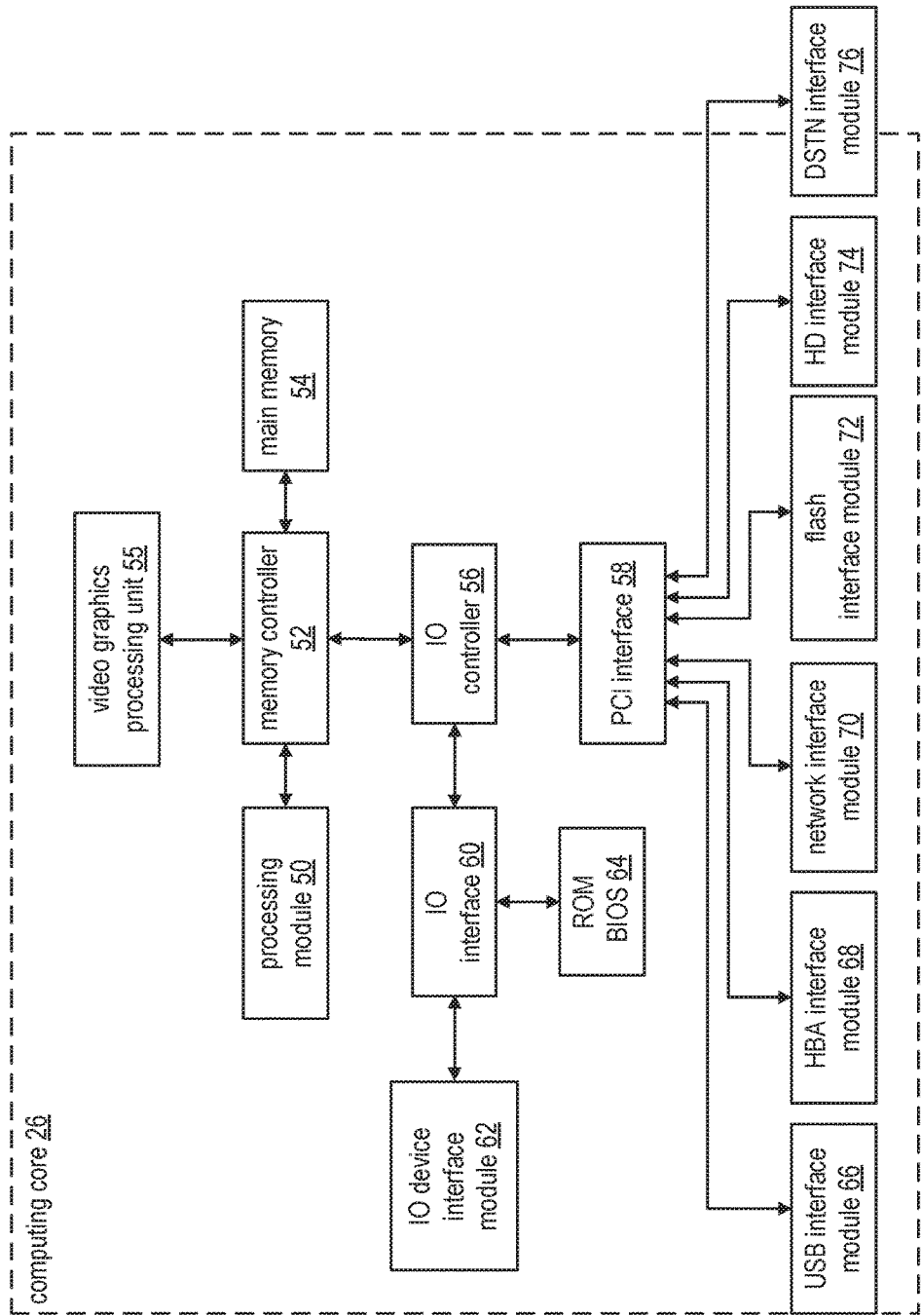
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
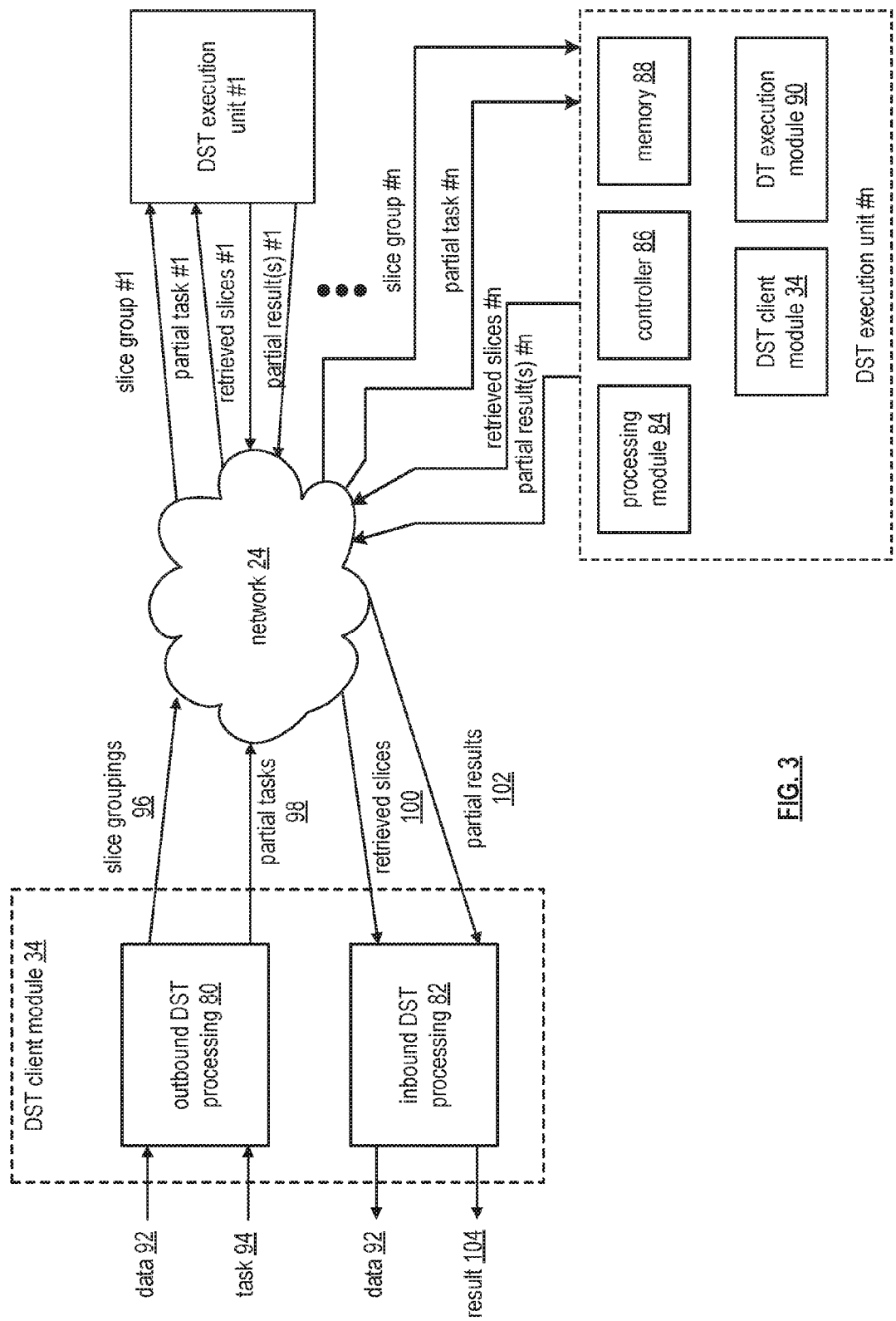
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-*n*.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
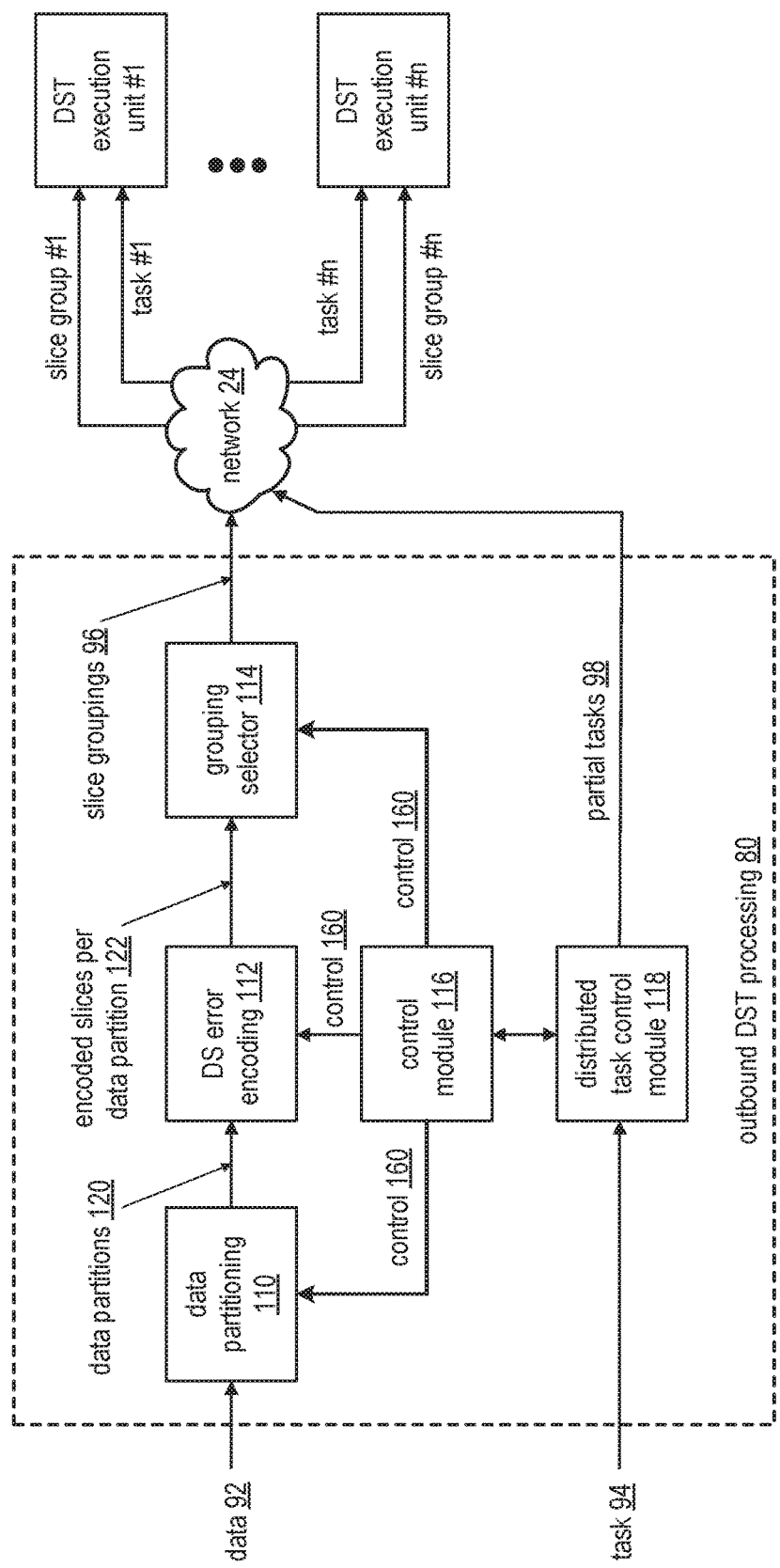
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
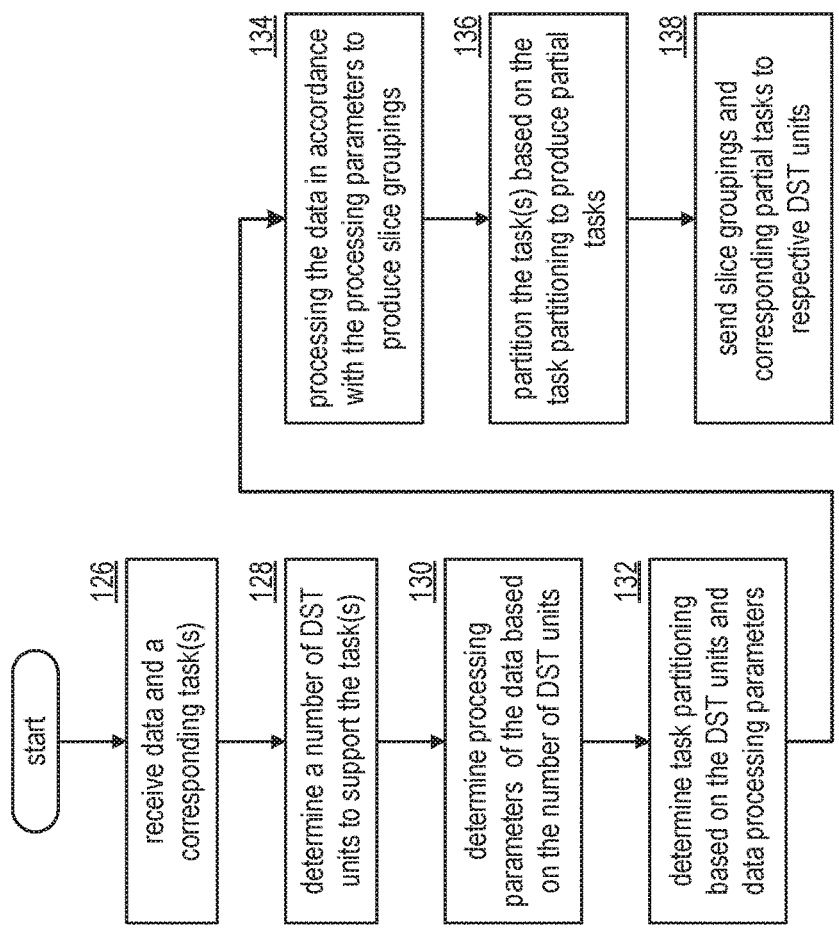
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
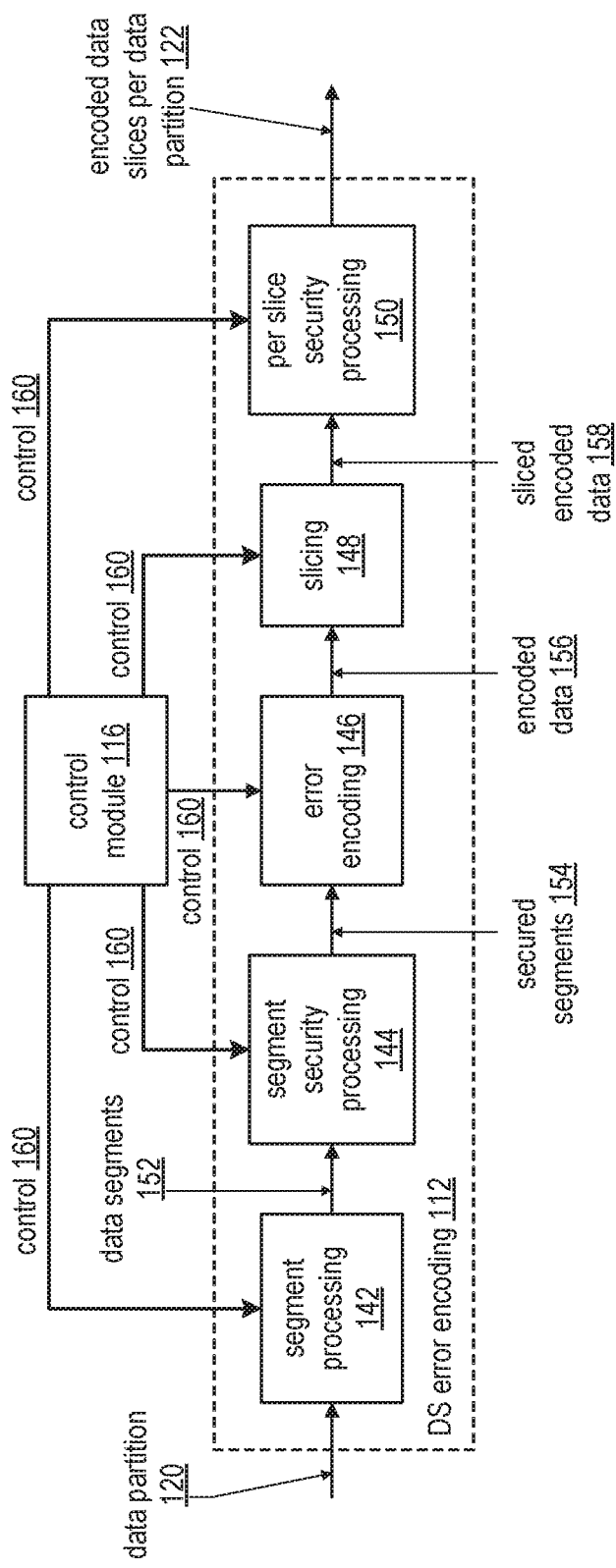
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
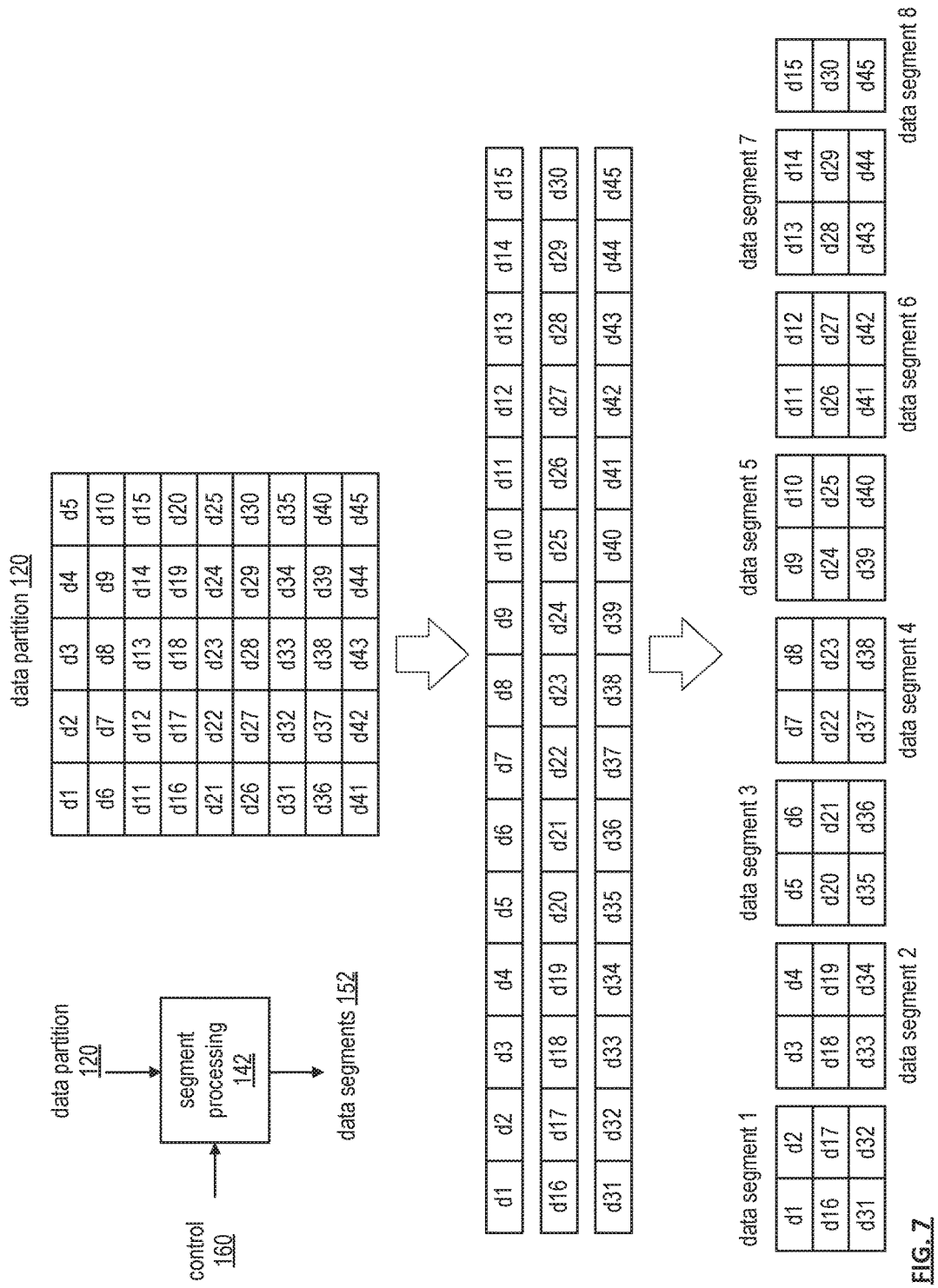
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
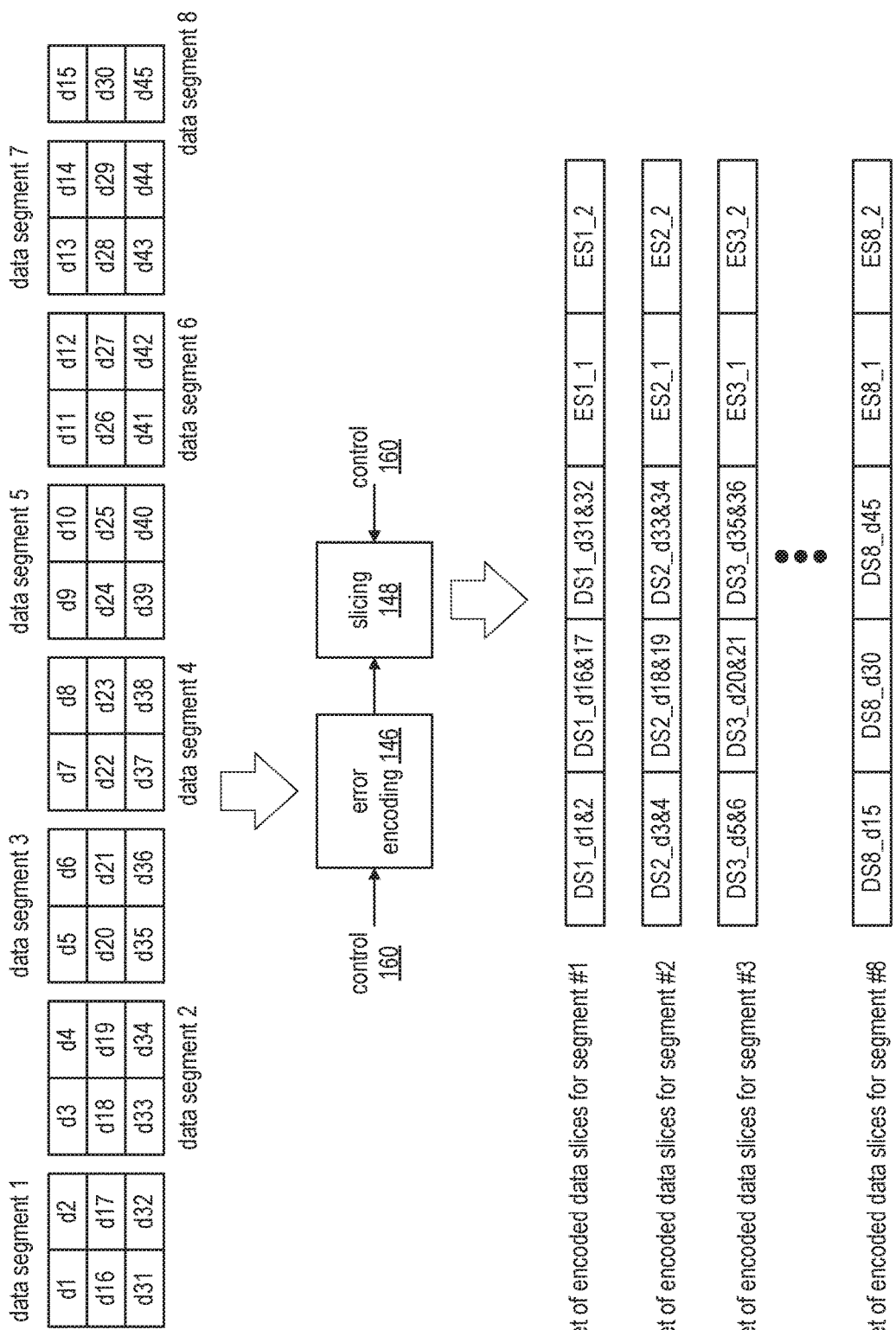
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first—third words of the second data segment.

Figure 9:
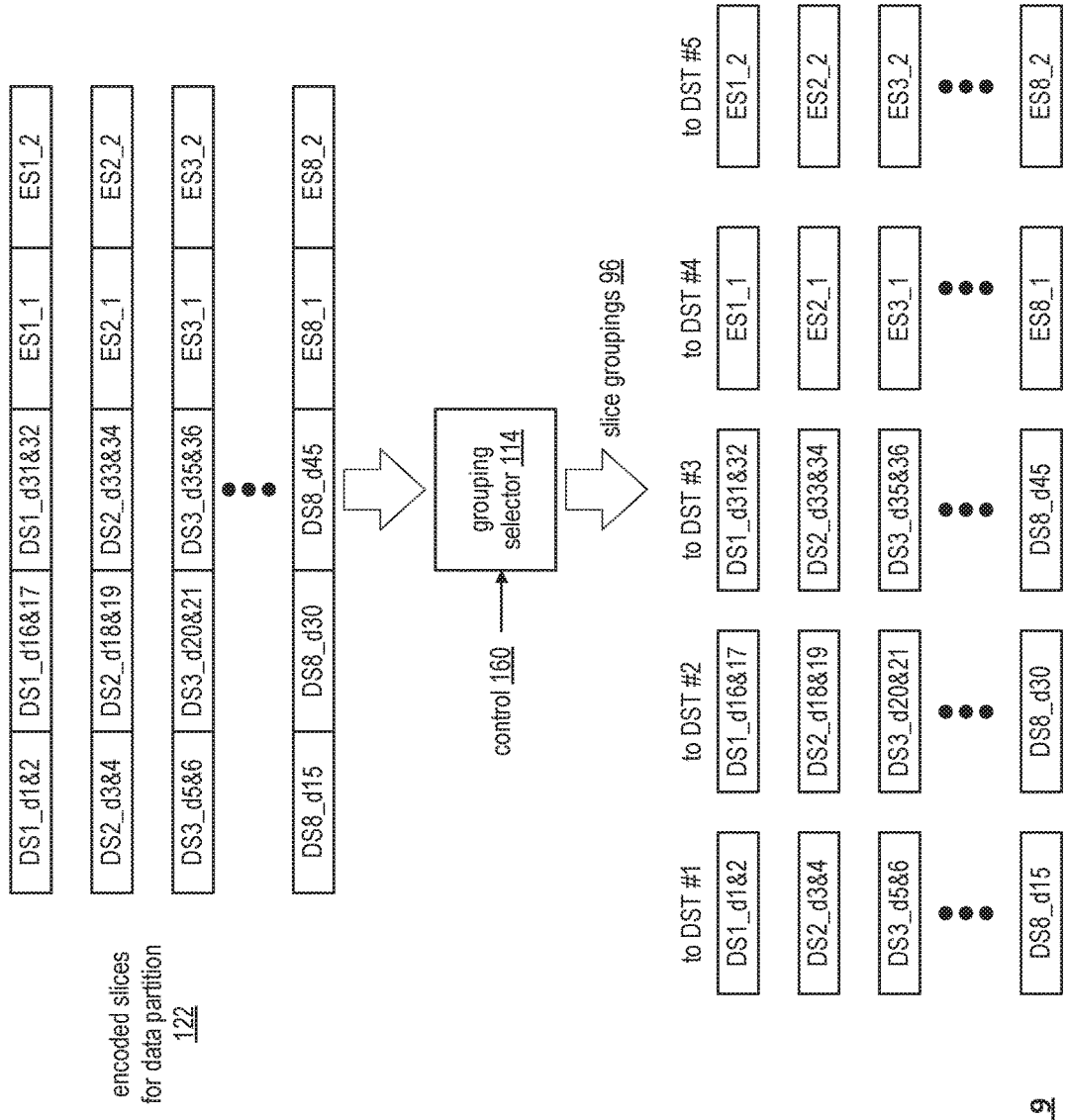
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
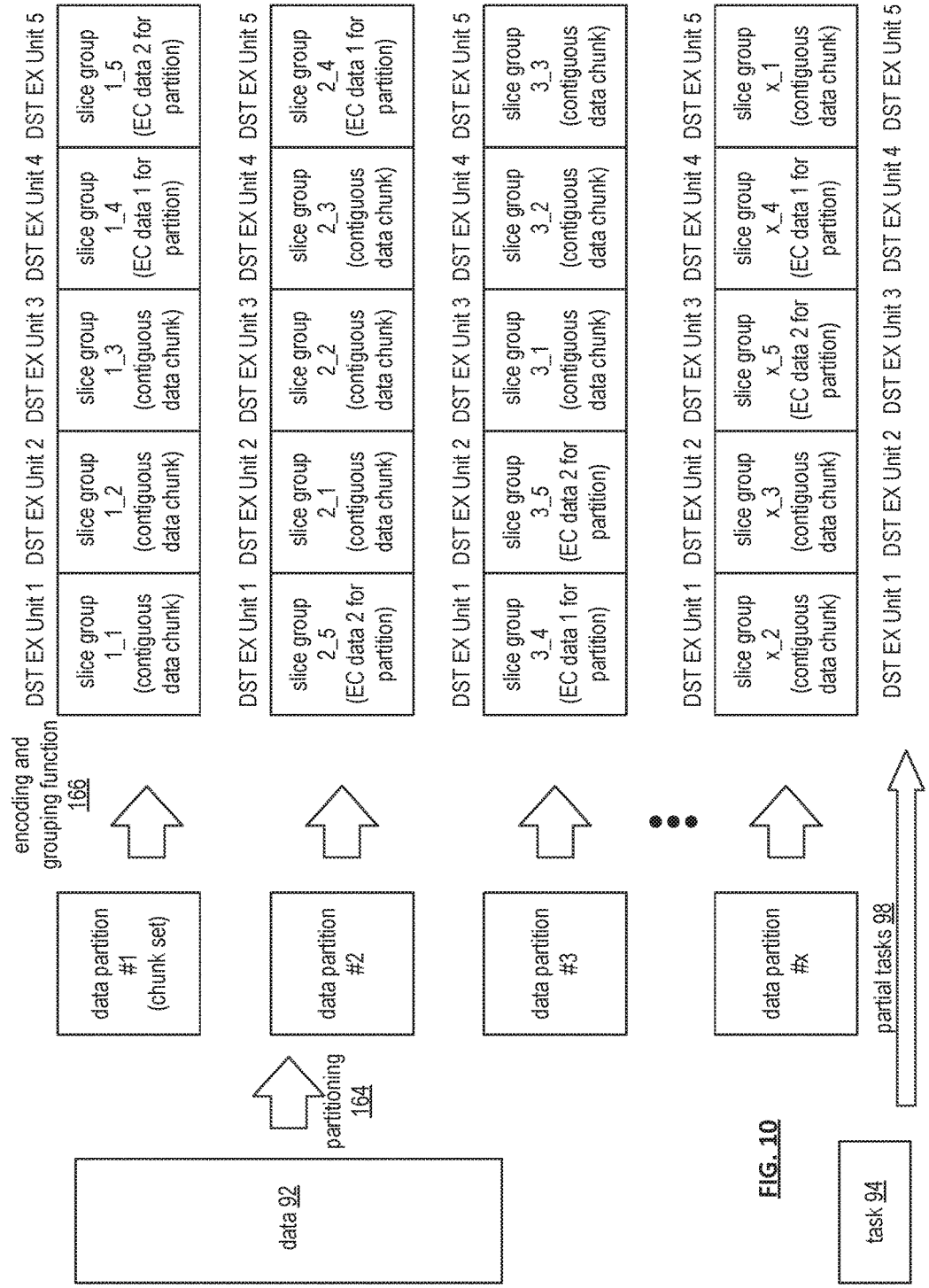
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
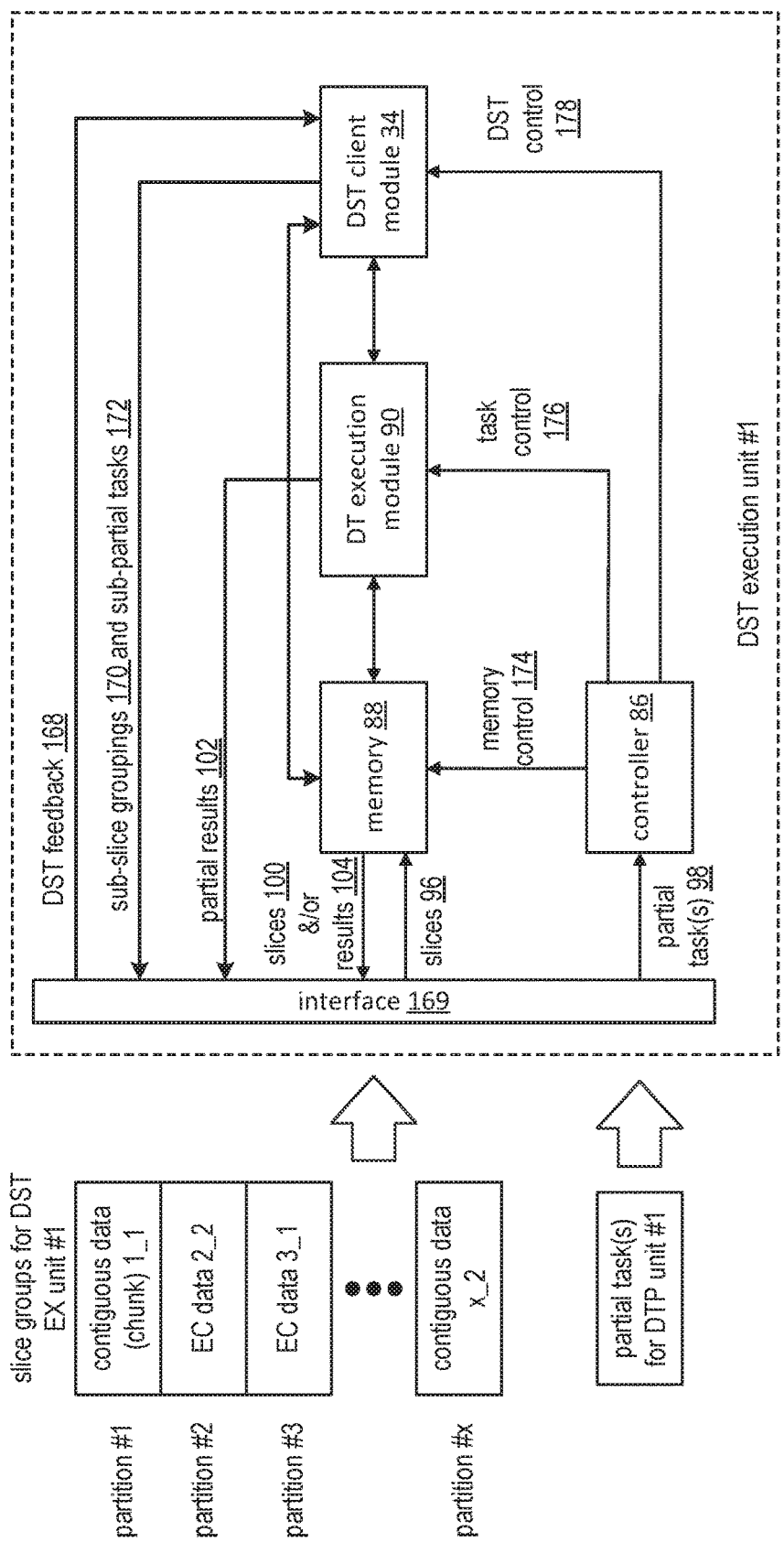
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
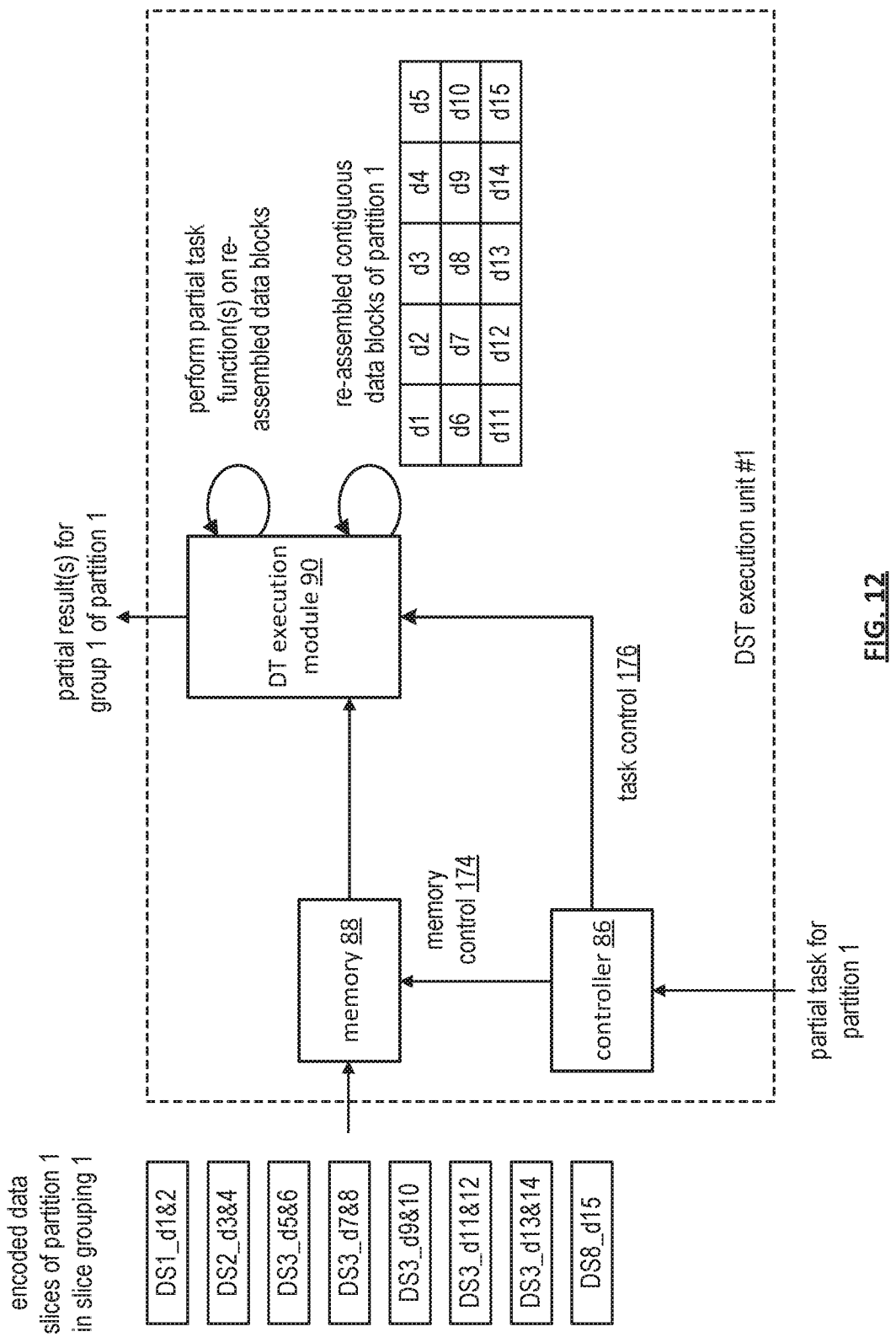
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
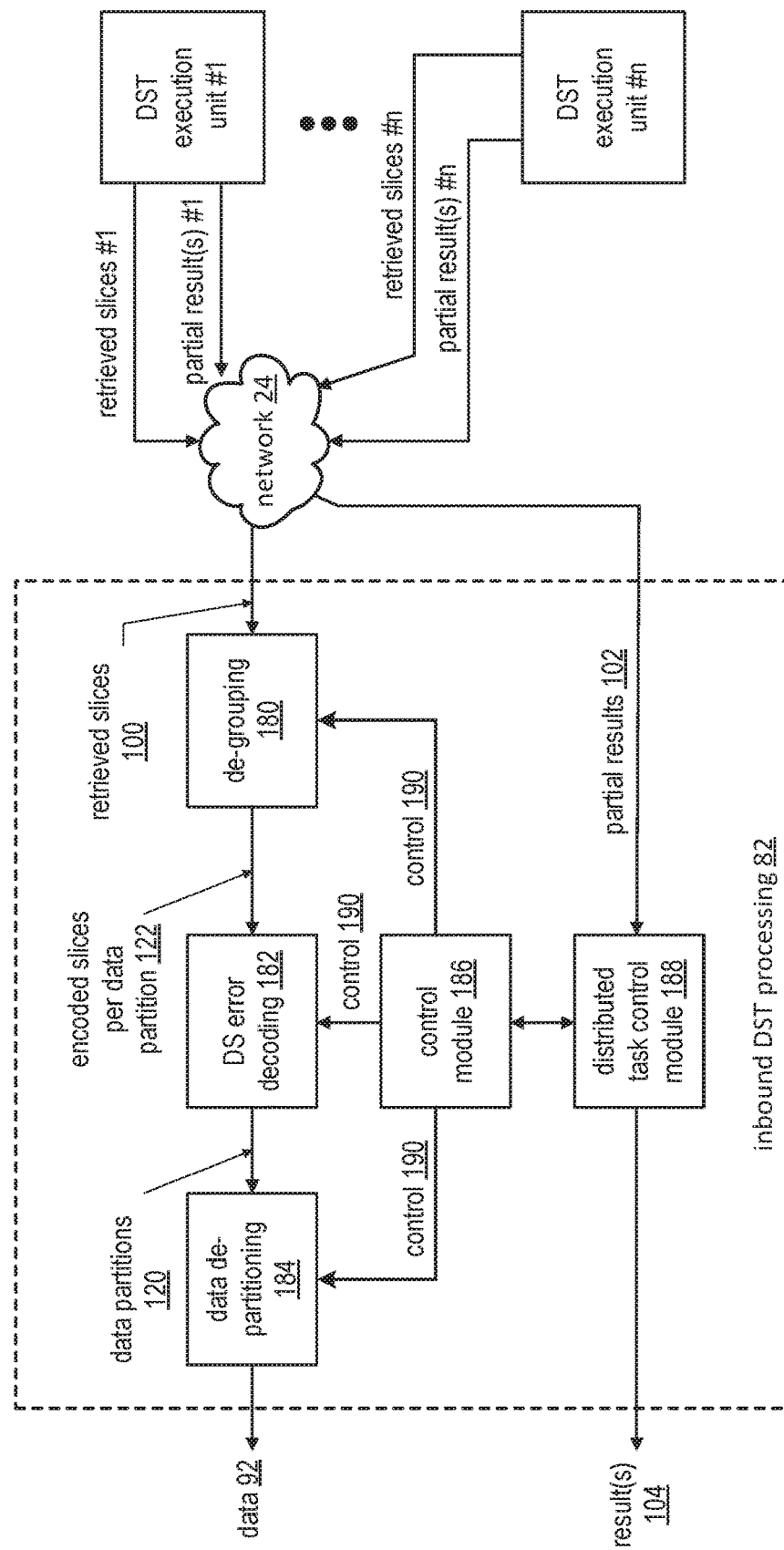
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
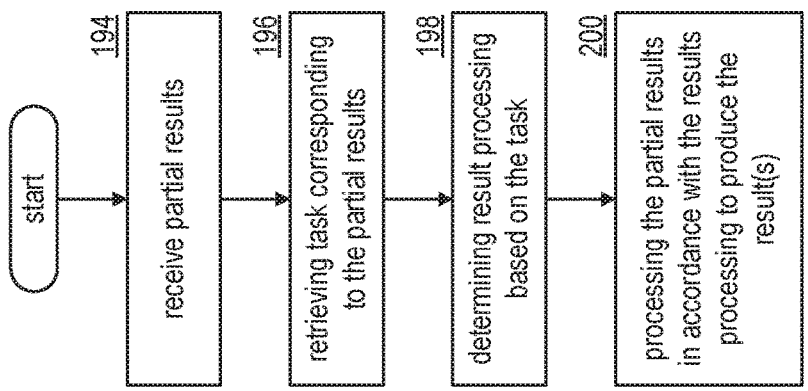
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
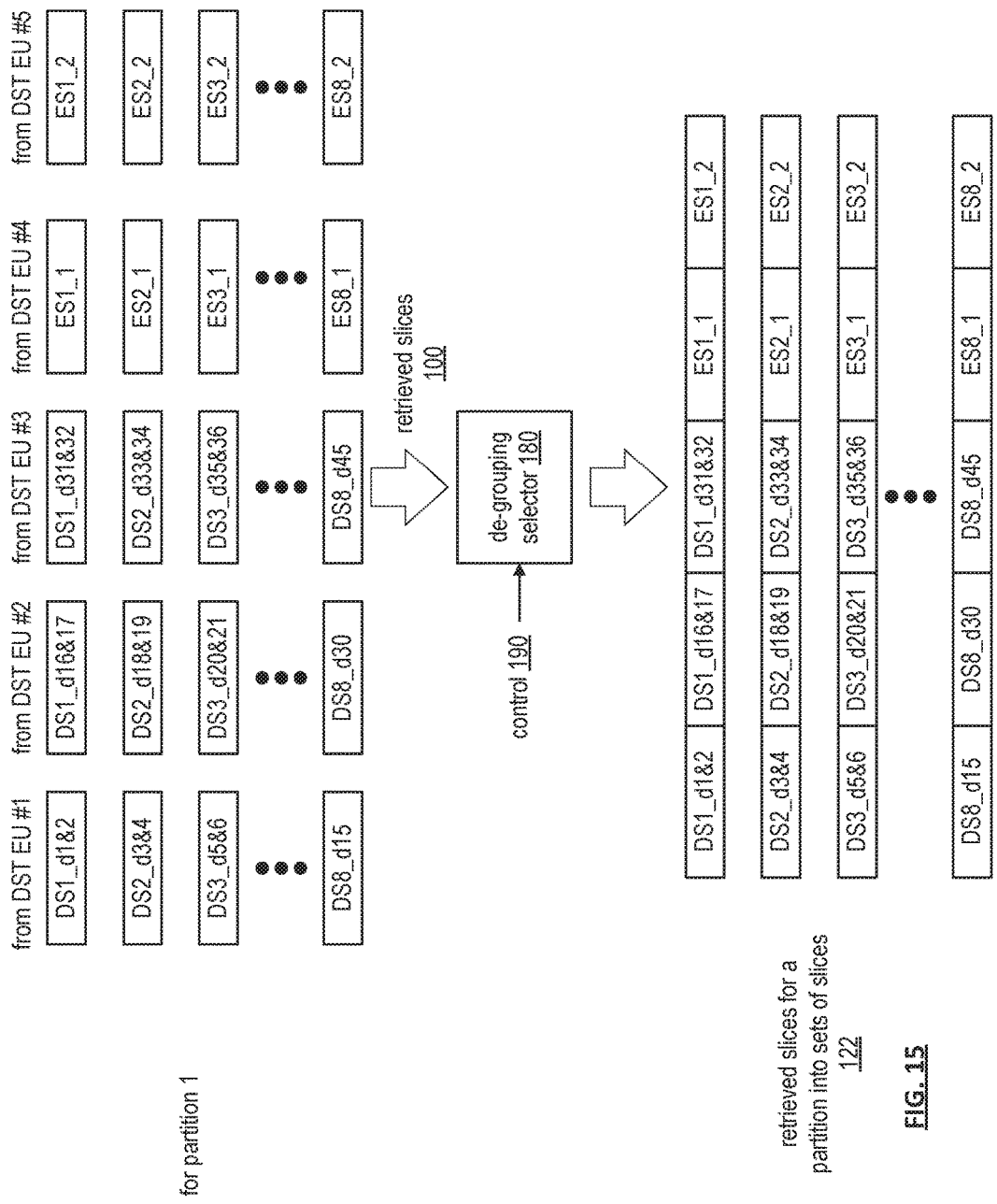
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
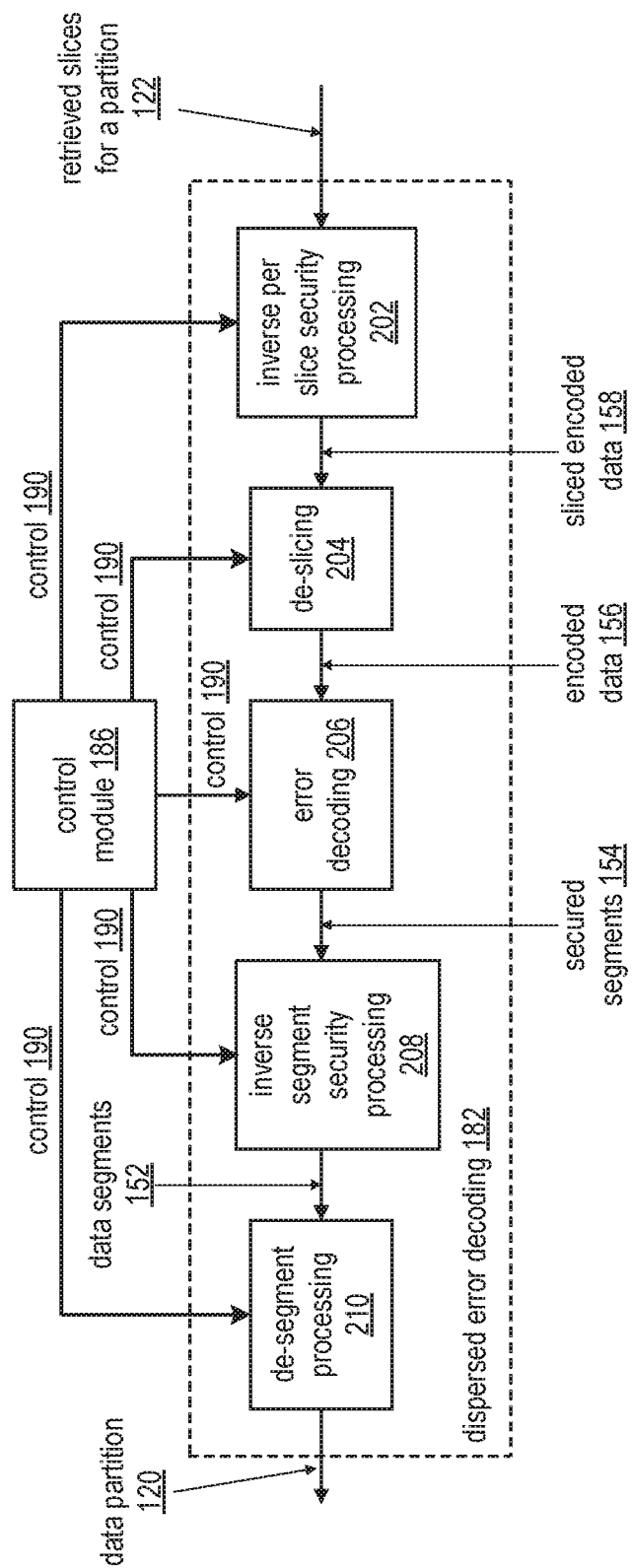
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
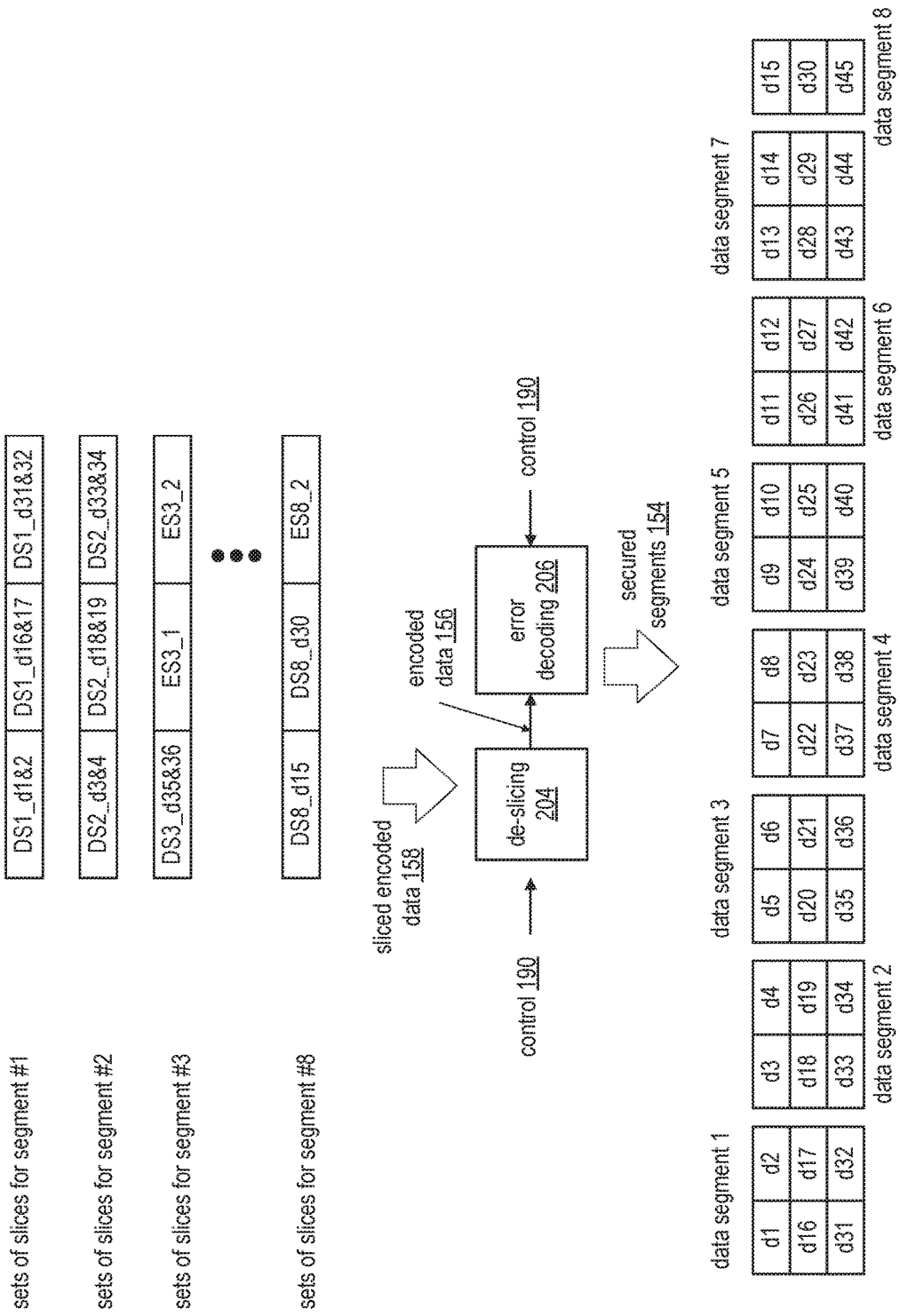
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
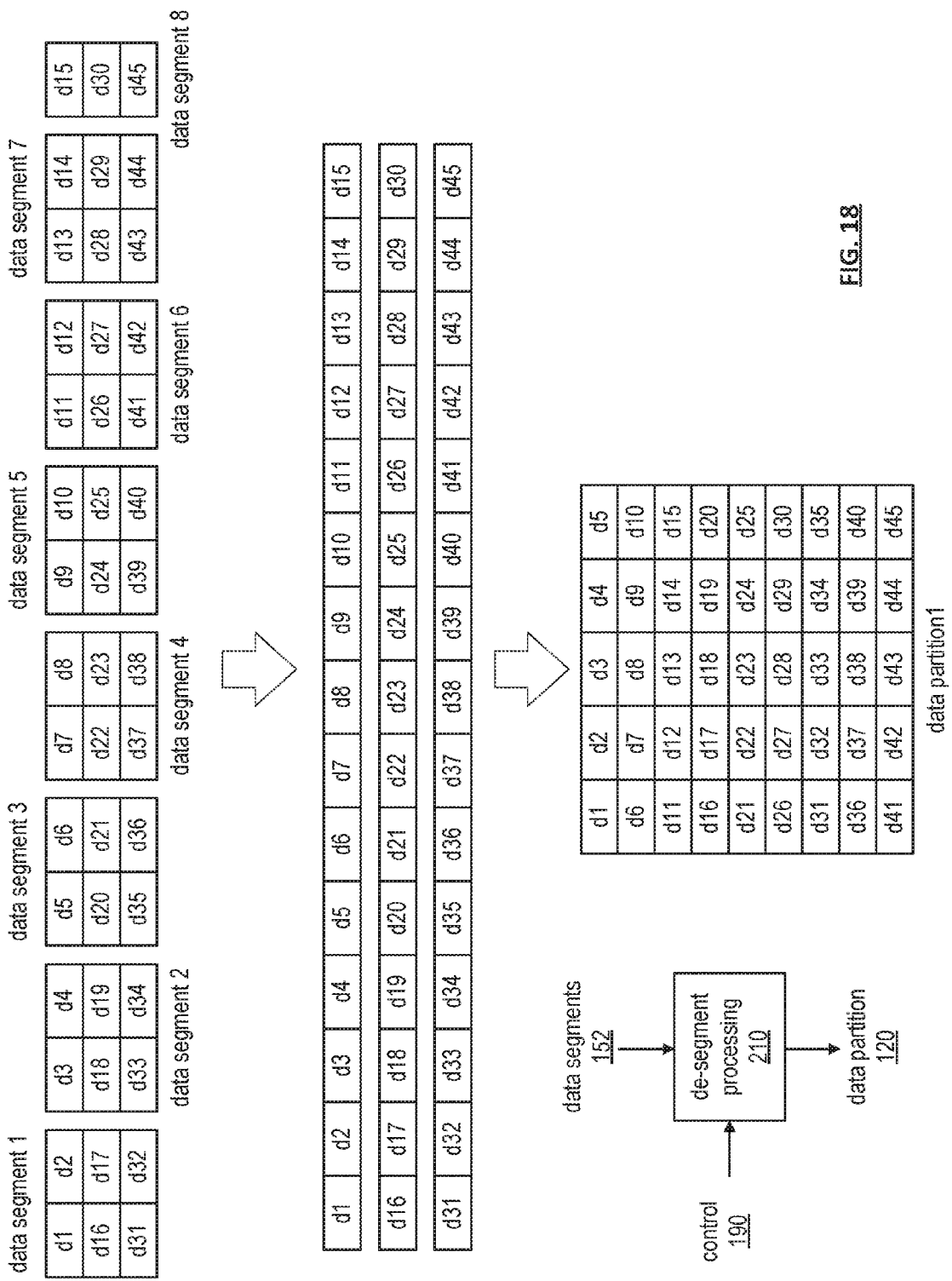
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
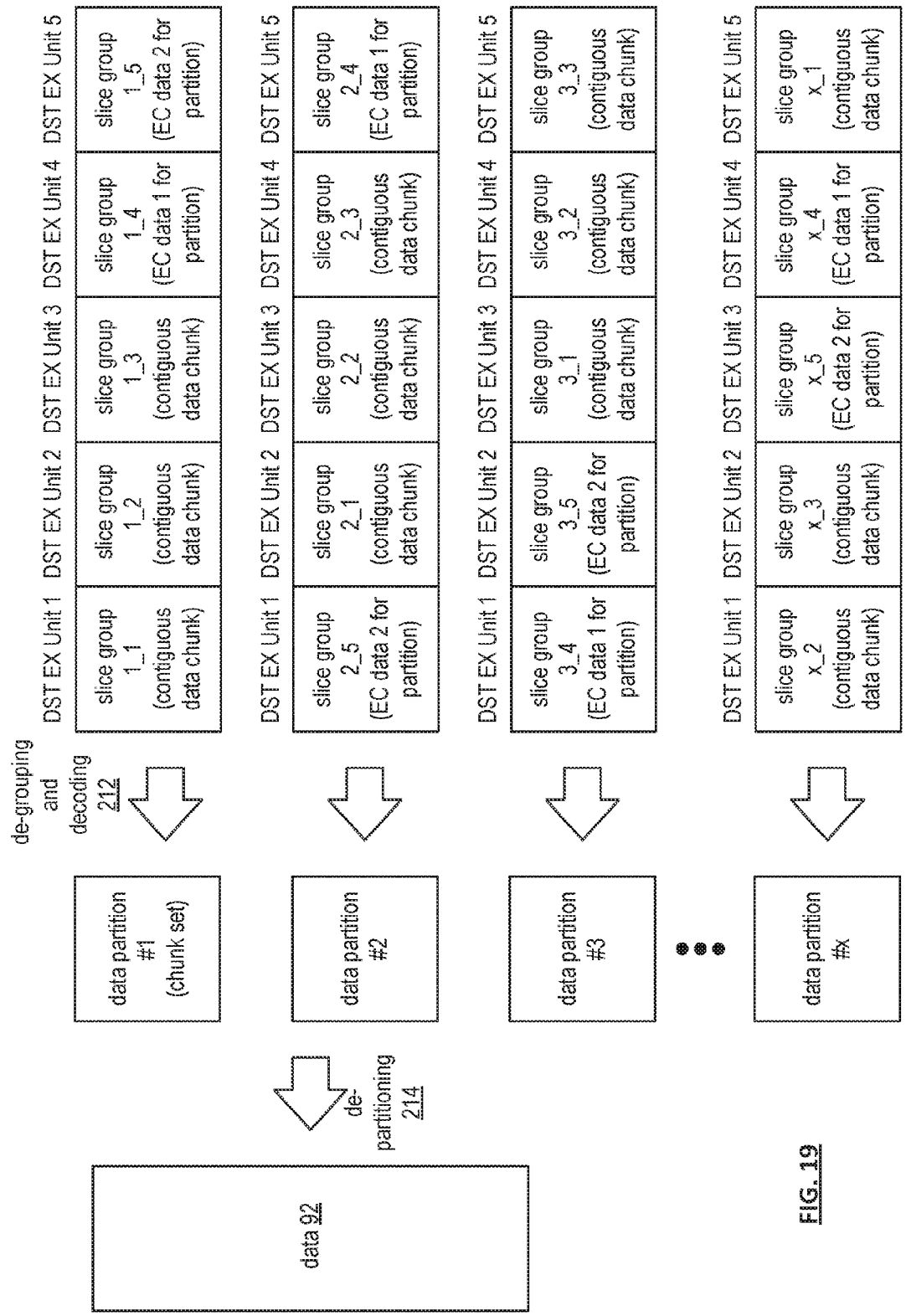
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
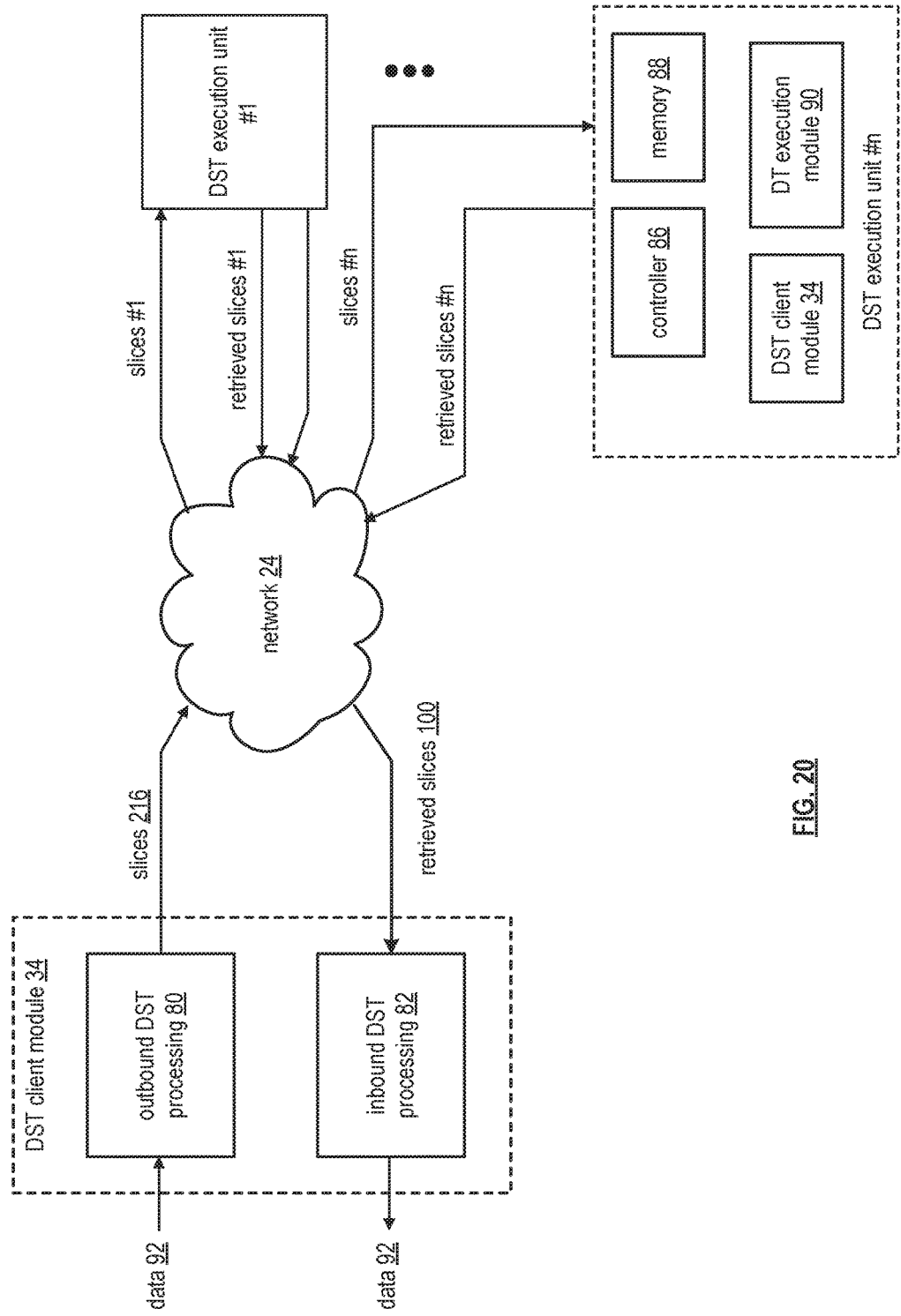
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
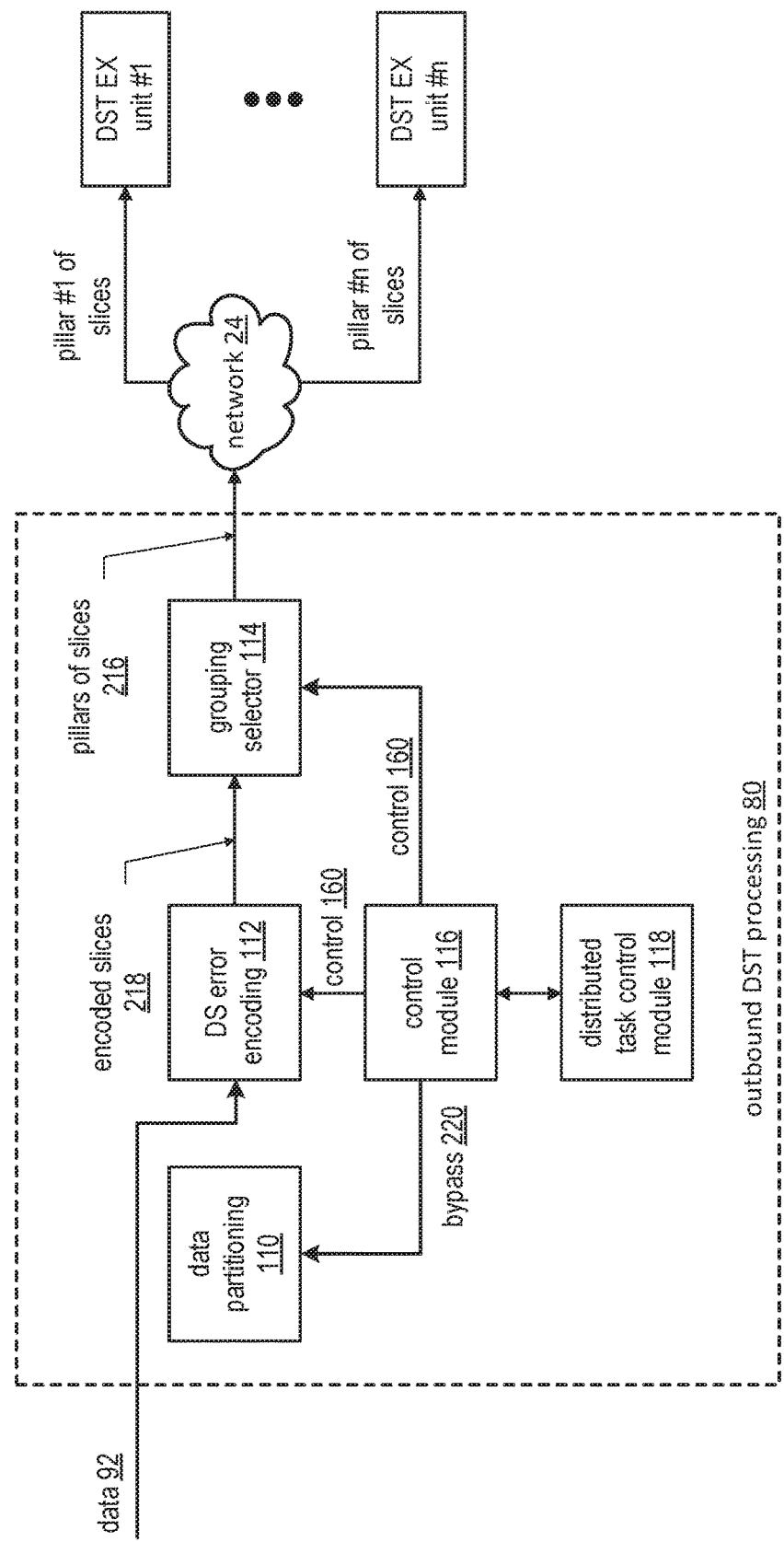
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
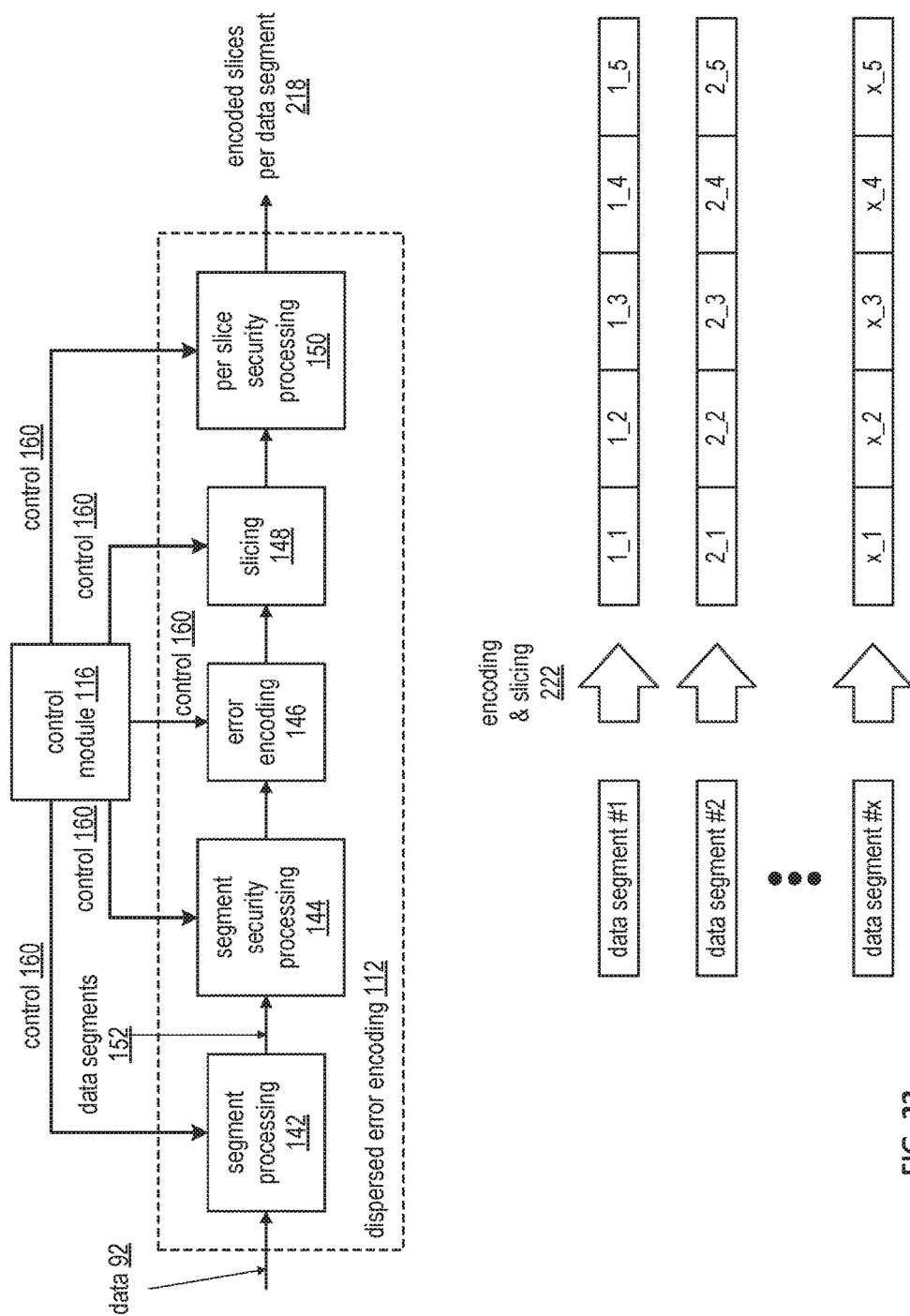
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
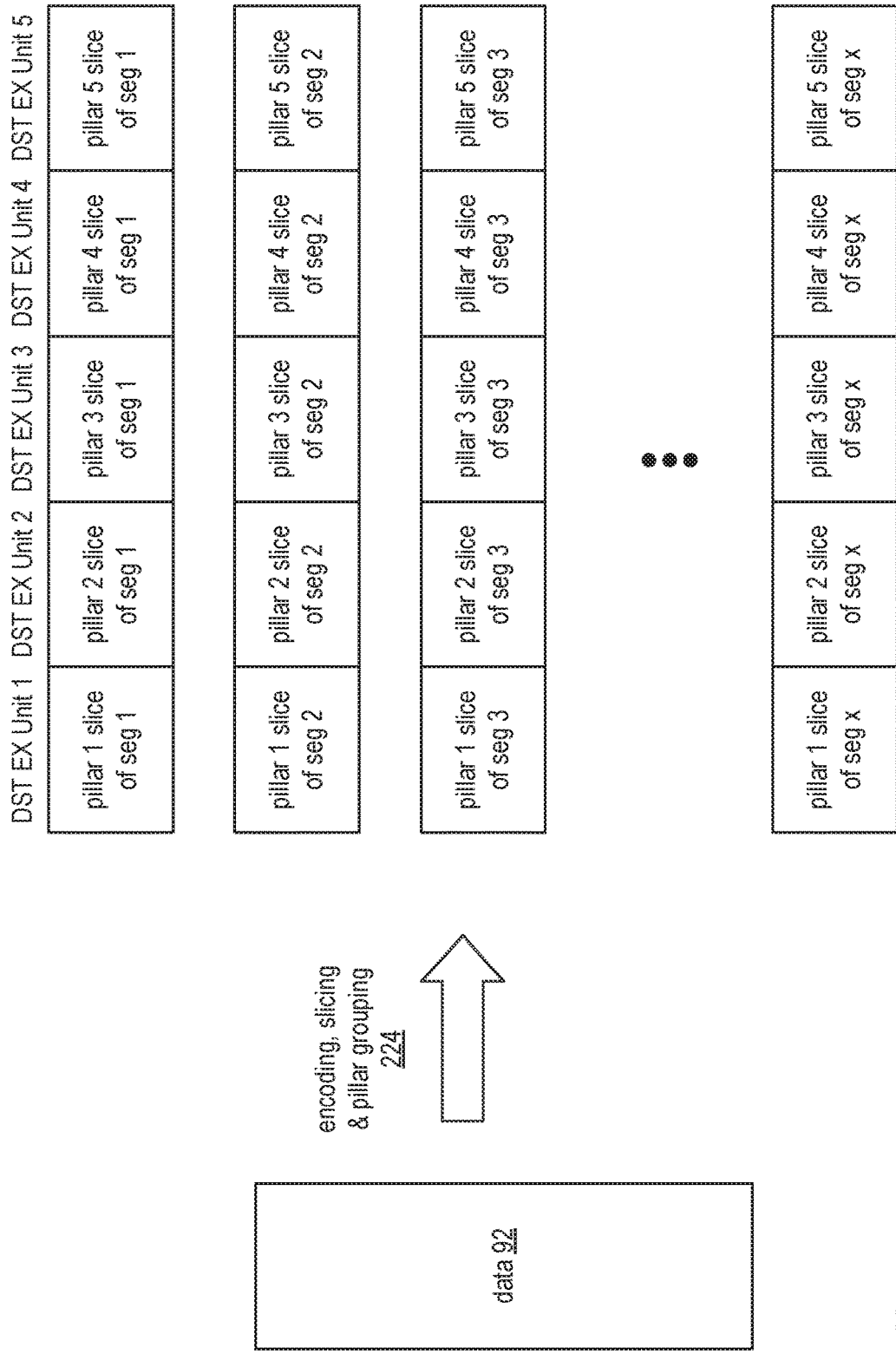
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
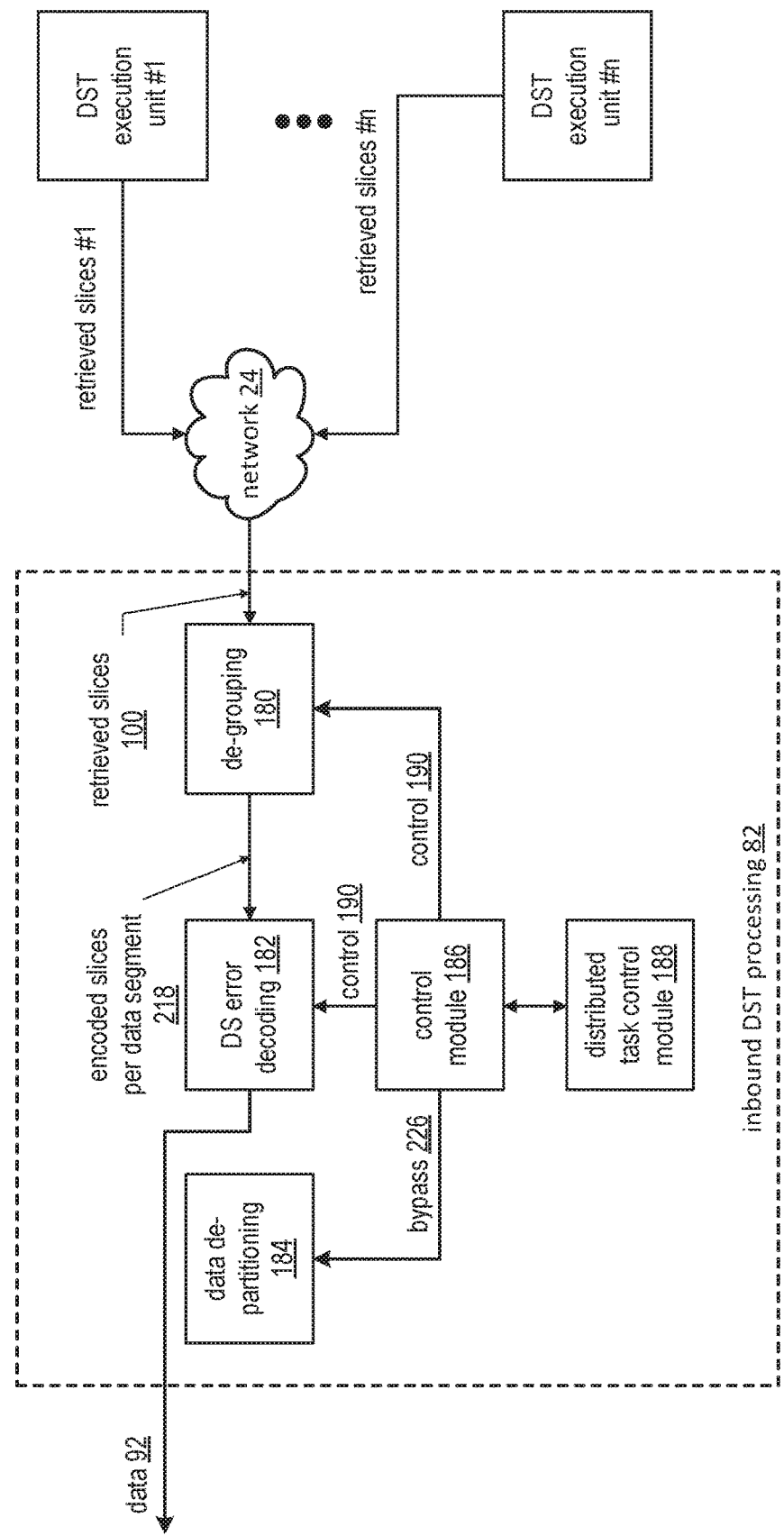
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
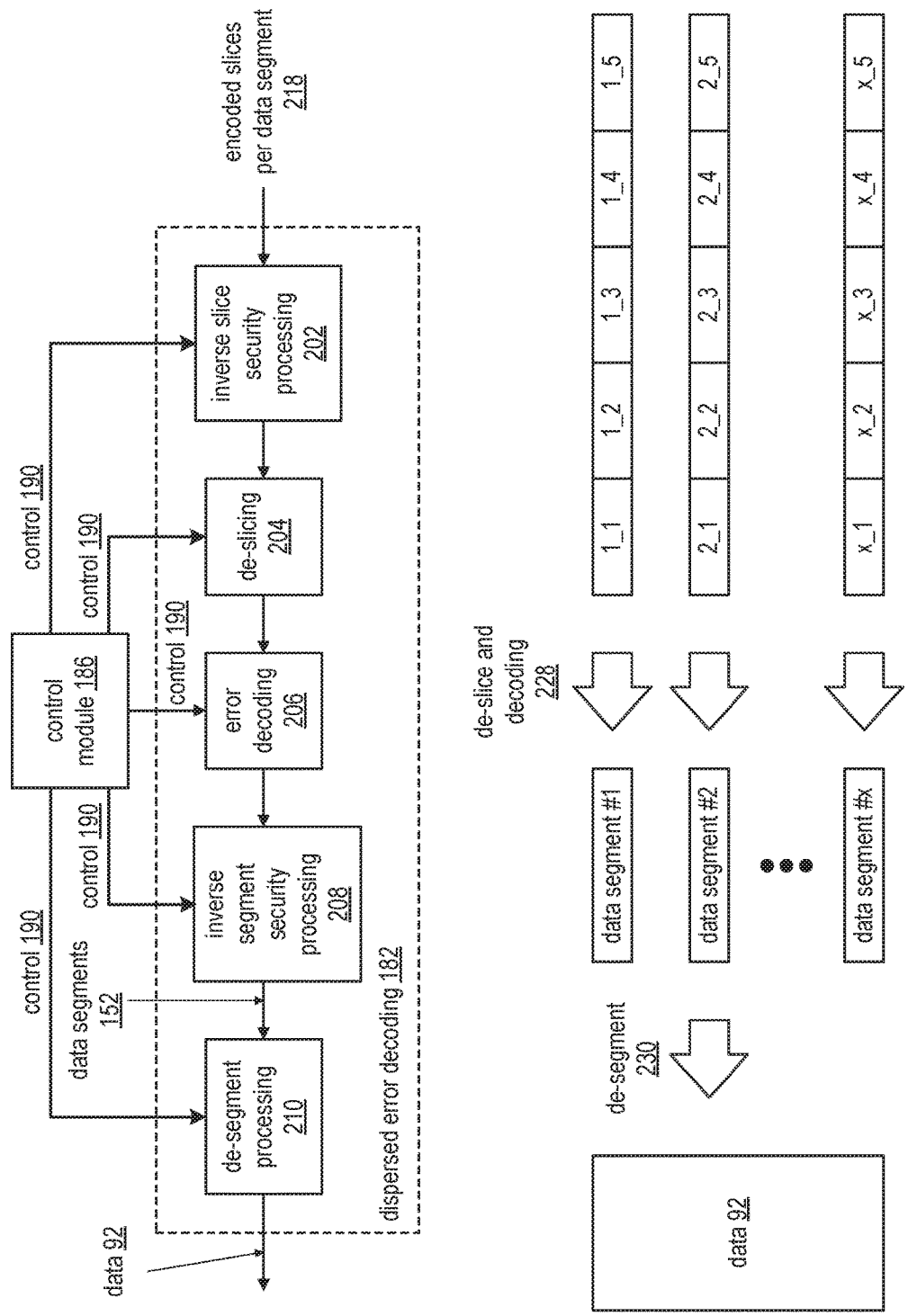
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
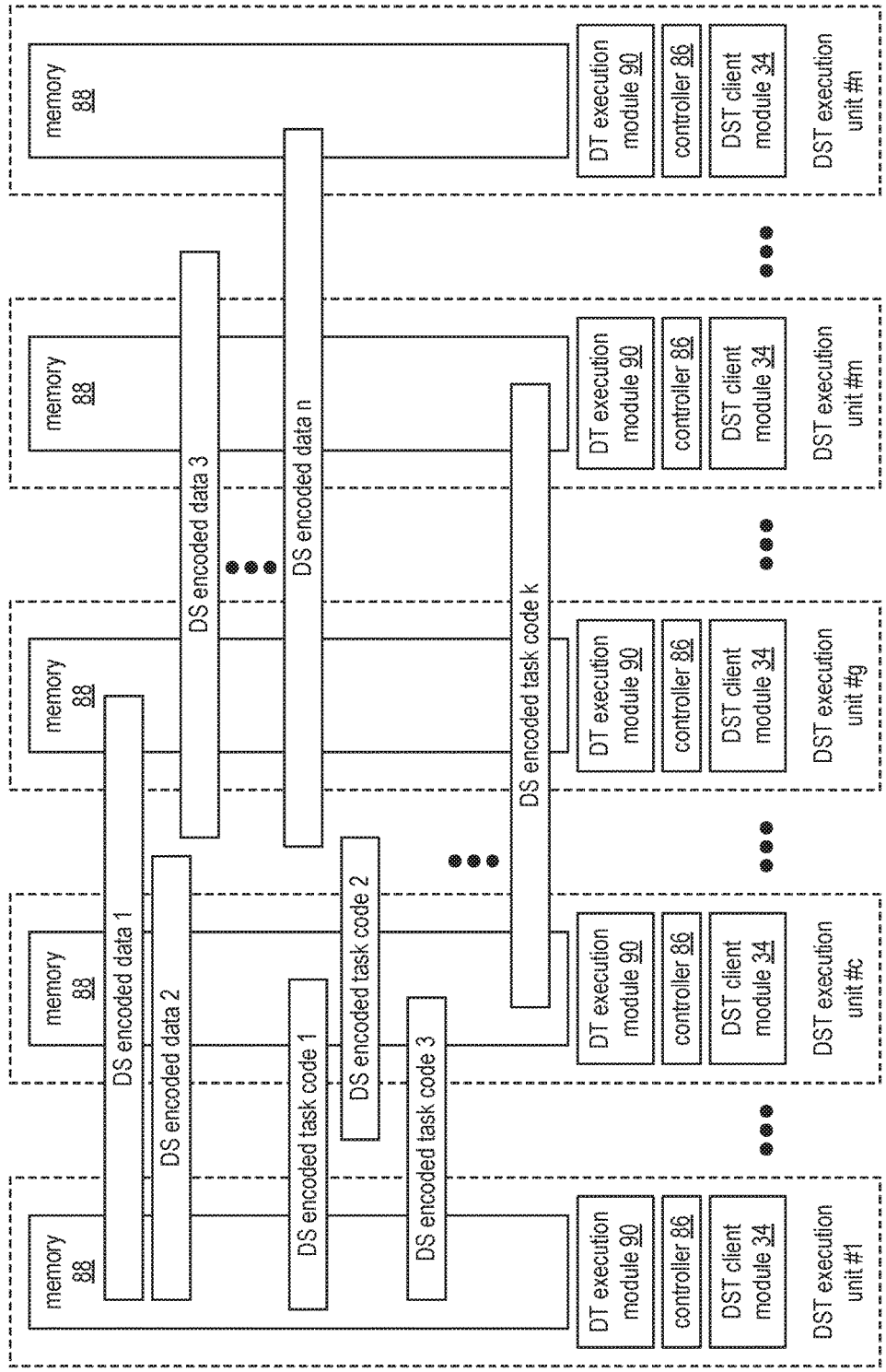
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
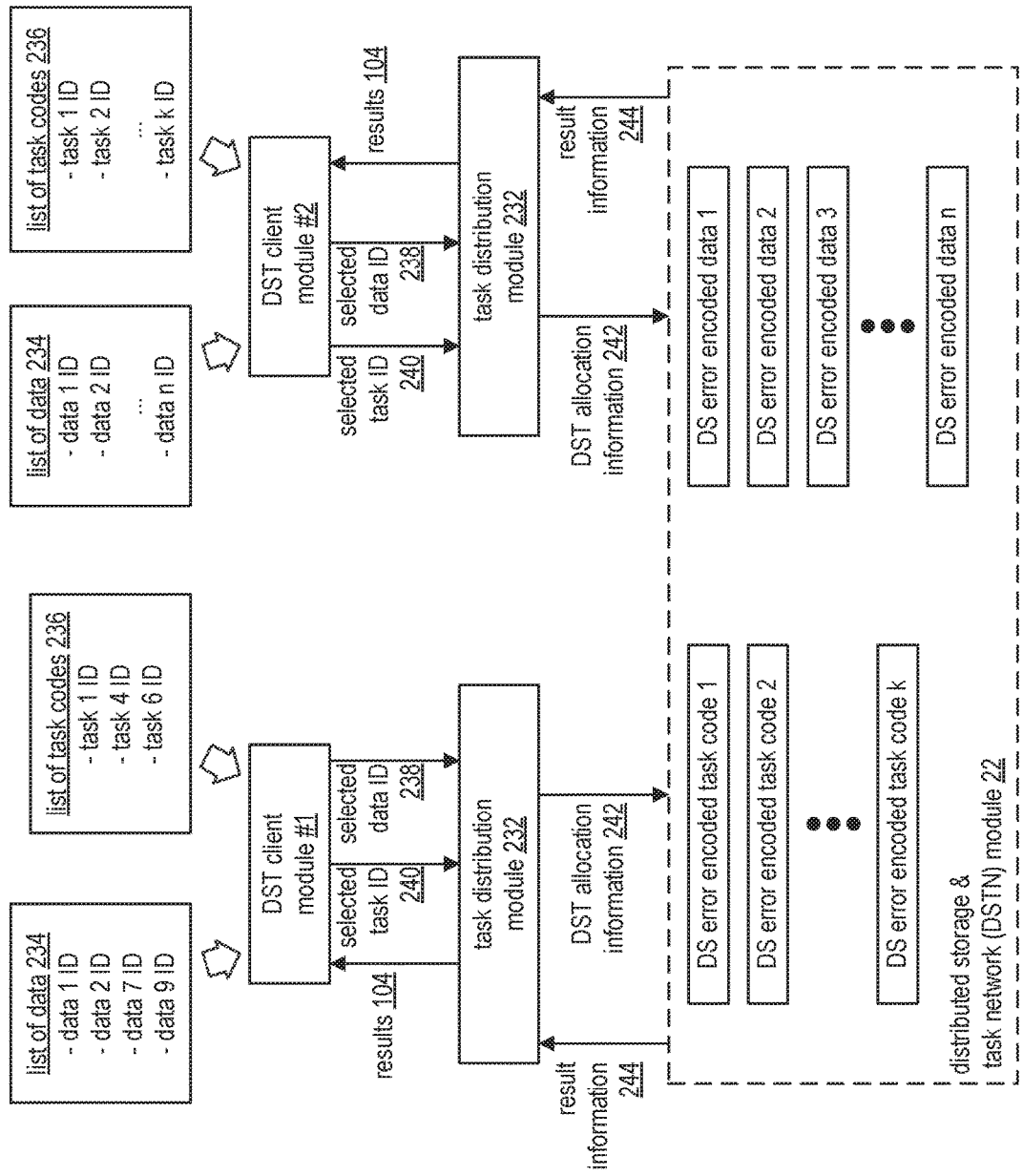
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
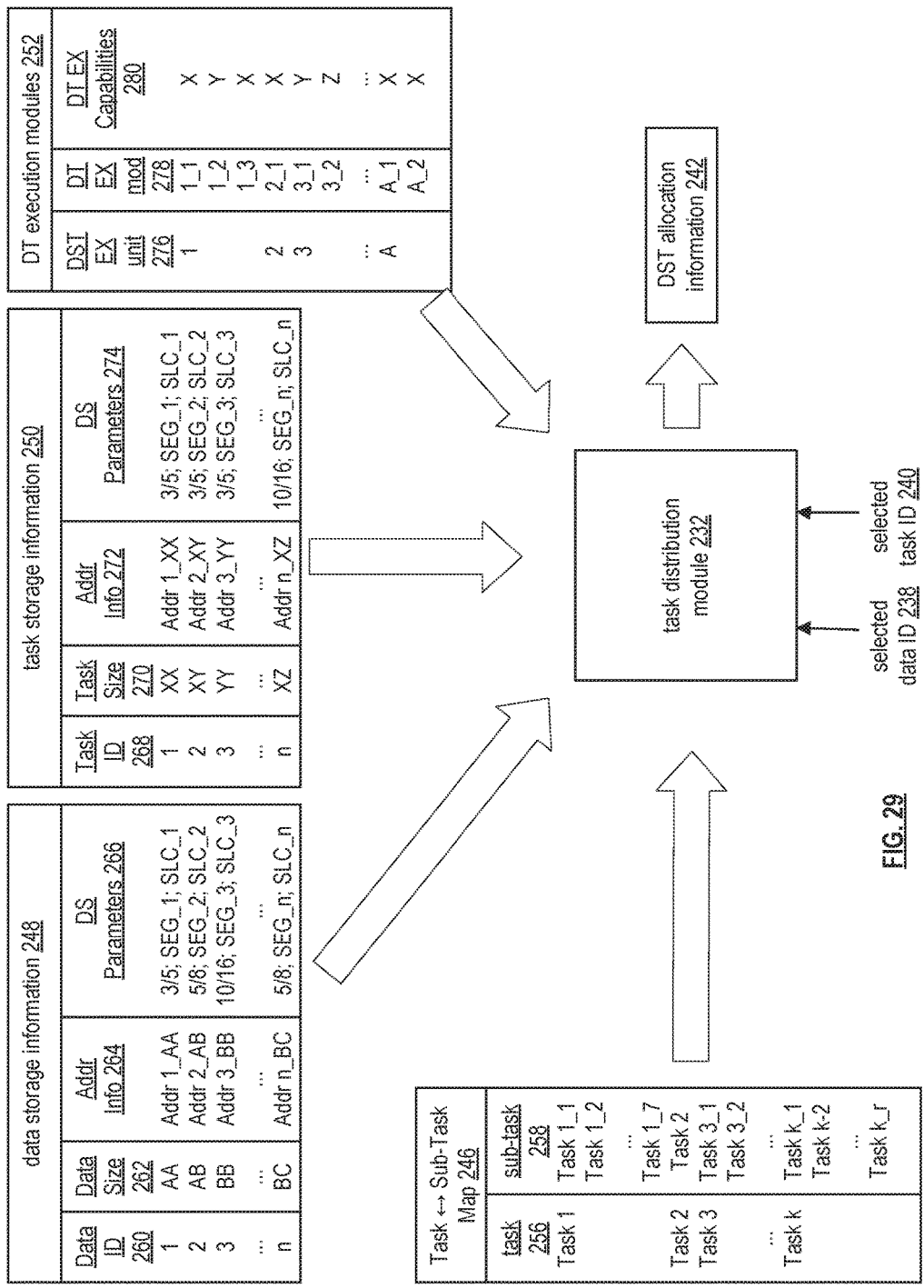
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇆ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
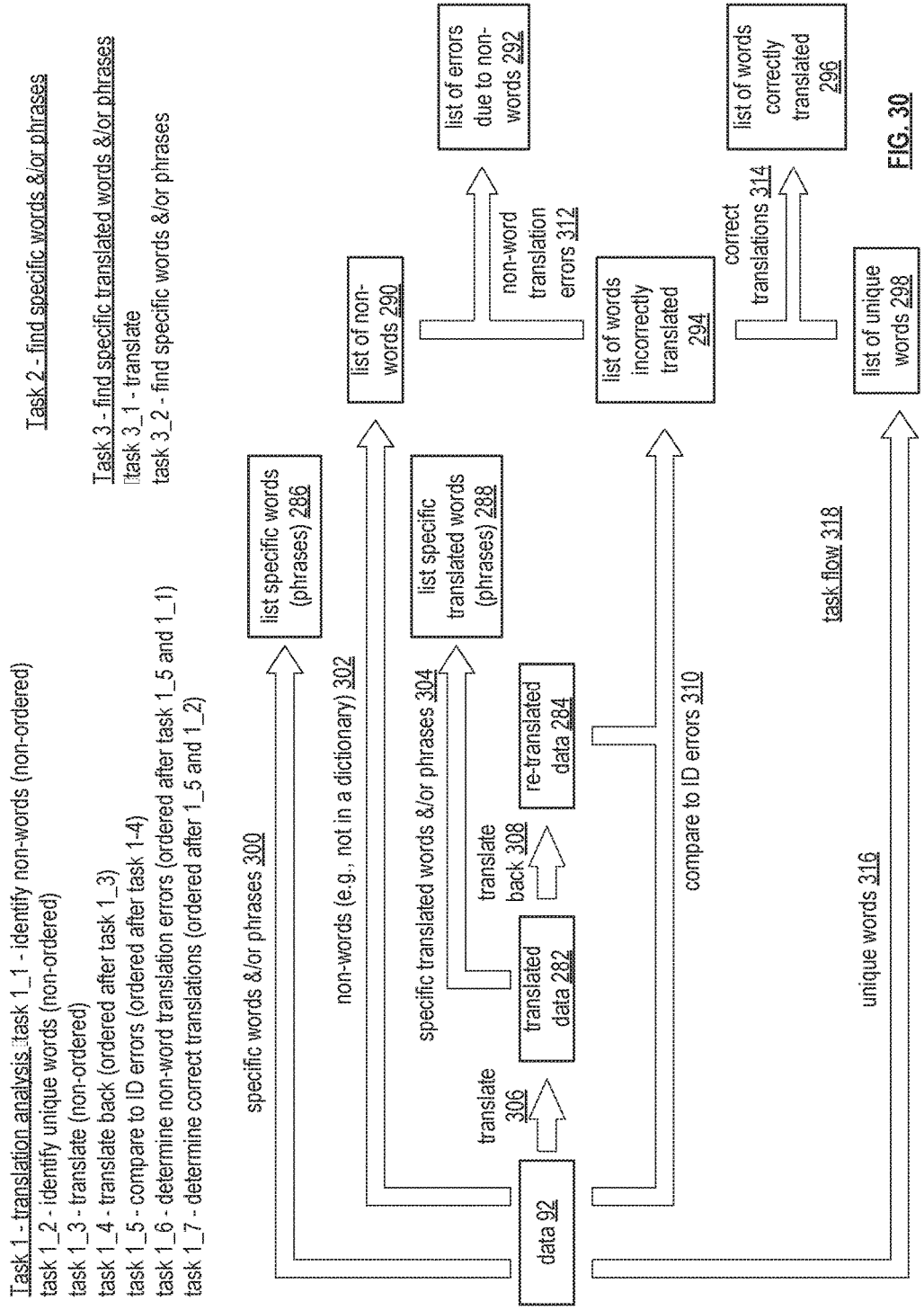
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
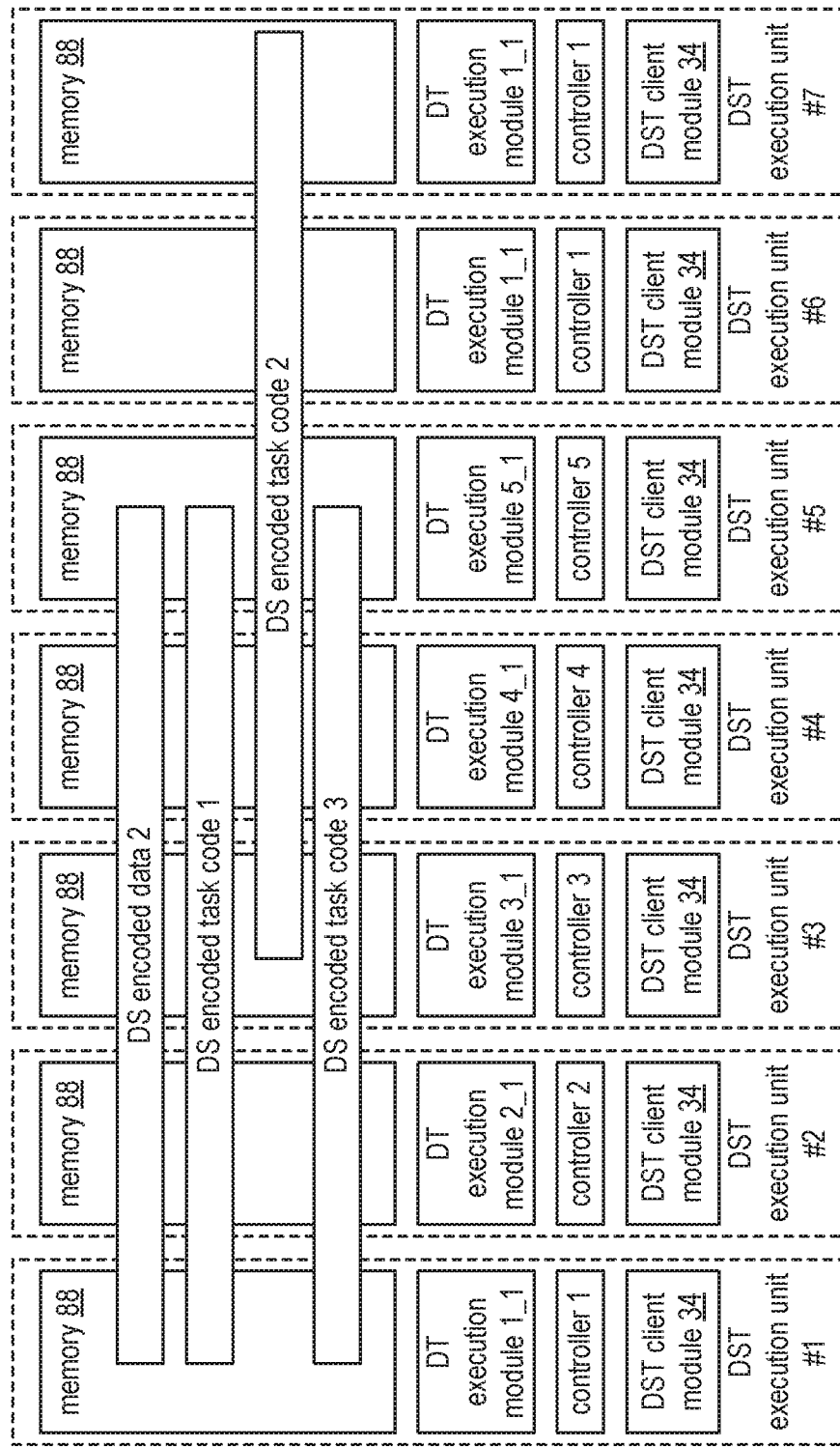
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
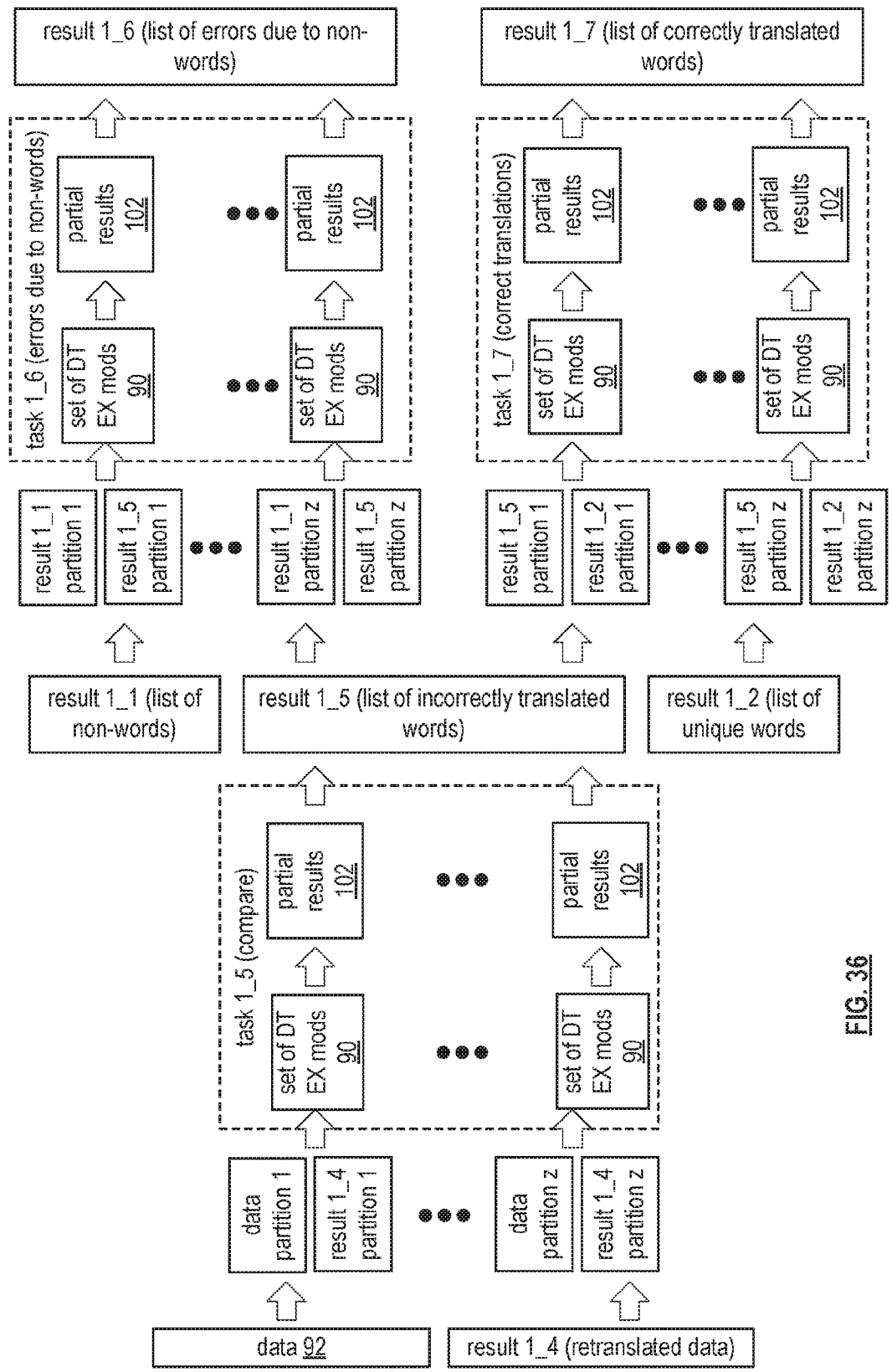

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40:
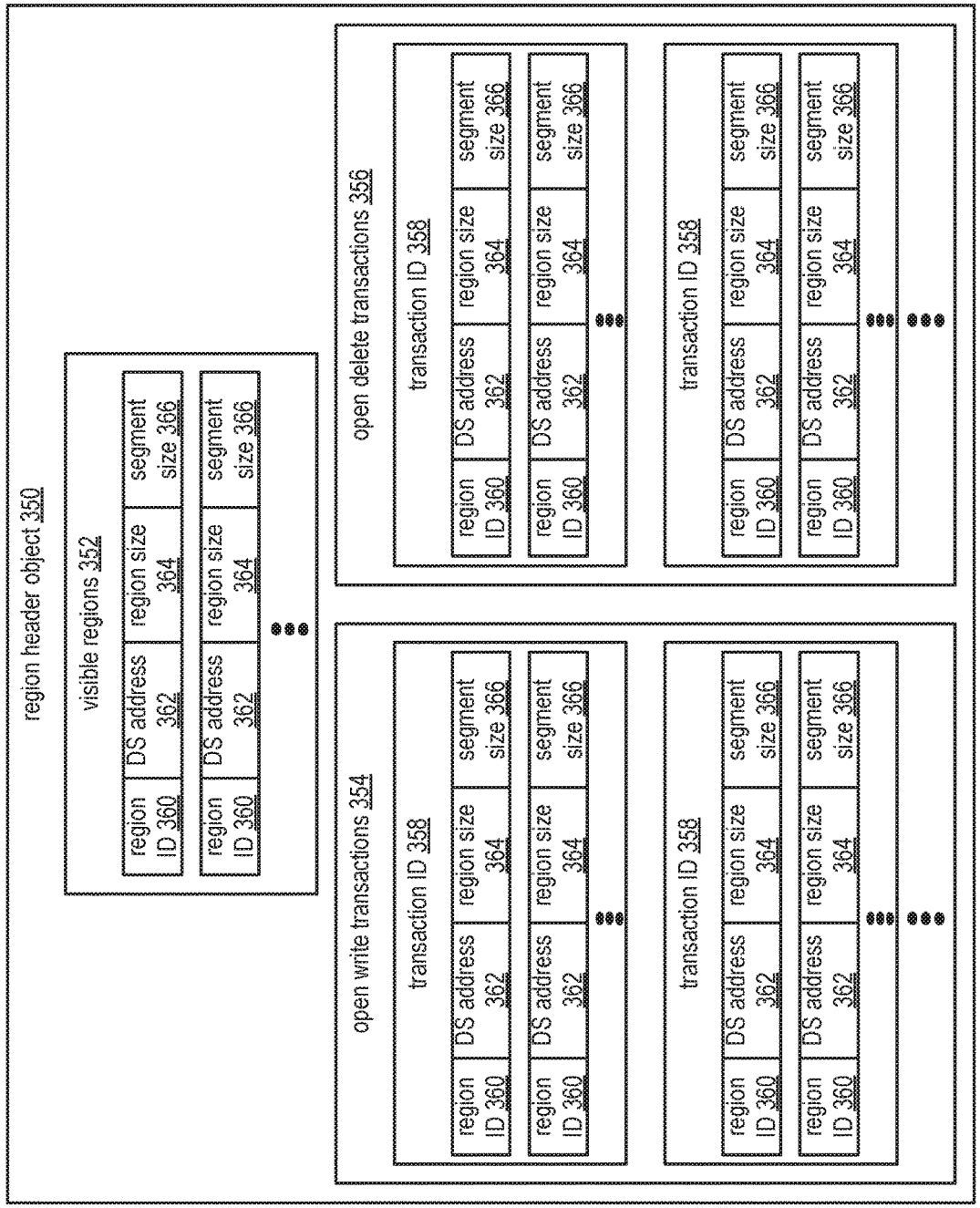
FIG. 40 is a diagram of an embodiment of a structure of a region header object in accordance with the present invention.

FIG. 40 is a diagram of an embodiment of a structure of a region header object 350 that includes a visible regions section 352, an open write transactions section 354, and an open delete transactions section 356. The structure of the region header object is utilized to generate and update the region header object 350. The region header object 350 is associated with a data object that is stored as a plurality of encoded data slices in a dispersed storage network (DSN). The region header object 350 may be utilized to identify a storage location of the data object within the DSN. The data object may be stored as one or more regions within the DSN where each region includes at least one data segment. Each data segment of the plurality of data segments is encoded using a dispersed storage error coding function to produce a set of encoded data slices of the plurality of sets of encoded data slices. For example, a first grouping of sets of encoded data slices is produced corresponding to a first region and a second grouping of sets of encoded data slices is produced corresponding to a second region. Each region of the one or more regions is stored in the DSN at a storage location corresponding to a dispersed storage (DS) address for the region. Each region may be uniquely identified by a region identifier (ID) 360. The region header object 350 is stored in the DSN as a set of header slices at a storage location that includes a region header object DS address. At least one of a directory and an index may be utilized identify the region header object DS address based on an object name (e.g., data ID) for the data object.

The visible regions section 352 identifies visible regions, if any, by a region entry for each region associated with the data object. A region is visible when each data segment of the one or more data segments associated with the region includes at least a write threshold number of favorably committed encoded data slices stored in the DSN. A favorably committed encoded data slice is visible (e.g., available) for retrieving when the encoded data slice has been written to the DSN and is associated with a favorably executed commit request.

A region entry of the visible regions section 352 includes, for each visible region, a region ID field 360, a DS address field 362, a region size field 364, and a segment size field 366. A region ID entry is included in the region ID field 360 to uniquely identify the region. ADS address entry is included in the DS address field 362 to identify a storage location of a first data segment of the one or more data segments associated with the region. For example, the DS address entry identifies a source name for a first data segment. Source names corresponding to other data segments of the one or more data segments of the region may be generated based on the source name for the first data segment (e.g., incrementing a segment field entry by one for each sequential data segment of the one or more data segments of the region). A region size entry of the region size field 364 indicates a size of the region (e.g., bytes). A segment size entry of the segment size field 366 indicates a size (e.g., bytes) of each data segment of the one or more data segments of the region. A number of data segments of the one or more data segments of the region may be determined by dividing the region size entry by the segment size entry.

The open write transactions section 354 identifies open write transactions with regards to the data object. An open write transaction includes a write transaction that is in progress for a region but has not yet produced visibility of the region. The open write transaction section 354 includes a subsection for each, if any, transaction that is associated with at least one region of an open write transaction. Each subsection of the open write transaction section includes a transaction identifier (ID) 358 and a region entry for each region associated with the open write transaction.

The open delete transactions section 356 identifies open delete transactions with regards to the data object. An open delete transaction includes a delete transaction that is in progress for a region but has not yet produced full deletion of the region. The open delete transaction section 356 includes a subsection for each, if any, transaction that is associated with at least one region of an open delete transaction. Each subsection of the open delete transaction section 356 includes a transaction identifier (ID) 358 and a region entry for each region associated with the open delete transaction.

Figure 41:
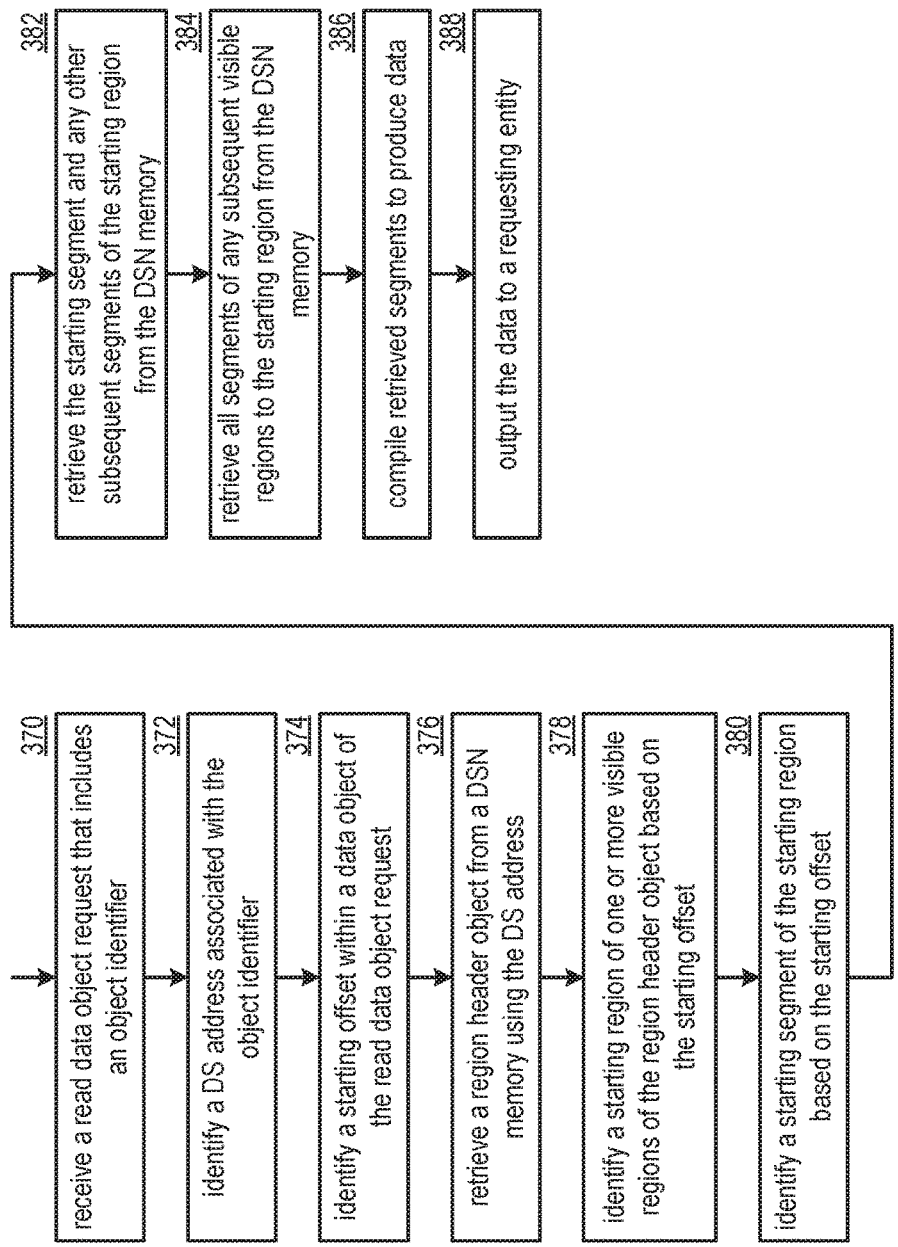
FIG. 41 is a flowchart illustrating an example of reading a data object in accordance with the present invention.

FIG. 41 is a flowchart illustrating an example of reading a data object. The method begins at step 370 where a processing module (e.g., of a dispersed storage (DS) processing module) receives a read data object request that includes an object identifier (ID). The request may also include an offset, where the offset indicates a position within the data object for initiating retrieval. The method continues at step 372 where the processing module identifies a dispersed storage (DS) address associated with the object ID. The identifying includes at least one of a directory lookup using the object ID, an index lookup using the object ID, and extracting the DS address from the read data object request. The method continues at step 374 where the processing module identifies a starting offset within a data object of the read data object request. The identifying includes at least one of extracting the starting offset from the read data object request and establishing a zero offset when not receiving the offset.

The method continues at step 376 where the processing module retrieves a region header object from a dispersed storage network (DSN) memory using the DS address. The retrieving includes generating a set of header slice names using the DS address, generating a set of read slice requests that includes the set of header slice names, outputting the set of read slice requests to the DSN memory, receiving at least a decode threshold number of header slices, and decoding the at least a decode threshold number of header slices to produce the region header object.

The method continues at step 378 where the processing module identifies a starting region of one or more visible regions of the region header object based on the starting offset. For example, the processing module adds region sizes of the one or more visible regions until a starting region is identified that does not exceed the starting offset. The method continues at step 380 where the processing module identifies a starting segment of the starting region based on the starting offset. The identifying includes a series of steps. A first step includes dividing a difference between the starting offset and the starting region by a segment size of the region to produce a segment number. A second step includes adding the segment number to a DS address of the region to produce a DS address of the starting segment.

The method continues at step 382 where the processing module retrieves the starting segment and any other subsequent segments of the starting region from the DSN memory. The retrieving includes a series of steps. A first step includes generating a set of retrieve slice requests for the starting segment using the DS address of the starting segment. A second step includes outputting the set of retrieve slice requests to the DSN memory. A third step includes determining a remaining number of data segments of the starting region based on segment size, region size, and the segment number of the starting segment. A fourth step includes, for each remaining data segment, generating another set of retrieve slice requests using the DS address of the starting segment and a segment number of the remaining data segment. A fifth step includes outputting the other set of retrieve slice requests to the DSN memory. A sixth step includes receiving at least a decode threshold number of encoded data slices for each of the starting data segment and the remaining data segments. A seventh step includes decoding the at least a decode threshold number of encoded data slices for each of the starting data segment and the remaining data segments using the dispersed storage error coding function to reproduce the starting data segment and the remaining data segments.

The method continues at step 384 where the processing module retrieves all segments of any subsequent visible regions to the starting region from the DSN memory. For example, for each region entry of the one or more visible regions subsequent to the starting region, the processing module identifies a DS address of the region, determines a number of data segments based on a region size and a segment size, generates a set of slice names for each data segment (e.g., sequentially incrementing a data segment ID for each sequential data segment), generates retrieve slice requests for each set of slice names, outputs the retrieve slice requests, receives at least a decode threshold number of encoded data slices for each data segment, and decodes the at least a decode threshold number of encoded data slices for each data segment to reproduce each data segment of the region.

The method continues at step 386 where the processing module compiles retrieved data segments to reproduce the data object. The compiling includes aggregating all retrieve segments in order to reproduce the data. In addition, the processing module may include DS addresses of each region. The method continues at step 388 where the processing module outputs the data object to a requesting entity.

Figure 42:
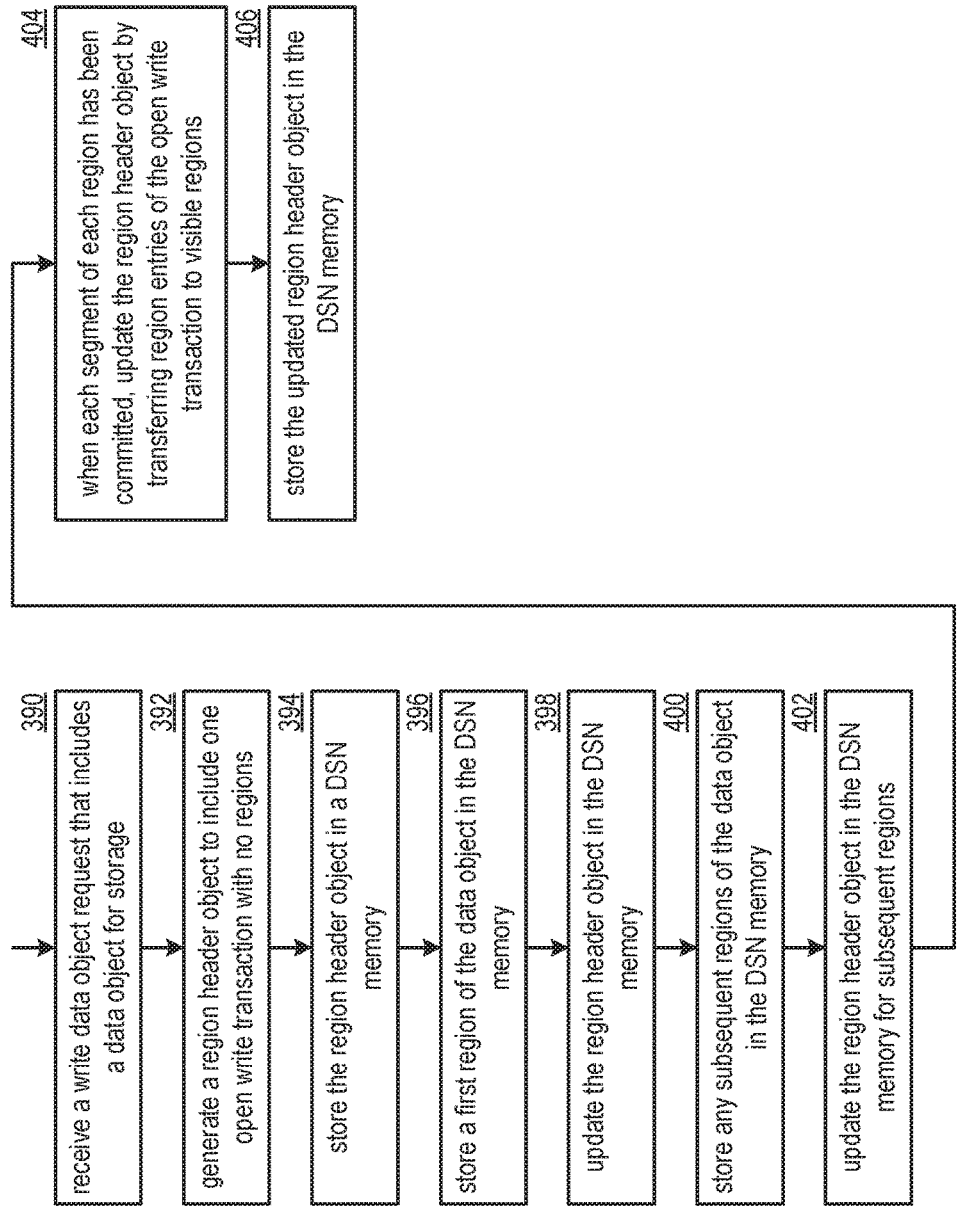
FIG. 42 is a flowchart illustrating an example of writing a data object in accordance with the present invention.

FIG. 42 is a flowchart illustrating an example of writing a data object. The method begins at step 390 where a processing module (e.g., of a dispersed storage (DS) processing module) receives a write data object request that includes a data object for storage. The request may further include a data object identifier (ID) of the data object. The method continues at step 392 where the processing module generates a region header object to include one open write transaction and no region entries. The generating includes generating a transaction ID and generating an open write transaction section to include the transaction ID. The region header object is generated in accordance with a structure of the region header object depicted in FIG. 40.

The method continues at step 394 where the processing module stores the region header object in a dispersed storage network (DSN) memory. The storing includes a series of steps. A first step includes generating a dispersed storage (DS) address as a storage location for storing the region header object in the DSN memory. A second step includes encoding the region header object using a dispersed storage error coding function to produce a set of header slices. A third step includes generating a set of header slice names associated with the set of header slices using the DS address. A fourth step includes generating a set of write slice requests that includes the set of header slices and the set of header slice names. A fifth step includes outputting the set of write slice requests to the DSN memory. A six step includes receiving write slice responses from the DSN memory. A seventh step includes generating and outputting a set of commit requests that includes a transaction number of the set of write slice requests to the DSN memory when a write threshold number of favorable write slice responses has been received.

The method continues at step 396 where the processing module stores a first region of the data object in the DSN memory. The storing includes a series of steps. A first step includes determining whether a data object size is less than a region size threshold (e.g., a region size as a maximum). When the data object size is less than or equal to the region size threshold, a second step includes segmenting the data object in accordance with a segment size to produce a plurality of segments of the first region. Alternatively, when the data object size is greater than the region size threshold, the second step includes segmenting a first region size portion of the data object in accordance with the segment size to produce the plurality of data segments of the first region. A third step includes encoding each of the plurality of data segments of the first region using the dispersed storage error coding function to produce a plurality of sets of encoded data slices of the first region. A fourth step includes generating a first segment DS address as a storage location for storing the first segment of the plurality of data segments of the first region in the DSN memory. A fifth step includes generating a plurality of sets of data slice names associated with the plurality of sets of encoded data slices using the first segment DS address. A sixth step includes generating at least one set of write slice requests that includes the plurality of sets of data slice names and the plurality of sets of encoded data slices. A seventh step includes outputting the at least one set of write slice requests to the DSN memory. An eighth step includes receiving write slice responses from the DSN memory with regards to the at least one set of write slice requests. An ninth step includes generating and outputting a plurality of sets of commit requests that includes a transaction number associated with the at least one set of write slice requests to the DSN memory when a write threshold number of favorable write slice responses has been received for each of the plurality of sets of encoded data slices.

The method continues at step 398 where the processing module updates the open write transaction section of the region header object in the DSN memory with regards to storing the first region. The updating includes a series of steps. A first step includes generating a region entry for the first region. For example, the processing module generates the region entry to include a region identifier, the first segment DS address, the region size, and the segment size. A second step includes updating the open write transaction section to include the region entry for the first region. When the data object size is greater than the region size, a third step includes generating a region entry for a second region to include a region identifier for the second region and updating the open write transaction section to include the region entry for the second region. A fourth step includes storing the updated region header object in the DSN memory (e.g., encode, write slices, commit slices as previously discussed).

The method continues at step 400 where the processing module stores any subsequent regions of the data object in the DSN memory in a fashion as previously discussed. For each subsequent region of the data object, the method continues at step 402 where the processing module updates the region header object in the DSN memory for the subsequent region in a fashion as previously discussed.

When each segment of each region has been committed, the method continues at step 404 where the processing module updates the region header object by transferring region entries of the open write transaction section to the visible regions section. For example, the processing module transfers the region entry for the first region from the open write transaction section (e.g., for the transaction ID) to the visible regions section. Next, the processing module transfers any remaining region entries of the open write transaction section (e.g., for the transaction ID) to the visible regions section. When each region entry associated with the transaction ID has been transferred from the open write transaction section to the visible regions section, the processing module deletes the transaction ID from the open transaction section. The method continues at step 406 where the processing module stores the updated region header object in the DSN memory.

Figure 43A:
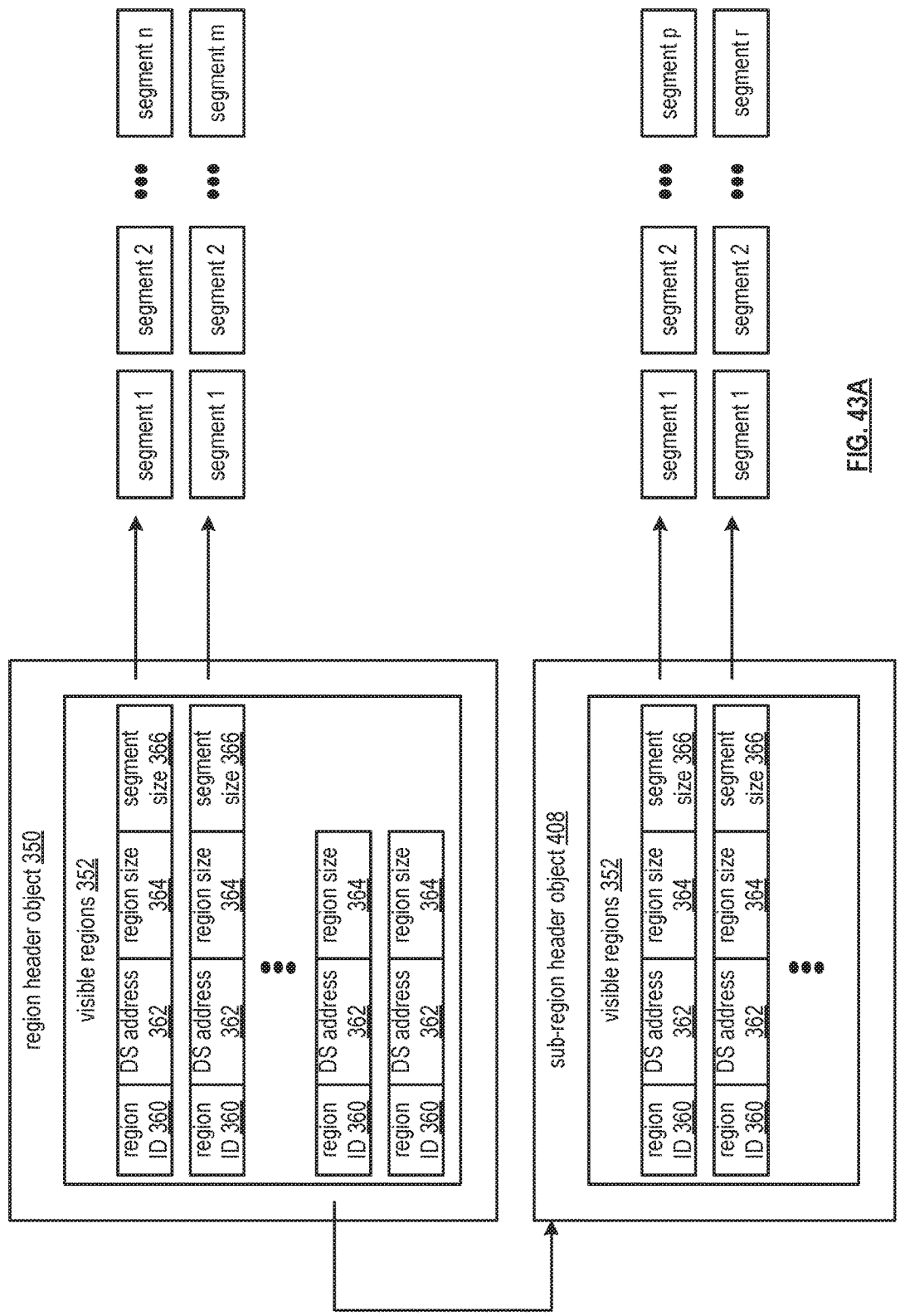
FIG. 43A is a diagram of an embodiment of a structure of a hierarchical region header object in accordance with the present invention.

FIG. 43A is a diagram of an embodiment of a structure of a hierarchical region header object that includes a region header object 350 and one or more sub-region header objects 408. The region header object 350 includes one or more visible region entries 352 associated with storage of one or more data objects stored by data segments in a dispersed storage network (DSN), one or more sub-region entries associated with the one or more sub-region header objects 408, and may include open write transaction entries and open delete transaction entries (e.g., as illustrated in FIG. 40). Each sub-region header object 408 includes one or more visible region entries 352 associated with storage of one or more data objects stored by data segments in the DSN associated with a corresponding sub-region and may include open write transaction entries and open delete transaction entries.

A visible region entry of the one or more visible regions entries 352 includes, for each visible region, a region identifier (ID) field 360, a dispersed storage (DS) address field 362, a region size field 364, and a segment size field 366. A region ID entry is included in the region ID field 360 to uniquely identify the region. A DS address entry is included in the DS address field 362 to identify a storage location of a first data segment of the one or more data segments associated with the region. For example, the DS address entry identifies a source name for a first data segment. Source names corresponding to other data segments of one or more data segments of the region may be generated based on the source name for the first data segment (e.g., incrementing a segment field entry by one for each sequential data segment of the one or more data segments of the region). A region size entry of the region size field 364 indicates a size of the region (e.g., bytes). A segment size entry of the segment size field 366 indicates a size (e.g., bytes) of each data segment of the one or more data segments of the region. A number of data segments of the one or more data segments of the region may be determined by dividing the region size entry by the segment size entry.

A sub-region entry of the one or more sub-region entries 408 includes, for each sub-region, a region ID field 360 of the sub-region, a DS address field 362 of the sub-region header object, and a region size field 364 of the sub-region. A region ID entry is included in the region ID field 360 to uniquely identify the sub-region. A DS address entry is included in the DS address field 362 to identify a storage location the sub-region header object 408 associated with the sub-region. For example, the DS address entry identifies a source name for the sub-region header object 408. A region size entry of the region size field 364 indicates a size of the sub-region (e.g., bytes). The size of the sub-region may include one or more of a size of the one or more visible regions, a size of one or more regions associated with open write transactions, and a size of one or more regions associated with open delete transactions. The method of operation utilizing the hierarchical region header object structure is discussed in greater detail with reference to FIG. 43B.

Figure 43B:
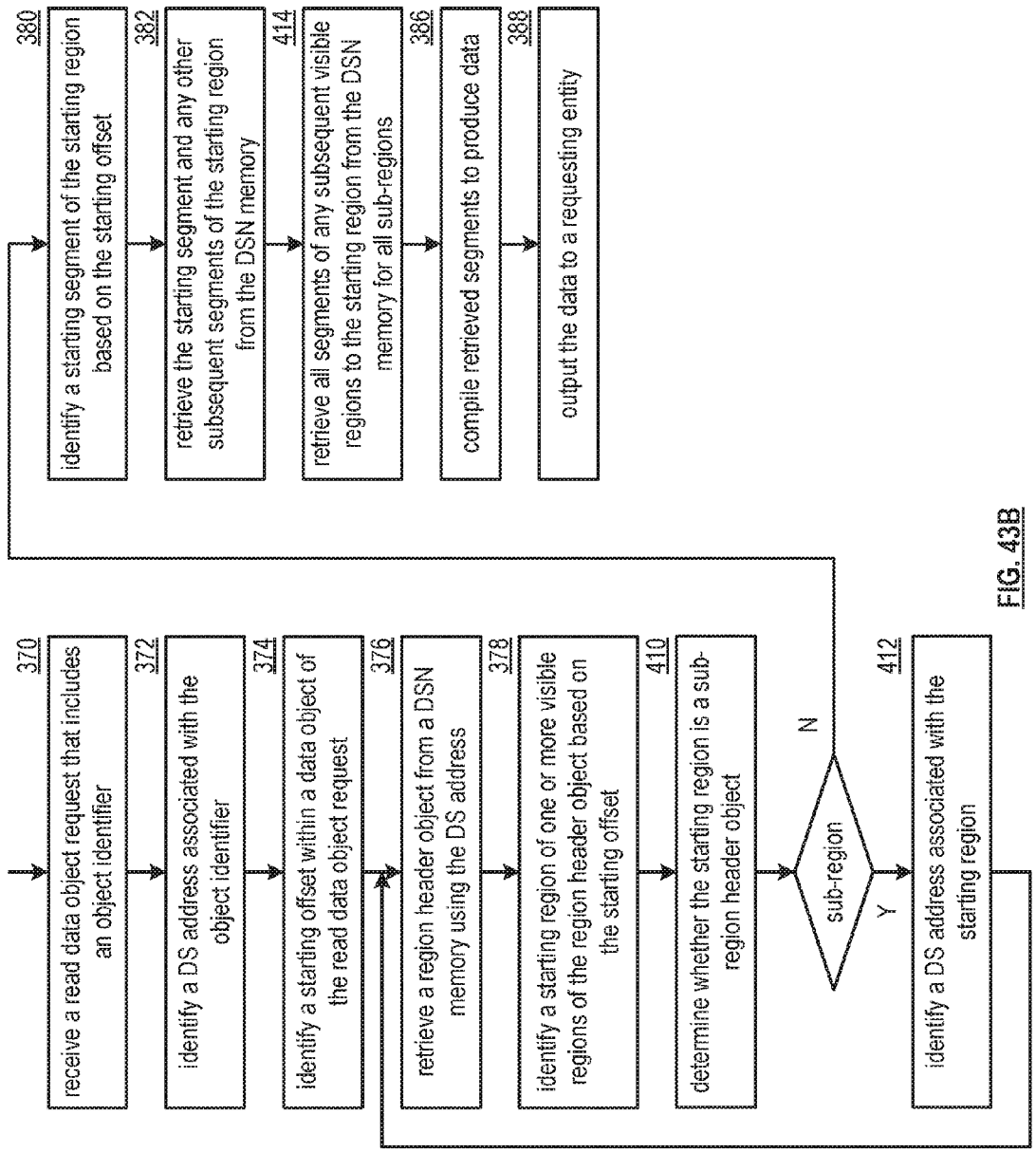
FIG. 43B is a flowchart illustrating another example of reading a data object in accordance with the present invention.

FIG. 43B is a flowchart illustrating another example of reading a data object, which includes similar steps to FIG. 41. The method begins with steps 370, 372, 374, 376, and 378 of FIG. 41 where a processing module (e.g., a dispersed storage (DS) processing module) receives a read data object requests that includes an object identifier, identifies a DS address associated with the object identifier (e.g., for a top-level region header object), identifies a starting offset within a data object of the read data object request, retrieves a region header object from a dispersed storage network (DSN), and identifies a starting region of one or more visible regions of the region header object based on the starting offset.

The method continues at step 410 where the processing module determines whether the starting region is a sub-region header object (e.g., examining a corresponding entry type and/or whether a segment size exists). The method branches to step 380 of FIG. 41 when the processing module determines that the starting region is not a sub-region header object. The method continues to step 412 when the processing module determines that the starting region is a sub-region header object. The method continues at step 412 where the processing module identifies a DS address associated with the starting region (e.g., by extracting the DS address from the region entry). The method branches back to step 376 of FIG. 41 where the processing module retrieves the region header object from the DSN.

When the processing module determines that the starting region is not a sub-region header object, the method continues with steps 380 and 382 of FIG. 41 where the processing module identifies a starting segment of the starting region based on the starting offset and retrieves the starting segment and any other subsequent segments of the starting region from the DSN memory. The method continues at step 414 where the processing module retrieves all segments of any subsequent visible region to the starting region from the DSN memory for all sub-regions (e.g., traverse back up the hierarchy for each sub-region). The method continues with steps 386 and 388 of FIG. 41 where the processing module compiles retrieve segments to produce data and outputs the data to a requesting entity.

Figure 44:
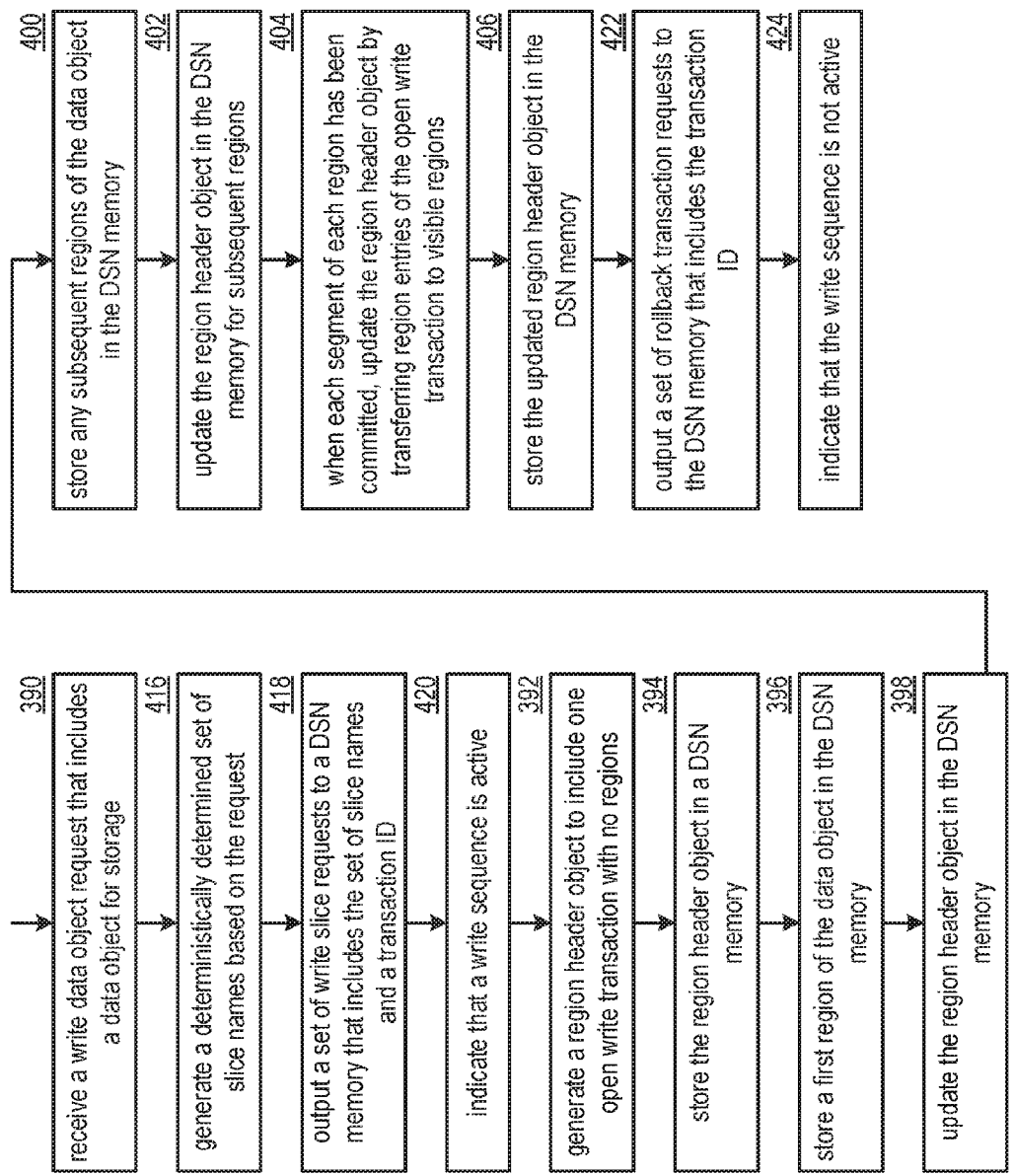
FIG. 44 is a flowchart illustrating another example of writing a data object in accordance with the present invention.

FIG. 44 is a flowchart illustrating another example of writing a data object, which includes similar steps to FIG. 42. The method begins with step 390 of FIG. 42 where a processing module (e.g., of a dispersed storage processing module) receives a write data object requests that includes a data object for storage. The method continues at step 416 where the processing module generates a deterministically determined set of slice names based on the request. For example, the processing module performs a mask generating function on a data name of the data object to produce an object identifier (ID) and utilizes the object identifier to generate a vault source name common utilized to generate the set of slice names.

The method continues at step 418 where the processing module outputs a set of write slice requests to a dispersed storage network (DSN) that includes the set of slice names and a transaction ID. Such writing may introduce a lock state for the data object while a set of commit write slice requests are never sent to the DSN. The processing module may generate the transaction ID based on one or more of a random number and a previously utilized transaction ID. The outputting the set of write slice requests to include generating the set of write slice requests to include null data in addition to the set of slice names and the transaction ID. The method continues at step 420 where the processing module indicates that a write sequence is active pertaining to the data object. For example, the processing module sends a write sequence active indicator to a cleanup process where the indicator includes the data name of the data object and the transaction ID.

The method continues with steps 392-406 of FIG. 42 to store the data object in the DSN, where the processing module generates a region header object to include one open write transactions with the regions, stores the region header object in the DSN memory, stores a first region of the data object in the DSN memory, updates the region header object in the DSN memory, stores any subsequent regions of the data object in the DSN memory, updates the region header object in the DSN memory for subsequent regions, when each segment of the region has been committed, updates the region header object by transferring region entries of the open write transactions to visible regions, and stores the updated region header object in the DSN memory. The method continues at step 422 where the processing module outputs a set of rollback transaction requests to the DSN memory that includes the transaction ID. Such sending of the rollback transaction requests eliminates the slice name lock. The DS units of the DSN memory may timeout and perform an automatic rollback when an expiration time period expires after receiving the initial write request and no commit write request has been received. The method continues at step 424 where the processing module indicates that the write sequence is not active. For example, the processing module outputs a write sequence not active indicator to the cleanup process.

Alternatively, or in addition to the write sequence example, the cleanup process may attempt to write to the same set of slice names that provide the slice name lock. When the cleanup process receives a succeeded indicator in response, the cleanup process indicates that the write sequence has failed (e.g., the automatic rollback of the DS units has taken place since the write sequence has taken too long).

Figure 45A:
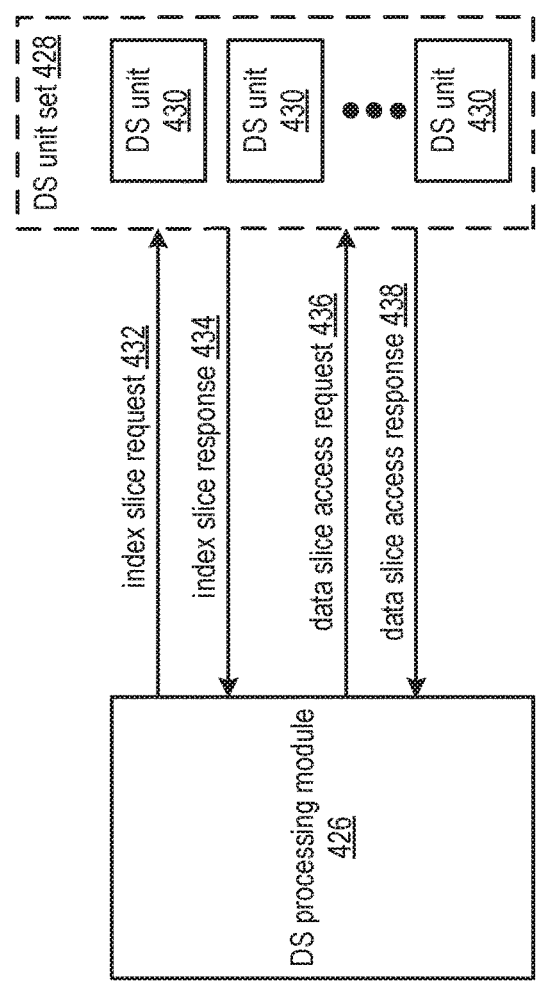
FIG. 45A is a schematic block diagram of an embodiment of a dispersed storage system in accordance with the present invention.

FIG. 45A is a schematic block diagram of an embodiment of a dispersed storage system that includes a dispersed storage (DS) processing module 426 and a DS unit set 428. The DS unit set 428 includes a set of DS units 430 utilized to access slices stored in the set of DS units. Each DS unit 430 of the set of DS units may be implemented utilizing at least one of a distributed storage and task (DST) execution unit, a storage server, and one or more memory devices. The DS processing module 426 may be implemented utilizing at least one of a DST client module, a DST processing unit, a DS processing unit, a user device, a DST execution unit, and a DS unit. The system is operable to facilitate renaming of a named object stored in the DS unit set.

In an example of operation, the DS processing module 426 receives a request to rename the named object that includes a source object name of the named object and a destination object name. Alternatively, the DS processing module 426 receives the request to rename the named object that includes a data name associated with source data and a data name associated with destination data. When receiving one or more data names, the DS processing module 426 may perform a dispersed storage index lookup to identify the source object name and the destination object name based on the one or more data names. The identifying includes generating and outputting index slice requests 432 to the DS unit set 428 to access the dispersed index, receiving index slice responses 434 that includes a portion of the dispersed index, and decoding the index slice responses to reproduce one or more of the source object name and the destination object name.

The DS processing module 426 utilizes the source object name to retrieve a source region header object from the DS unit set 428. The retrieving includes generating and outputting data slice access requests 436 to the DS unit set 428 that includes slice names generated from the source object name. The DS processing module 426 attempts to retrieve a destination region header object from the DS unit set 428 based on the destination object name. The retrieving includes generating and outputting data slice access requests 436 to the DS unit set 428 that includes slice names generated from the destination object name. When the retrieving is not successful (e.g., as indicated by a receiving data slice access responses 438 indicating an unfavorable result), the DS processing module 426 generates a new destination region header object.

The DS processing module 426 identifies visible region entries of the destination region header object and moves the identified visible region entries to open delete transactions of the destination region header object to facilitate deleting of data associated with the destination object name (e.g., deleting old data associated with the name to be utilized in the renaming). The DS processing module 426 identifies visible region entries of the source region header object and moves the identified visible region entries to the visible region entries of the destination region header object (e.g., data to keep that is being renamed). The DS processing module 426 deletes the source region header object from the DS unit set 428 when all open write transactions have concluded, visible regions have been moved, and all open delete transactions have concluded. The deleting includes generating delete data slice access requests 436 and receiving data slice access responses 438 to confirm deletion of slice is associated with the source region header object. As such, the source region header object is no longer required.

The DS processing module 426 outputs write data slice access requests 436 to the DS unit set 428 that includes the destination region header object. The DS processing module 426 updates the dispersed index to associate the destination object name with the destination region header object (e.g., a dispersed index entry includes the destination object name and a source name of the destination region header object). The DS processing module 426 updates the dispersed index to disassociate the source object name with the source region header object (e.g., source object name does not point to a region header object).

Figure 45B:
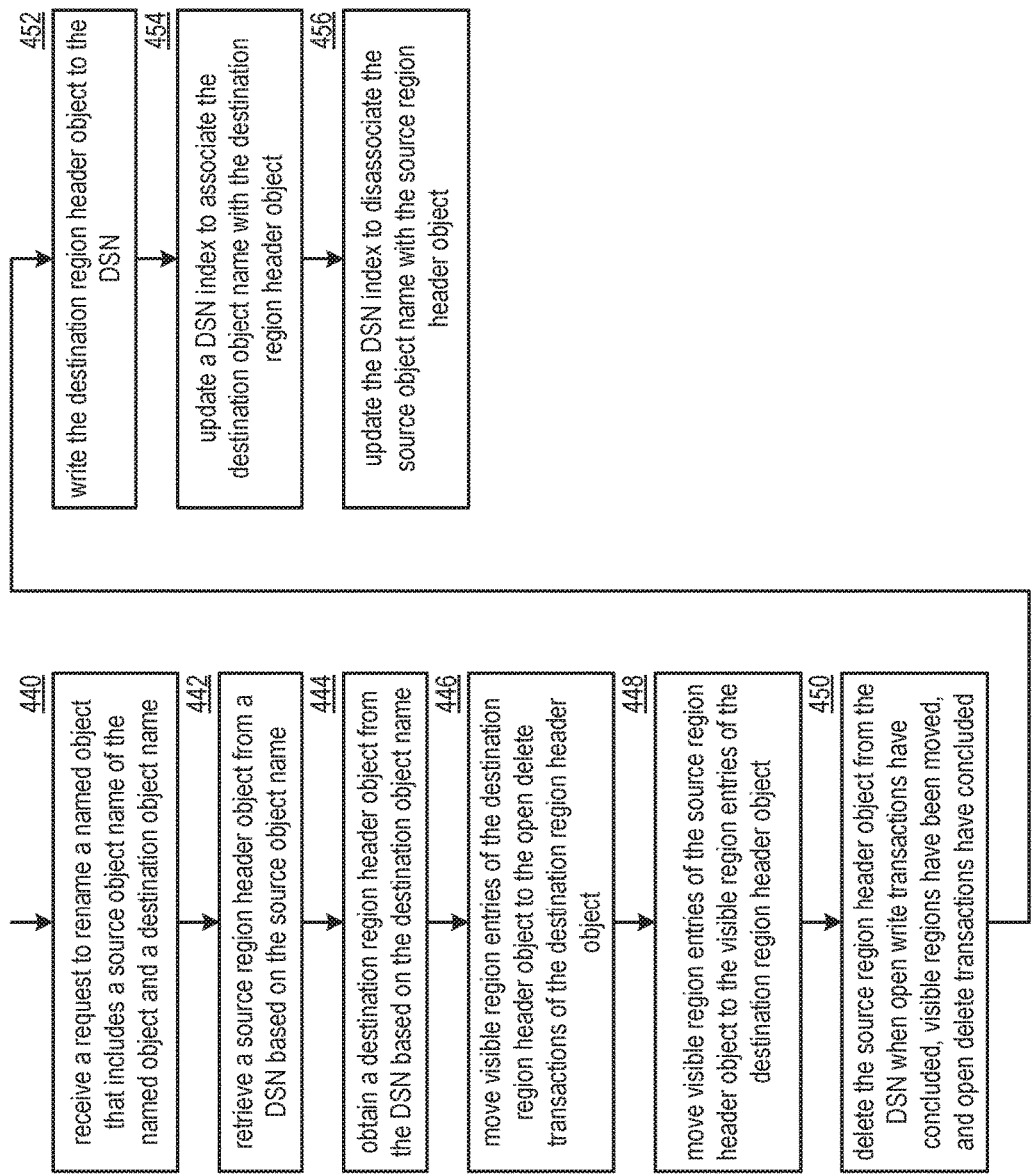
FIG. 45B is a flowchart illustrating an example of renaming a named object in accordance with the present invention.

FIG. 45B is a flowchart illustrating an example of renaming a named object. The method begins with step 440 where a processing module (e.g., a dispersed storage (DS) processing module) receives a request to rename a named object that includes a source object name of the named object and a destination object name. The method continues at step 442 where the processing module retrieves a source region header object from a dispersed storage network (DSN) based on the source object name. The retrieving includes accessing a DSN index using the source object name to identify a DSN address (e.g., a source name) of the source region header object, generating slice requests utilizing the DSN address (e.g., generate slice names to include the source name), outputting the slice requests to the DSN, receiving slices, and decoding the slices to reproduce the source region header object.

The method continues at step 444 where the processing module obtains a destination region header object from the DSN based on the destination object name. The retrieving includes accessing the DSN index using the destination object name to identify a DSN address (e.g., a source name) of the destination region header object, generating slice requests utilizing the DSN address (e.g., generate slice names to include the source name), outputting the slice requests to the DSN, receiving slices, and decoding the slices to reproduce the destination region header object. Alternatively, the accessing of the DSN index may fail when the destination region header object does not exist. The processing module generates a new destination region header object when the destination region header object does not exist.

The method continues at step 446 where the processing module moves visible region entries of the destination region header object to the open delete transactions of the destination region header object. The processing module may initiate a cleanup task to remove the old destination content. The cleanup may further include the processing module waiting for open write transactions to become visible for inclusion in the moving of the visible region entries of the destination region header object to the open delete transactions of the destination region header object.

The method continues at step 448 where the processing module moves visible region entries of the source region header object to the visible region entries of the destination region header object. The processing module may further wait for entries of open write transactions of the source region header object to conclude (e.g., to become visible) to be included in the moving of the visible region entries of the source region header object to the visible region entries of the destination region header object.

The method continues at step 450 where the processing module deletes the source region header object from the DSN when open write transactions have concluded, visible regions have been moved, and open delete transactions have concluded. The deleting includes issuing delete write requests to the DSN that includes slice names based on the DSN address of the source region header object. The method continues at step 452 where the processing module writes the destination region header object to the DSN. The writing includes generating a set of slice names using the DSN address of the destination region header object or utilizing a new DSN address, encoding the destination region header object using a dispersed storage error coding function to produce a set of header slices, generating a set of write slice requests that includes the set of slice names and the set of header slices, and outputting the set of write slice requests to the DSN.

The method continues at step 454 where the processing module updates a DSN index to associate the destination object name with the destination region header object. The updating may include obtaining an index key associated with the source object (e.g., generating based on analyzing data of the source object, retrieving from an entry of the DSN index associated with the source object name), obtaining an entry of the DSN index associated with the destination object name, updating the entry with the index key, overwriting a DSN address with the DSN address of the destination region header object, encoding the entry using the dispersed storage error coding function to produce a set of index slices, and outputting the set of index slices to the DSN. The method continues at step 456 where the processing module updates the DSN index to disassociate the source object name with the source region header object. For example, the processing module facilitates deletion of the DSN index associated with the source object name (e.g., issuing a set of delete write slice requests to the DSN).

Figure 46A:
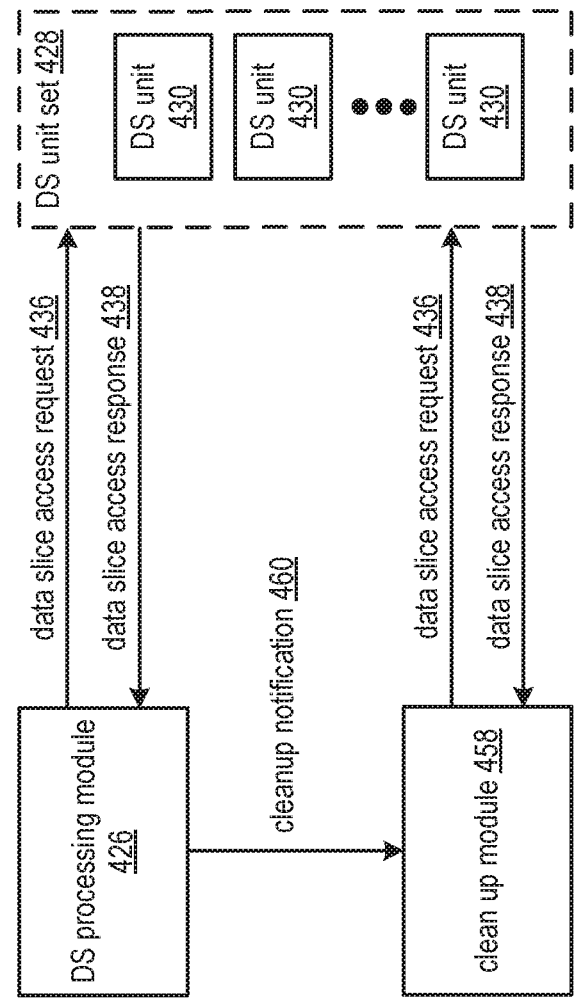
FIG. 46A is a schematic block diagram of another embodiment of a dispersed storage system in accordance with the present invention.

FIG. 46A is a schematic block diagram of another embodiment of a dispersed storage system that includes a dispersed storage (DS) processing module 426, a cleanup module 458, and a DS unit set 428. The DS unit set 428 includes a set of DS units 430 utilized to access slices stored in the set of DS units. Each DS unit 430 of the set of DS units may be implemented utilizing at least one of a distributed storage and task (DST) execution unit, a storage server, and one or more memory devices. The DS processing module 426 and cleanup module 458 may be implemented utilizing at least one of a DST client module, a DST processing unit, a DS processing unit, a user device, a DST execution unit, and a DS unit. The system is operable to facilitate storing data in the DS unit set.

The DS processing module 426 generates and outputs a set of transient slices of a first revision for storage in the DS unit set, where the set of transient slices corresponds to a data object to be stored in the DS unit set. The generating includes generating a set of data slice access requests 436 that includes the set of transient slices. The outputting includes outputting the set of data slice access requests 436 to the DS unit set 428 in receiving data slice access responses 438 indicating status of the storage request. The DS processing module 426 issues a cleanup notification 460 to notify the cleanup module 458 that a storage sequence is active corresponding to the data object. Next, the DS processing module 426 facilitates storage of the data object in the DS unit set 428. While facilitating storage of the data object in the DS unit set 428 utilizing one or more storage regions and updating a region header object corresponding to the data object, the DS processing module 426 outputs, at time intervals less than the minimum time interval period, another set of transient slices of another revision for storage in the DS unit set 428.

When completing storage of the data object, the DS processing module 426 deletes the set of transient slices by issuing a set of delete data slice access requests 436 to the DS unit set 428 for the transient slices. The DS processing module 426 issues another cleanup notification 460 to notify the cleanup module 458 that the storage sequence is not active corresponding to the data object.

Each DS unit 430 of the DS unit set receives a data slice access request that includes a transient slice of the set of transit slices. The DS unit 430 stores the transient slice. When receiving another transient slice of another revision number (e.g., but same slice name) within an allowable timeframe from a last received revision, the DS unit 430 stores the other transient slice and other revision number. Whenever receiving the other transient slice of the other revision number within the allowable timeframe, the DS unit 430 updates a slice status for the transient slice indicating that the transient slice is visible.

The cleanup module 458 receives the cleanup notification 460 from the DS processing module 426 that the storage sequence is active corresponding to the data object. From time to time, the cleanup module 458 performs a list function for the set of transient slices corresponding to the data object. For example, the cleanup module generates a set of list data slice access requests 436, outputs the set of list data slice access requests 436 to the DS unit set, and receives a set of list data slice access responses 438 from the DS unit set 428. When a list function response indicates that the transient slices are visible (e.g., since a periodic refresh of the transient slices with a new revision number was not received by the DS units), the cleanup module 458 indicates a storage sequence error for the data object and may further initiate a cleanup process. The method of operation is discussed in greater detail with reference to FIG. 46B.

Figure 46B:
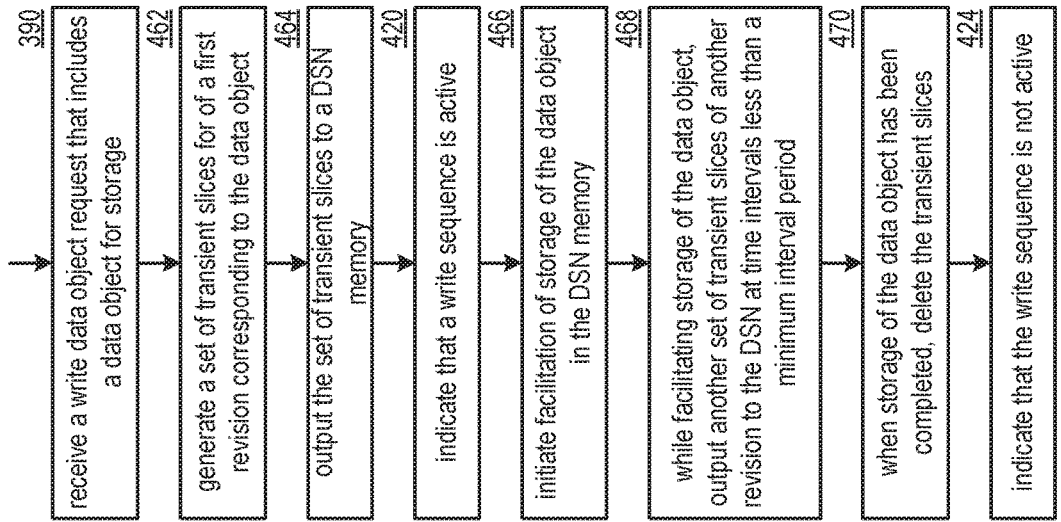
FIG. 46B is a flowchart illustrating another example of writing a data object in accordance with the present invention.

FIG. 46B is a flowchart illustrating another example of writing a data object, which includes similar steps to FIGS. 42 and 44. The method begins with step 390 of FIG. 42 where a processing module (e.g., of a dispersed storage (DS) processing module) receives a write data object requests that includes a data object for storage. The method continues at step 462 where the processing module generates a set of transient slices of a first revision corresponding to the data object. The generating includes generating the set of transient slices to include at least one of a predetermined pattern, a random pattern, and a deterministic value associated with the data object (e.g., applying a deterministic function to at least a portion of the data and/or a data object identifier) and generating a set of slice names based on the data object identifier. The method continues at step 464 where the processing module outputs the set of transient slices to a dispersed storage network (DSN) memory. The outputting includes generating a set of data slice access requests that includes a set of write transient slice requests, the set of slice names, the set of transient slices, and the first revision. The method continues with step 420 of FIG. 44 where the processing module indicates that a write sequence is active.

The method continues at step 466 where the processing module initiates facilitation of storage of the data object in the DSN memory. The facilitation includes utilizing one or more storage regions and updating a region header object corresponding to the data object. While facilitating storage of the data object, the method continues at step 468 where the processing module outputs another set of transient slices of another revision to the DSN memory at time intervals less than a minimum interval period. The outputting includes identifying the time interval, upon the time interval generating other data slice access requests that includes the write transient slice requests, the set of slice names, the set of transient slices, and a new revision (e.g., increment a previous revision by one).

When storage in the data object has been completed, the method continues at step 470 where the processing module deletes the transient slices. The processing module may detect completion of storage of the data object when receiving favorable write slice responses corresponding to write slice requests sent to the DSN memory to facilitate storage of the data object. The deleting includes generating a set of delete data slice access requests that includes the set of slice names and outputting the set of delete slice access requests to the DSN memory. The method continues with step 424 of FIG. 44 where the processing module indicates that the write sequence is not active.

FIGS. 47A, 47G, and 47H are schematic block diagrams of an embodiment of a dispersed storage network (DSN) illustrating example steps of storing data 488. The DSN includes the distribute storage and task (DST) client module 34 and the network 24 of FIG. 1, and any number of DST execution units. The DST execution units provides DSN memory. The DST execution units may be implemented utilizing the DST execution units 36 (e.g., storage units) of FIG. 1. In a specific example, the DST execution units may include a set of DST execution units 1-5. As another specific example, the DST execution units includes an alternative set of DST execution units with less than 5 DST execution units (e.g., 4 DST execution units). As yet another specific example, the DST execution units may include another alternative set of DST execution units with more than five DST execution units (e.g., 6 DST execution units). The DST client module 34 includes the outbound dispersed storage (DS) processing module 80 of FIG. 3. The outbound DST processing module 80 includes the DS error encoding 112 of FIG. 4 and a DSN address generator 480, a slice selector 482, a slice name selector 484, and a request generator 486.

The DSN functions to store the data 488 in the DST execution units as encoded data slices. The data 488 includes one of a data object, a data file, a plurality of data objects, a plurality of data files, a data segment of the data object (e.g., where the data 488 is divided into a plurality of data segments utilizing a segmentation scheme), a data segment of the data file, a group of data segments of the data object, and a group of data segments of the data file. The data object includes at least one of text, an image, audio, video, multimedia, etc. The data file includes the data object organized into a storage/communication structure in accordance with a standard associated with one or more of a storage system and a communication system.

FIG. 47A illustrates initial steps of the example steps of the storing of the data 488 in at least some of the set of DST execution units 1-5. As a specific example, the outbound DS processing module 80 receives the data 488 for storage in the DSN memory. The outbound DS processing module 80 ascertains dispersed storage error encoding parameters 489 (e.g., determines, accesses pre-established parameters based on a data type, utilizes fixed parameters for a requesting entity, establishes programmable parameters based on a storage reliability requirement, performs a table look up, utilizes a user selection of parameters, etc.) for encoding the data 488. The DS error encoding parameters 489 includes one or more of a width number "n", a decode threshold number, and encoding algorithm identifier, and an encoding matrix. The width number "n" indicates a number of encoded data slices that are generated when encoding a data segment of the data 488. The decode threshold number indicates a minimum number of encoded data slices for the set of encoded data slices that are required to recover the data segment. For instance, the outbound DS processing module 80 performs a system registry lookup based on the requesting entity to ascertain the dispersed storage error encoding parameters 489 to include a width of n=5 and a decode threshold of 3.

Having ascertained the dispersed storage error encoding parameters 489, outbound DS processing module 80 ascertains "p" number of DST execution units of the DSN memory for the storing of an encoded version of the data 488. As a specific example, the outbound DS processing module 80 performs a table lookup to ascertain the dispersed storage error encoding parameters and the "p" number of DST execution units such that "n" equals "p". For instance, n=p=5. As another specific example, the outbound DS processing module 80 performs another table lookup to ascertain the dispersed storage error encoding parameters and the "p" number of DST execution units such that "n" is less than "p". For instance, n=5 and p=6. As another instance, n=4 and p=5.

Having ascertained the "p" number of DST execution units, the outbound DS processing module 80 ascertains a storage mapping that maps encoded data slices to DST execution units for storing the encoded version of the data 488. As a specific example, the outbound DS processing module accesses a slice selection table and a storage unit selection table to identify which encoded data slices of each set of "n" encoded data slices to store in which of the "p" DST execution units, where the encoded version of the data includes sets of "n" encoded data slices. As a more specific example, the DSN address generator 480 generates a set of slice names 1-n based on the data 488. Each slice name includes a pillar number to identify a slice from n slices per set, a vault identifier (ID) based on the requesting entity, a vault generation ID, an object ID that is unique for the data 488, and a segment ID of one or more segment IDs.

Having generated the set of slice names 1-n, the slice selector 482 accesses the slice selection table to identify targeted encoded data slices T1 through TT of each set of "n" encoded data slices. For example, the slice selector 482 identifies a DSN address range of the set of slice names 1-n and accesses the slice selection table to identify the targeted encoded data slices T1 through TT. For instance, the slice selector 482 identifies a seventh DSN address range, accesses the slice selection table, and identifies encoded data slices 2, 3, and 4 as targeted encoded data slices T1-T3 when three encoded data slices are to be selected. The selecting of the targeted encoded data slices is discussed in greater detail with reference to FIGS. 47B-C.

Having identified the targeted encoded data slices T1 through TT, the slice name selector 484 selects slice names 1-T, of the set of slice names 1-n, associated with the targeted encoded data slices T1 through TT. The request generator 486 identifies the DST execution units for storing the encoded version of the data 488 by accessing the storage unit selection table based on the identified DSN address range of the set of slice names 1-n. For instance, the request generator 486 accesses the storage unit selection table based on the seventh DSN address range and identifies DST execution units 2, 3, and 4 as the DST execution units for storing the encoded version of the data 488. The selecting of the DST execution units is discussed in greater detail with reference to FIGS. 47D-F.

The DS error encoding 112 encodes the data 488 in accordance with the dispersed storage error encoding parameters 489 to produce sets of encoded data slices. The sets of encoded data slices includes "n" number of encoded data slices. The request generator 486 generates write requests for storing, in accordance with the storage mapping, encoded data slices of the sets of encoded data slices in a pattern (e.g., the targeted encoded data slices T1-TT selected by the across the slice selector 482) across the "p" number of DST execution units (e.g., the identified DST execution units), where less than the "p" number of DST execution units stores an encoded data slice of the set of encoded data slices or a subset of the set of encoded data slices. As a specific example, the request generator 486 generates write slice requests 490 that includes the encoded data slices 2, 3, and 4 and slice names 1-T corresponding to the encoded data slices 2, 3, and 4. Next, the request generator 486 outputs, via the network 24, the write slice requests 480 as write slice requests T1, T2, and T3 to DST execution units 2, 3, and 4. DST execution unit 2 stores encoded data slice 2 in memory of the DST execution unit 2 etc.

FIGS. 47B-C are diagrams illustrating examples of slice selection tables 492 that include a dispersed storage network (DSN) address range field 494, a target set field 486, and fields for target slices (e.g., target slices 1-3 when a storage mapping maps three encoded data slices to three DST execution units for storing an encoded version of data where the data is encoded using a dispersed storage error coding function to produce sets of encoded data slices). The slice selection table 492 includes a target set number of entries. For example, the slice selection table 492 includes five entries when the target set number is five. Each entry of the slice selection table 482 includes a DSN address range entry of the DSN address range field 494, a target set entry of the target set field 496, and target slice entries for the target slice fields. The target set entry of the target set field 496 identifies a combination of encoded data slices of a set of encoded data slices. Such combinations may be identified to accommodate a rotation pattern. For example, a DSN address range associated with the data is determined in accordance with a address range scheme (e.g., dividing a DSN address by a number of DSN address ranges to generate a DSN address range identifier), the target set number of entries is determined (e.g., a lookup), and the target set entry is calculated in accordance with a formula: target set=DSN address range modulo (target set number of entries). For instance, target set 2=7 modulo 5; when the DSN address range is a seventh address range and the target set number of entries is 5.

In particular, FIG. 47B illustrates an example of the slice selection table 492 when the combinations of encoded data slices are to utilize each encoded data slice an equal number of times across the five target sets. Such a rotation pattern enables a uniform rotation pattern. For instance, each encoded data slice is selected three times of the five target sets when each target set of targeted encoded data slices is utilized. The storage mapping is ascertained such that, from set to set of encoded data slices, a fixed sub-set of an "n" number of encoded data slices of the sets of encoded data slices are stored in at least one of a fixed sub-set of a "p" number of DST execution units and a varying sub-set of the "p" number of DST execution units (e.g., as subsequently selected by utilizing a storage unit selection table). For instance, the fixed sub-set of encoded data slices (e.g., encoded data slices 2, 3, and 4) is selected for storage for each set of encoded data slices when a common DSN address range entry is associated with each set of encoded data slices (e.g., a source name DSN address that corresponds to the data). As another instance, another fixed sub-set of encoded data slices (e.g., encoded data slices 3, 4, and 5) is selected for storage of each set of other encoded data slices of other data based on another source name DSN address.

Alternatively, the storage mapping may be ascertained such that, from set to set of encoded data slices, a varying sub-set of the "n" number of encoded data slices are stored in the at least one of the fixed sub-set of the "p" number of DST execution units and the varying sub-set of the "p" number of DST execution units (e.g., as subsequently selected by utilizing the storage unit selection table). For instance, the varying sub-set of encoded data slices is selected for storage for each set of encoded data slices when DSN address range entries that each include a segment number are utilized.

Alternatively, FIG. 47C illustrates another example of the slice selection table 492 when the combination of encoded data slices is to utilize a fixed common subset of encoded data slices across the five target sets when the rotation pattern is a fixed rotation pattern. For instance, targeted encoded data slices 1-3 are utilized for each DSN address range. The storage mapping is ascertained such that, from set to set of encoded data slices, a fixed sub-set of the "n" number of encoded data slices of the sets of encoded data slices are stored in the at least one of the fixed sub-set of the "p" number of DST execution units and the varying sub-set of the "p" number of DST execution units (e.g., as subsequently selected by utilizing a storage unit selection table).

FIGS. 47D-F are diagrams illustrating examples of a storage unit selection table that includes the DSN address range field 494 and the target set field 496 of FIG. 47B, and target slice fields that map target encoded data slices to storage units (e.g., DST execution units). Dispersed storage error encoding parameters (e.g., including width "n") are ascertained and a "p" number of storage units are ascertained such that "n" equals "p". For instance, 5 DST execution units are selected for storing encoded data slices where data divided into data segments and each data segment is dispersed storage error encoded to produce sets of encoded data slices where each set of encoded data slices includes "n" encoded data slices.

The storage mapping may be ascertained such that either a fixed sub-set or a varying sub-set of the "n" number of encoded data slices of each of the sets of encoded data slices are stored in at least one of a fixed sub-set of the "p" number of storage units and a varying sub-set of the "p" number of storage units. As a specific example, the targeted encoded data slices are stored in the fixed sub-subset of the "p" number of storage units when a DSN address range entry of the DSN address range field 494 includes a DSN address associated with the data (e.g., a source name of the data). For instance, storage units 2, 3, and 4 are selected for storage of target slices 1-3 when the source name of the data is associated with a seventh DSN address range and a second target set. As another specific example, the targeted encoded data slices are stored in the varying sub-subset of the "p" number of storage units when the DSN address range entry of the DSN address range field 494 includes a DSN address associated with each data segment of the data segments of the data (e.g., a segment number). For instance, storage units 3, 4, and 5 are selected for storage of target slices 1-3 when the segment number of a first data segment is associated with an eighth DSN address range and a third target set. As another instance, storage units 4, 5, and 1 are selected for storage of target slices 1-3 when the segment number of a second data segment is associated with a ninth DSN address range and a fourth target set.

FIG. 47E illustrates further combinations of the storage units of FIG. 47D, where more permutations of the "p" number (e.g., 5) of storage units are provided for storage unit selection based on DSN address ranges. As a specific example, storage units 2, 3, and 5 are selected for storage of target slices 1-3 when the source name of the data is associated with a seventh DSN address range (e.g., a source name) and a second target set. As another specific example, storage units 3, 4, and 1 are selected for storage of target slices 1-3 when the segment number of a first data segment is associated with an eighth DSN address range and a third target set. As another instance, storage units 4, 5, and 2 are selected for storage of target slices 1-3 when the segment number of a second data segment is associated with a ninth DSN address range and a fourth target set.

FIG. 47F illustrates yet another example of the storage unit selection table 494 where the dispersed storage error encoding parameters are ascertained and the "p" number of storage units are ascertained such that "n" is less than "p". For instance, six DST execution units are selected as the "p" number and five is selected for the width "n". The storage mapping is ascertained such that, from set to set of encoded data slices, the targeted encoded data slices of the "n" number of encoded data slices of the plurality of sets of encoded data slices are stored in at least one of a fixed sub-set and a varying sub-set of the "p" number of storage units.

As a specific example, the targeted encoded data slices are stored in the fixed sub-subset of the "p" number of storage units when a DSN address range entry of the DSN address range field 494 includes a DSN address associated with the data (e.g., a source name of the data). For instance, storage units 2, 3, and 7 are selected for storage of target slices 1-3 when the source name of the data is associated with a 27th DSN address range and a seventh target set. As another specific example, the targeted encoded data slices are stored in the varying sub-subset of the "p" number of storage units when the DSN address range entry of the DSN address range field 494 includes a DSN address associated with each data segment of the data segments of the data (e.g., a segment number). For instance, storage units 5, 1, and 3 are selected for storage of target slices 1-3 when the segment number of a first data segment is associated with a 30th DSN address range and a 10th target set. As another instance, storage units 6, 1, and 2 are selected for storage of the target slices 1-3 when the segment number of a second data segment is associated with a 31st DSN address range and a eleventh target set.

FIG. 47G illustrates further steps of the example steps of the storing of the data 488 in at least some of the set of DST execution units 1-5. DST execution units receiving the write slice request of FIG. 1 store an encoded data slice of the corresponding request and issues, via the network 24, a write slice response of write slice responses T1-T3 to the DST client module 34 as write slice responses 500. Each write slice response includes an indicator with regards to success of storing an associated encoded data slice. For instance, DST execution unit 2 generates write slice response T1 indicating that the encoded data slice 2 was successfully stored. In another instance, DST execution unit 3 generates write slice response T2 indicating that the encoded data slice 3 was not successfully stored.

The request generator 486 receives the write slice responses 500. The request generator 486 determines whether a target number of favorable write slice responses 500 has been received within a timeframe of sending the write slice requests 490. For example, the request generator 486 determines that the target number of favorable write slice responses 500 has not been received within a time frame when receiving write slice response T2 indicating that the encoded data slice 3 was not successfully stored. When the request generator 486 determines that the target number of favorable write slice responses 500 has not been received, for each unsuccessfully stored encoded data slice, the request generator 486 obtains (e.g., receives from the slice selector 482) another encoded data slice of the set of "n" encoded data slices. For instance, slice selector 482 selects encoded data slice 5 from the set of encoded data slices when encoded data slice 5 has not been previously output for storage in the DSN memory.

FIG. 47H illustrates further steps of the example steps of the storing of the data 488 and at least some of the set of DST execution units 1-5. The request generator 486, for each unsuccessfully stored encoded data slice, issues, via the network 24, a write slice request 490 to a corresponding DST execution unit, where the write slice request 490 includes the associated obtained encoded data slice and an associated slice name from the slice name selector 484. For instance, the request generator 486 generates the write slice request 490 to include the encoded data slice 5 and a slice name 5 associated with the encoded data slice 5. Having generated the write slice request 490, the request generator 486 sends, via the network 24, the write slice request 490 to DST execution unit 5. Alternatively, or in addition to, the outbound DST processing module 80 associates a source name of the data 488 with identifiers of the DST execution units utilized for storage of each set of encoded data slices.

Alternatively, or in addition to, the encoded data slice 5 is temporarily stored in the DST execution unit 5 until a rebuilding process scans the set of DST execution units to identify a slice error associated with encoded data slice 3 and facilitates rebuilding of encoded data slice 3 for storage in the DST execution unit 3. When the encoded data slice 3 has been successfully stored, the rebuilding process deletes temporarily stored encoded data slice 5 from DST execution unit 5 in accordance with the storage mapping.

When reading the data 488 from the DSN memory, the DST client module 34 obtains the source name associated with data 488, identifies, for each data segment, the target storage set, issues read slice requests to the target DST execution units of the target storage set, receives at least a decode threshold number of encoded data slices from the target DST execution units, and decodes the at least the decode threshold number of encoded data slices using the dispersed storage error coding function to reproduce the data 488. When the DST client module 34 does not receive the at least the decode threshold number of encoded data slices from the target DST execution units, the DST client module 34 issues one or more additional read slice requests to other DST execution units of the DSN memory to retrieve further encoded data slices. Next, the DST client module 34 decodes at least some of the received encoded data slices from the target DST execution units and at least one encoded data slice from the other DST execution units to reproduce the data 488.

FIG. 47I is a flowchart illustrating an example of storing data. The method begins at step 502 where a processing module (e.g., of a dispersed storage processing module of a dispersed storage network (DSN)) receives data for storage in DSN memory. The data includes one of a data object, a data file, a plurality of data objects, a plurality of data files, a data segment of the data object (e.g., where the data is divided into a plurality of data segments utilizing a segmentation scheme), a data segment of the data file, a group of data segments of the data object, and a group of data segments of the data file.

The method continues at step 504 where the processing module ascertains (e.g., determines, utilizes pre-established parameters, accesses fixed parameters, reads programmable parameters, performs a table look up, utilizes user selected parameters, etc.) dispersed storage error encoding parameters for encoding the data. The method continues at step 506 where the processing module ascertains "p" number of storage units of the DSN memory for the storing an encoded version of the data. As a specific example, the processing module performs a system registry table lookup to ascertain the dispersed storage error encoding parameters and the "p" number of storage units such that a dispersed storage error encoding parameter "n" equals "p". The dispersed storage error encoding parameter "n" specifies a number of encoded data slices for a set of encoded data slices where the data is dispersed storage error encoding utilizing the dispersed storage error encoding parameters to produce sets of encoded data slices that includes the set of encoded data slices. As another specific example, the processing module ascertains the dispersed storage error encoding parameters and the "p" number of storage units such that "n" is less than "p".

The method continues at step 508 where the processing module ascertains a storage mapping that maps encoded data slices (e.g., of the sets of encoded data slices) to the storage units for storing the encoded version of the data. As a specific example, the processing module performs a table lookup to ascertain the storage mapping such that, from set to set, a fixed sub-set of the "n" number of encoded data slices of the sets of encoded data slices are stored in a fixed sub-set of the "p" number of storage units. For instance, similar encoded data slice selections are stored in a common set of storage units for all the sets of encoded data slices. As another specific example, the processing module performs the table lookup to ascertain the storage mapping such that, from set to set, a varying sub-set of the "n" number of encoded data slices of the sets of encoded data slices are stored in the fixed sub-set of the "p" number of storage units. For instance, different encoded data slice selections for each set are stored in the common set of storage units. As yet another specific example, the processing module performs the table lookup to ascertain the storage mapping such that, from set to set, the fixed sub-set of the "n" number of encoded data slices of the plurality of sets of encoded data slices are stored in a varying sub-set of the "p" number of storage units. For instance, the similar encoded data slice selections are stored in different sets of storage units. As a further specific example, the processing module performs the table lookup to ascertain the storage mapping such that, from set to set, the varying sub-set of the "n" number of encoded data slices of the plurality of sets of encoded data slices are stored in the varying sub-set of the "p" number of storage units. For instance, the different encoded data slice selections for each set are stored in the different sets of storage units.

Alternatively, in another example, when the processing module ascertains the dispersed storage error encoding parameters and the "p" number of storage units such that "n" is less than "p", the processing module ascertains the storage mapping such that, from set to set, the "n" number of encoded data slices of the sets of encoded data slices are stored in the fixed sub-set of the "p" number of storage units. As another alternative in another example, when the processing module ascertains the dispersed storage error encoding parameters and the "p" number of storage units such that "n" is less than "p", the processing module ascertains the storage mapping such that, from set to set, the "n" number of encoded data slices of the sets of encoded data slices are stored in the varying sub-set of the "p" number of storage units.

The method continues at step 510 where the processing module encodes the data in accordance with the dispersed storage error encoding parameters to produce the sets of encoded data slices. Each set of encoded data slices includes "n" number of encoded data slices. The method continues at step 512 where the processing module generates one or more sets of write requests for storing, in accordance with the storage mapping, encoded data slices of the sets of encoded data slices in a pattern across the "p" number of storage units, where less than the "p" number of storage units stores an encoded data slice of the set of encoded data slices or a subset of the set of encoded data slices.

FIG. 48 is a flowchart illustrating another example of storing data that includes similar steps to FIG. 42. The method begins with step 390 of FIG. 42 where a processing module (e.g., of a dispersed storage (DS) processing module) receives a write data object request that includes a data object for storage and a data name. The method continues at step 514 where the processing module determines a source name for the data based on the data name. For example, the processing module performs a vault identifier (ID) look up to produce a vault ID based on a requesting entity ID, generates an object number based on a random number, and generates the source name to include a default generation ID, the vault ID, and the object number. The method continues at step 516 where the processing module identifies a source name range corresponding to the source name. For example, the processing module performs a lookup in a source name range list utilizing the source name.

The method continues at step 518 where the processing module identifies a storage pattern corresponding to the source name from a predetermined list of available storage patterns associated with the identified source name range. The identifying includes identifying a source name offset of the source name within the source name range (e.g., calculating a difference between a starting address of the source name range and the source name), identifying a number of storage patterns of the predetermined list of available storage patterns (e.g., a lookup), and taking the source name offset modulo of the number of storage patterns to produce a storage pattern identifier of the identified storage pattern. For example, with an affinity target number of 3, and pillar width of 5, there are 5 storage patterns including (e.g., by pillar number): (1, 2, 3), (2, 3, 4), (3, 4, 5), (4, 5, 1), (5, 1, 2). Every pillar is used exactly 3 times. When a source name falls into the Nth sub range (e.g., source name offset) of the source name range, for example the 5,672nd, the sub-range number (e.g., source name offset) is taken modulo the number of groups (5), which yields 5,672 modulo 5=2. Therefore affinity group two is selected (3, 4, 5). Thus the slices for DS units with pillar number 3, 4, and 5 will be written, but the slices for pillars 1 and 2 are written only as a last resort (if one of the stores 3, 4, or 5 is down) as is discussed below.

The method continues at step 520 where the processing module identifies a set of DS units that corresponds to the source name. For example, the processing module accesses a source name to physical location table to identify the set of DS units. The method continues at step 522 where the processing module identifies affinity DS units, of the set of DS units, that corresponds to the storage pattern. For example, the processing module utilizes the storage pattern identifier to access a list of storage patterns corresponding to the source name range to identify the affinity DS units.

The method continues at step 524 where the processing module partitions the data object to produce a plurality of data segments in accordance with a segmentation scheme. For each data segment of the plurality of data segments, the method continues at step 526 where the processing module encodes the data segment to produce encoded affinity slices. Alternatively, the processing module produces a full pillar width number of slices. The method continues at step 528 where the processing module outputs the encoded affinity slices to the identified affinity DS units. The outputting includes generating affinity slice names corresponding to each of the encoded affinity slices, generating write slice requests that includes the encoded affinity slices and the affinity slice names, and outputting the write slice requests to the identified affinity DS units.

When not receiving confirmation of storage of each of the encoded affinity slices within a timeframe, the method continues at step 530 where the processing module outputs one or more other encoded data slices of the data segment to one or more other DS units of a set of DS units. The processing module may detect confirmation of storage by receiving a write slice response that includes a status code with regards to favorability of storing and associated slice. The outputting includes selecting a number of other slices to encode the data segment to produce the other encoded data slices to provide in total a write threshold number of favorable confirmed stored slices based on a number of unfavorable responses or no responses within a response time frame. Alternatively, the processing module outputs encoded affinity slices to one or more of the other DS units as foster slices until the affinity DS units are back online and can receive and successfully stored encoded affinity slices.

FIG. 49 is a flowchart illustrating another example of storing data, which includes similar steps to FIGS. 42 and 48. The method begins with step 390 of FIG. 42 where a processing module (e.g., a dispersed storage (DS) processing module) receives a write data object request that includes a data object for storage and a data name. The method continues with steps 514-526 of FIG. 48 where the processing module determines a source name for the data based on the data name, identifies a source name range corresponding to the source name, identifies a storage pattern corresponding to the source name from a predetermined list of available storage patterns associated with the identified source name range, identifies a set of DS units that corresponds to the source name, identifies affinity DS units, of the set of DS units, that correspond to the storage pattern, partitions the data object to produce a plurality of data segments, and for each data segment, encodes the data segment to produce encoded affinity slices.

The method continues at step 532 where the processing module encodes the data segment to produce one or more other encoded data slices. The encoding may be based on one or more of a predetermination, a previous error rate, and an expected number of failures. For example, the processing module determines a number of the one or more other encoded data slices to be two when an expected number of failures is one with regards to storing encoded affinity slices. The method continues at step 534 where the processing module issues write slice requests, that includes the encoded affinity slices, to the affinity DS units. The issuing includes generating write slice requests to include the encoded affinity slices and outputting the write slice requests to the affinity DS units. The method continues at step 536 where the processing module issues write slice requests, that includes the other encoded data slices, to other DS units of the set of DS units. The issuing includes generating write slice requests to include the other encoded slices and outputting the write slice requests to the other DS units.

The method continues at step 538 where the processing module determines whether a favorable number of write slice responses has been received from the affinity DS units. The determining may be based on comparing the number of favorable responses to a favorability threshold (e.g., a target affinity number). The method branches to step 542 when the favorable number of write slice responses has not been received. The method continues to step 540 when the favorable number of write slice responses has been received. The method continues at step 540 where the processing module issues rollback requests, with regards to the other encoded data slices, to the other DS units of the set of DS units. The issuing includes generating the rollback requests to include a transaction number of corresponding write requests and outputting the rollback request to the other DS units. When the favorable number of write slice responses has not been received, the method continues at step 542 where the processing issues commit requests, with regards to the other encoded data slices, to the other DS units of the set of DS units. The issuing includes generating the commit requests to include the transaction number of the corresponding write requests and outputting the commit requests to the other DS units.

FIG. 50 is a flowchart illustrating another example of storing data. The method begins with step 544 where a processing module (e.g., of a dispersed storage (DS) processing module) identifies a DS unit subset of a set of DS units for storage of a subset of encoded data slices of a set of encoded data slices. The identifying may be based on one or more of a storage pattern, a dispersed storage error coding parameters, a dispersed storage error coding function, a predetermination, a request, a failure message, a DS unit availability indicator, and a reliability requirement. For example, the processing module identifies a DS unit subset that includes 12 DS units when the set of DS units includes 16 DS units, a decode threshold is 10, and a write threshold is 12.

The method continues at step 546 where the processing module generates a modified encoding matrix from an encoding matrix based on the identified DS units subset. For example, the processing module matches rows of the encoding matrix that correspond to slices that map to the DS unit subset. For example, the processing module includes rows 1-10, 14, and 15 when the DS unit subset includes DS units 1-10, 14, and 15. The method continues at step 548 where the processing module encodes a data segment utilizing the modified encoding matrix to produce the subset of encoded data slices. For example, the processing module matrix multiplies the data segment by the modified encoding matrix to produce the subset of encoded data slices. The method continues at step 550 where the processing module outputs the subset of encoded data slices to the DS unit subset for storage therein. The outputting includes generating a sub-set of slice names, generating a sub-set of write slice requests that includes the sub-set of slice names and the sub-set of encoded data slices, and outputting the sub-set of write slice requests to the DS unit subset.

FIG. 51A is a diagram illustrating an example of a virtual dispersed storage network (DSN) address to physical location table 552 that includes an address range field 554, a site identifier (ID) field 556, a cabinet ID field 558, a rack position field 560, and a dispersed storage (DS) unit ID field 562. The virtual DSN address to physical location table 552 includes a plurality of entries. Each entry of the plurality of entries includes a DSN address range entry corresponding to the address range field 554, a site ID entry for a site of one or more sites of a DSN corresponding to the site ID field 556, a cabinet ID entry corresponding to a cabinet installed at a site of the cabinet ID field 558, a rack position entry corresponding to an installation position of a DS unit within the cabinet of the rack position field 560, and a DS unit ID of the DS unit in the DS unit ID field 562. For example, a DS unit that is associated with a DS unit ID of 41F is installed in a second rack position of a first cabinet at a first site where the DS unit is assigned to a DSN address range of 1000-1999.

The virtual DSN address to physical location table 552 may be sorted in accordance with a lexicographical order (e.g., as illustrated) such that DS units with adjacent DSN address ranges are many times installed in pseudo-adjacent physical locations. Such an implementation approach facilitates a system reliability improvement when stored encoded data slices are moved from a source DS unit to a destination DS unit that is physically adjacent and logically adjacent. The method of assignment of the DS units to address ranges using the lexicographical ordering is discussed in more detail with reference to FIG. 51B.

FIG. 51B is a flowchart illustrating an example of assigning dispersed storage network (DSN) address ranges. The method begins with step 564 where a processing module (e.g., of a managing module) identifies a plurality of dispersed storage (DS) units. The identifying may be based on one or more of retrieving DS unit identifiers from a system registry, accessing a factory build list, receiving a message, initiating a query of available new DS units, and receiving responses from one or more DS units. For each DS unit of the plurality of DS units, the method continues at step 566 where the processing module generates a concatenated temporary identifier that includes one or more associated attributes. An attribute of the one or more associated attributes includes one or more of a physical location, a set of global positioning satellite coordinates, a street address, a storage container number, a vehicle number, a container location identifier, a building number, a floor number, a site identifier (ID), a cabinet ID, a rack position, and a sub-rack position.

The method continues at step 568 where the processing module sorts a list of the concatenated temporary identifiers based on lexicographical order. For example, DS units associated with a common site are grouped together and sorted by cabinets and then sorted by rack positions within each cabinet (e.g., as illustrated in FIG. 51A). The method continues at step 570 where the processing module identifies a plurality of ordered DSN address ranges for assignment to the plurality of DS units. The identifying may be based on one or more of a predetermined registry value, a management input, and a number of higher order attributes of the sorted list. For example, the number of ordered DSN address ranges may be identified as a number of rack positions per cabinet multiplying by the number of total cabinets across all sites and the ordered DSN address ranges are identified as a total DSN address range space divided by the number of ordered DSN address ranges. The method continues at step 572 where the processing module associates the plurality of ordered DSN address ranges with DS units in order of the sorted list. The associating includes mapping one-for-one DS units to DSN address ranges and updating a virtual DSN address to physical location table.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device of a dispersed storage network (DSN), the method comprises:
   encoding a data segment of a data object into a set of encoded data slices, wherein the set of encoded data slices includes "n" number of encoded data slices;
   generating a set of slice names for the set of encoded data slices;
   selecting "m" encoded data slices of the set of encoded data slices to output for storage in DSN memory, wherein "m" is less than "n" and wherein "m" is equal to or greater than a decode threshold;
   selecting "m" storage units of "p" storage units of the DSN memory for storing the "m" encoded data slices;

mapping "m" slice names of the "m" encoded data slices to DSN addresses of the "m" storage units to create mapped slice names, wherein the mapping of the "m" slice names to DSN addresses of the "m" storage units includes accessing a storage selection table, wherein the storage selection table includes a DSN address range field, a target set field, and a plurality of target slice fields, wherein a target slice field of the plurality of target slice fields links an encoded data slice of the set of encoded data slices to a particular storage unit of the "m" storage units; and outputting, in accordance with the mapped slice names, the "m" encoded data slices to the "m" storage units for storage therein.

2. The method of claim 1, wherein the selecting the "m" storage units comprises:

identifying at least some of the "p" storage units that each have a DSN address range that includes a DSN address that is associated with a source name of the set of slice names; and selecting the "m" storage units from the at least some of the "p" storage units.

3. The method of claim 1 further comprises:

determining that an encoded data slice of the "m" encoded data slices was not successfully stored by a storage unit of the "m" storage units;

identifying another encoded data slice of the "n" encoded data slices that was not part of the "m" encoded data slices;

mapping a slice name of the other encoded data slice to the DSN address of the storage unit; and outputting the encoded data slice to the storage unit for storage therein.

4. The method of claim 1 further comprises:

encoding a first set of data segments of the data object into first sets of encoded data slices, wherein each of the first sets of encoded data slices includes "n" number of encoded data slices;

generating first sets of slice names for the first sets of encoded data slices;

selecting "m" encoded data slices of each set of the first sets of encoded data slices to output for storage in DSN memory, wherein "m" is less than "n" and wherein "m" is equal to or greater than a decode threshold;

selecting the "m" storage units of "p" storage units of the DSN memory for storing the "m" encoded data slices of each set of the first set of encoded data slices;

mapping "m" slice names of each set of the first set of slice names that correspond to the "m" encoded data slices of each set of the first sets of encoded data slices to DSN addresses of the "m" storage units to create mapped slice names; and outputting, in accordance with the mapped slice names, the "m" encoded data slices of each set of the first sets of encoded data slices to the "m" storage units for storage therein.

5. The method of claim 4 further comprises:

encoding a second set of data segments of the data object into second sets of encoded data slices, wherein each of the second sets of encoded data slices includes the "n" number of encoded data slices;

generating second sets of slice names for the second sets of encoded data slices;

selecting "x" encoded data slices of each set of the second sets of encoded data slices to output for storage in DSN memory, wherein "x" is less than "n" and wherein "x" is equal to or greater than a decode threshold;

selecting "x" storage units of the "p" storage units of the DSN memory for storing the "x" encoded data slices of each set of the second set of encoded data slices;

mapping "x" slice names of each set of the second set of slice names that correspond to the "x" encoded data slices of each set of the second sets of encoded data slices to DSN addresses of the "x" storage units to create mapped slice names; and outputting, in accordance with the mapped slice names, the "x" encoded data slices of each set of the second sets of encoded data slices to the "x" storage units for storage therein.

6. A computing device of a dispersed storage network (DSN), the computing device comprises:

an interface;

memory; and a processing module operably coupled to the interface and to the memory, wherein the processing module is operable to:

encode a data segment of a data object into a set of encoded data slices, wherein the set of encoded data slices includes "n" number of encoded data slices;

generate a set of slice names for the set of encoded data slices;

select "m" encoded data slices of the set of encoded data slices to output for storage in DSN memory, wherein "m" is less than "n" and wherein "m" is equal to or greater than a decode threshold;

select "m" storage units of "p" storage units of the DSN memory for storing the "m" encoded data slices;

map "m" slice names of the "m" encoded data slices to DSN addresses of the "m" storage units to create mapped slice names, wherein the mapping of the "m" slice names to DSN addresses of the "m" storage units includes accessing a storage selection table, wherein the storage selection table includes a DSN address range field, a target set field, and a plurality of target slice fields, wherein a target slice field of the plurality of target slice fields links an encoded data slice of the set of encoded data slices to a particular storage unit of the "m" storage units; and output, in accordance with the mapped slice names, the "m" encoded data slices to the "m" storage units for storage therein.

7. The computing device of claim 6, wherein the processing module is further operable to select the "m" storage units by:

identifying at least some of the "p" storage units that each have a DSN address range that includes a DSN address that is associated with a source name of the set of slice names; and selecting the "m" storage units from the at least some of the "p" storage units.

8. The computing device of claim 6, wherein the processing module is further operable to:

determine that an encoded data slice of the "m" encoded data slices was not successfully stored by a storage unit of the "m" storage units;

identify another encoded data slice of the "n" encoded data slices that was not part of the "m" encoded data slices;

map a slice name of the other encoded data slice to the DSN address of the storage unit; and output the encoded data slice to the storage unit for storage therein.

9. The computing device of claim 6, wherein the processing module is further operable to:
- encode a first set of data segments of the data object into first sets of encoded data slices, wherein each of the first sets of encoded data slices includes "n" number of encoded data slices;
- generate first sets of slice names for the first sets of encoded data slices;
- select "m" encoded data slices of each set of the first sets of encoded data slices to output for storage in DSN memory, wherein "m" is less than "n" and wherein "m" is equal to or greater than a decode threshold;
- select the "m" storage units of "p" storage units of the DSN memory for storing the "m" encoded data slices of each set of the first set of encoded data slices;
- map "m" slice names of each set of the first set of slice names that correspond to the "m" encoded data slices of each set of the first sets of encoded data slices to DSN addresses of the "m" storage units to create mapped slice names; and
- output, in accordance with the mapped slice names, the "m" encoded data slices of each set of the first sets of encoded data slices to the "m" storage units for storage therein.

10. The computing device of claim 9, wherein the processing module is further operable to:
- encode a second set of data segments of the data object into second sets of encoded data slices, wherein each of the second sets of encoded data slices includes the "n" number of encoded data slices;
- generate second sets of slice names for the second sets of encoded data slices;
- selecting "x" encoded data slices of each set of the second sets of encoded data slices to output for storage in DSN memory, wherein "x" is less than "n" and wherein "x" is equal to or greater than a decode threshold;
- select "x" storage units of the "p" storage units of the DSN memory for storing the "x" encoded data slices of each set of the second set of encoded data slices;
- map "x" slice names of each set of the second set of slice names that correspond to the "x" encoded data slices of each set of the second sets of encoded data slices to DSN addresses of the "x" storage units to create mapped slice names; and
- output, in accordance with the mapped slice names, the "x" encoded data slices of each set of the second sets of encoded data slices to the "x" storage units for storage therein.

* * * * *